United States Patent

[11] 3,586,081

| [72] | Inventors | Malcolm W. Loveland<br>Orinda;<br>Robert G. Ellis, Richmond, both of, Calif. |
|---|---|---|
| [21] | Appl. No. | 833,492 |
| [22] | Filed | June 16, 1969 |
| [45] | Patented | June 22, 1971 |
| [73] | Assignee | Atlas Pacific Engineering Company<br>Continuation-in-part of application Ser. No. 629,600, Apr. 10, 1967, now abandoned. |

[54] MACHINE FOR AUTOMATICALLY PEELING AND CORING APPLES FED FROM A BULK SUPPLY
31 Claims, 60 Drawing Figs.

[52] U.S. Cl. .................................................. 146/39,
146/43, 146/52, 146/224, 198/33
[51] Int. Cl. .......................................................... A23n 7/08,
A23n 3/12
[50] Field of Search ............................................. 146/38, 39,
33—37, 43, 52, 51, 224, 241; 198/33 R

[56] References Cited
UNITED STATES PATENTS
| 2,299,761 | 10/1942 | McCauley ..................... | 146/43 |
| 2,738,819 | 3/1956 | DeBack et al. ................ | 146/51 X |
| 3,016,076 | 1/1962 | Keesling ...................... | 146/52 |
| 3,163,282 | 12/1964 | Shropshire et al. ........... | 146/51 X |
| 3,389,730 | 6/1968 | Anderson et al. ............. | 146/52 |
| 3,396,770 | 8/1968 | Buchner ....................... | 146/241 |

*Primary Examiner*—Willie G. Abercrombie
*Attorney*—Eckhoff and Hoppe

ABSTRACT: Apples are picked from a bulk supply and are fed continuously in single file order one at a time to a primary orientor, the first of two orientors. The primary orientor positions each apple with its two indents generally aligned on a vertical axis and its outer surface centered. However, the upper indent may or may not be in vertical alignment with the lower indent. The semioriented apples are then engaged by a second orienting mechanism which engages both indents of the apple to refine vertical alignment of the indents. Thereafter, each properly oriented apple is acted upon by peeling and coring mechanism which removes the skin and core and trims the apple indents. Apples which are not fully oriented by the second stage orientor are rejected immediately so that only oriented apples are peeled and cored.

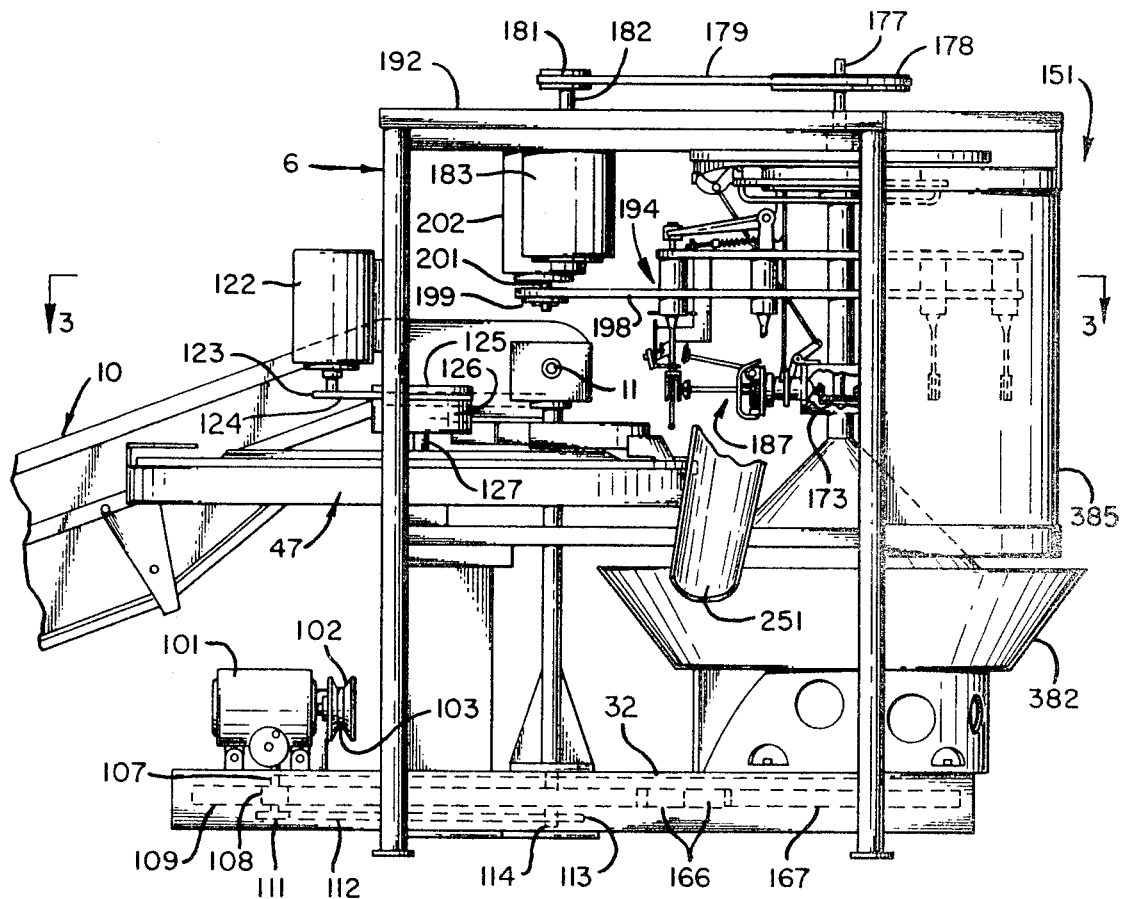
FIG_1.
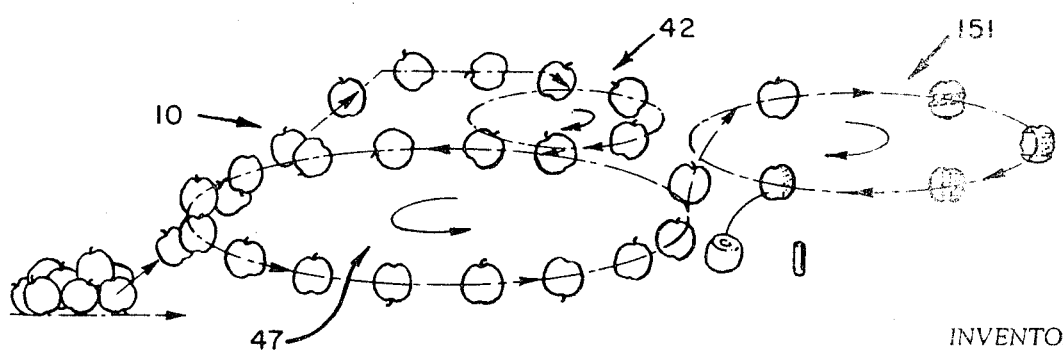
FIG_2.
INVENTORS
MALCOLM W. LOVELAND
ROBERT G. ELLIS
BY Eckhoff and Hoppe
ATTORNEYS

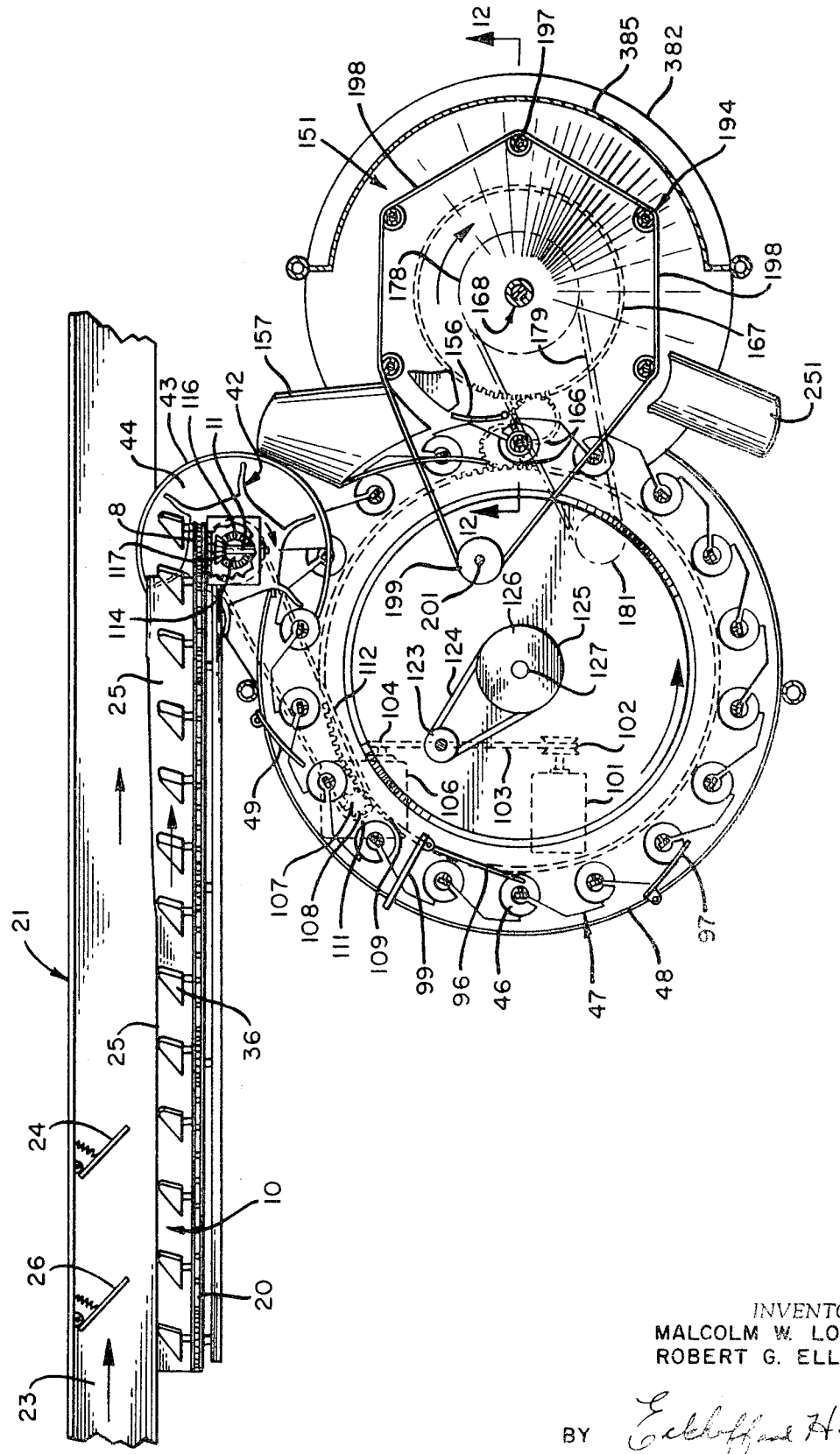

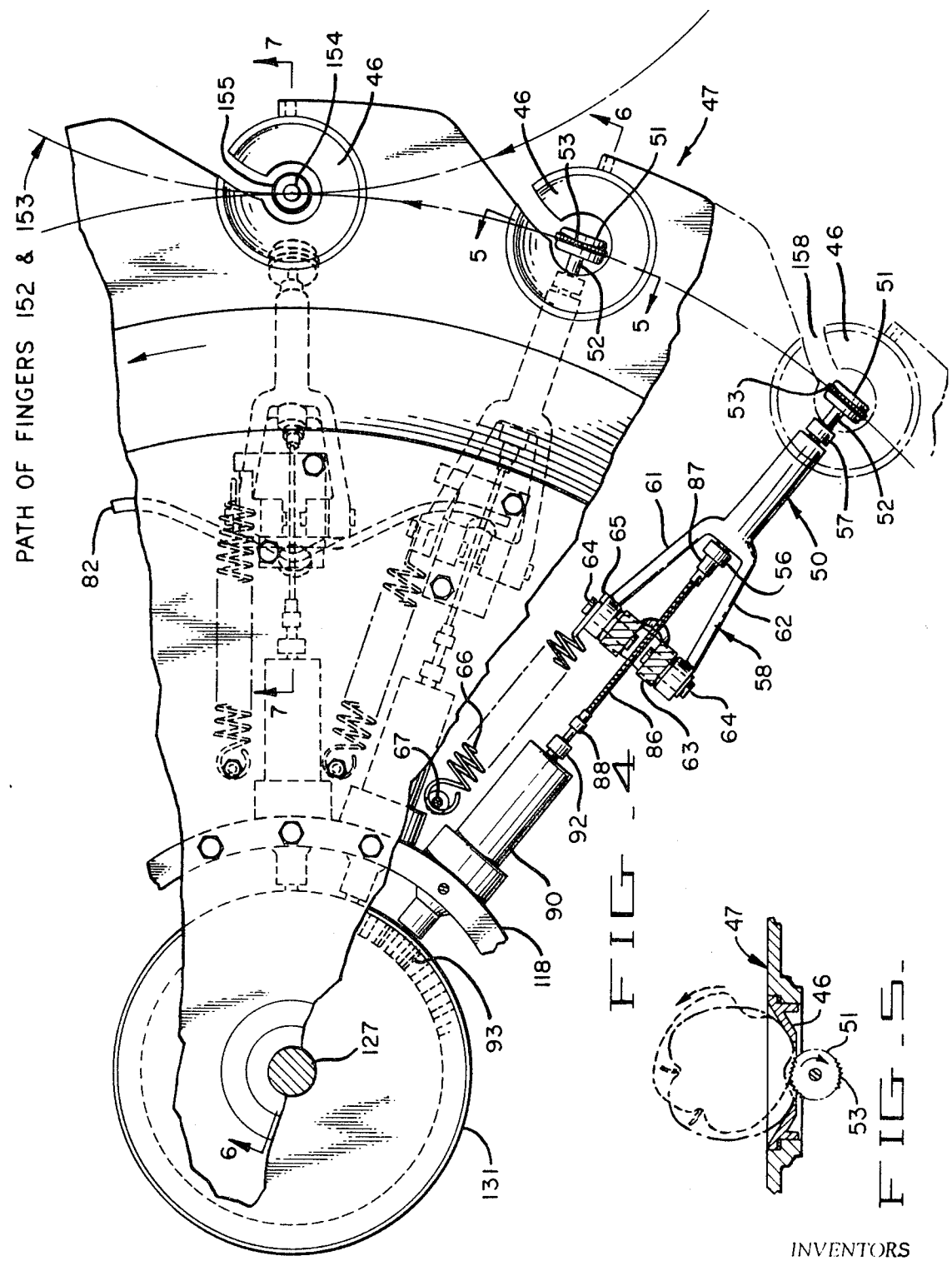

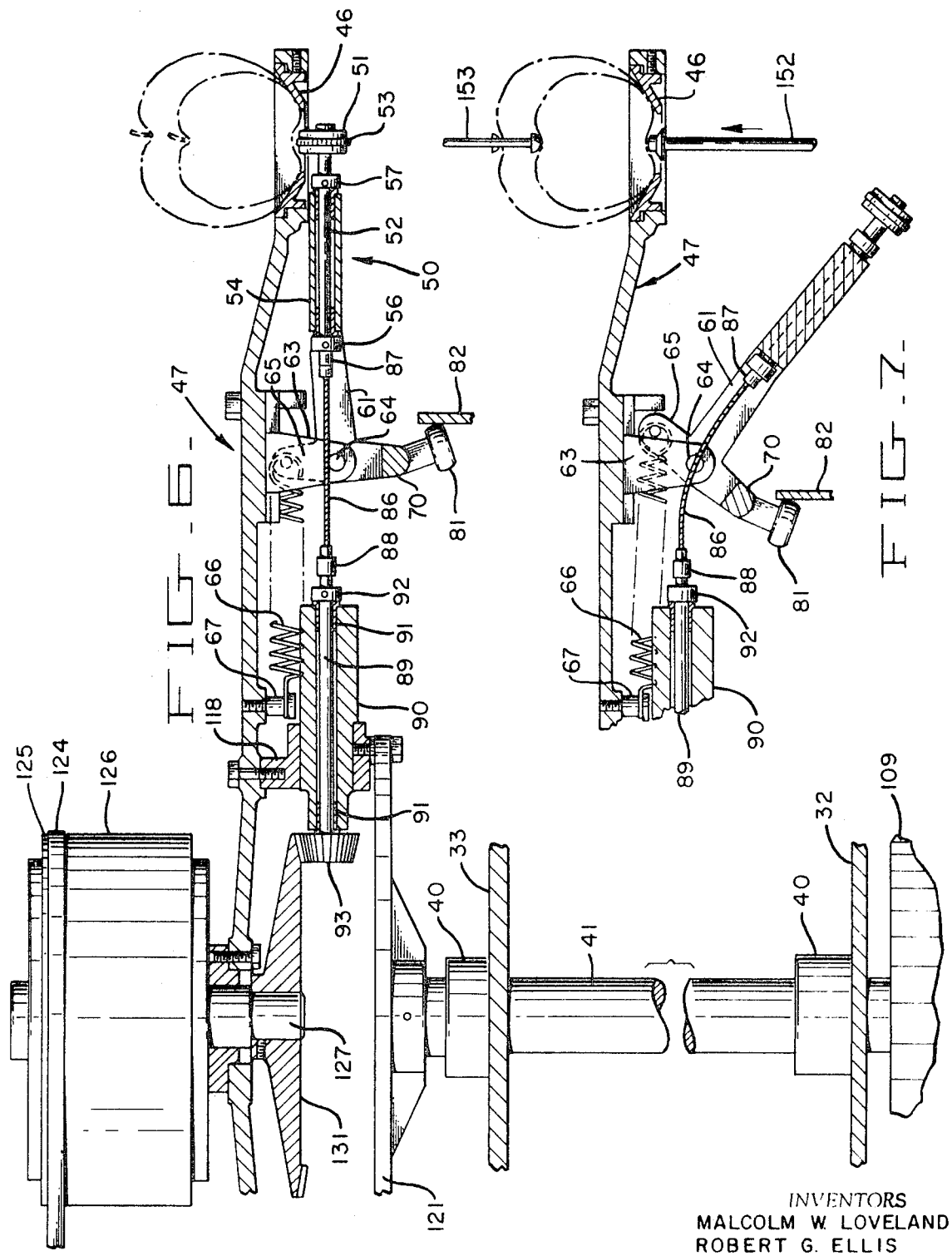

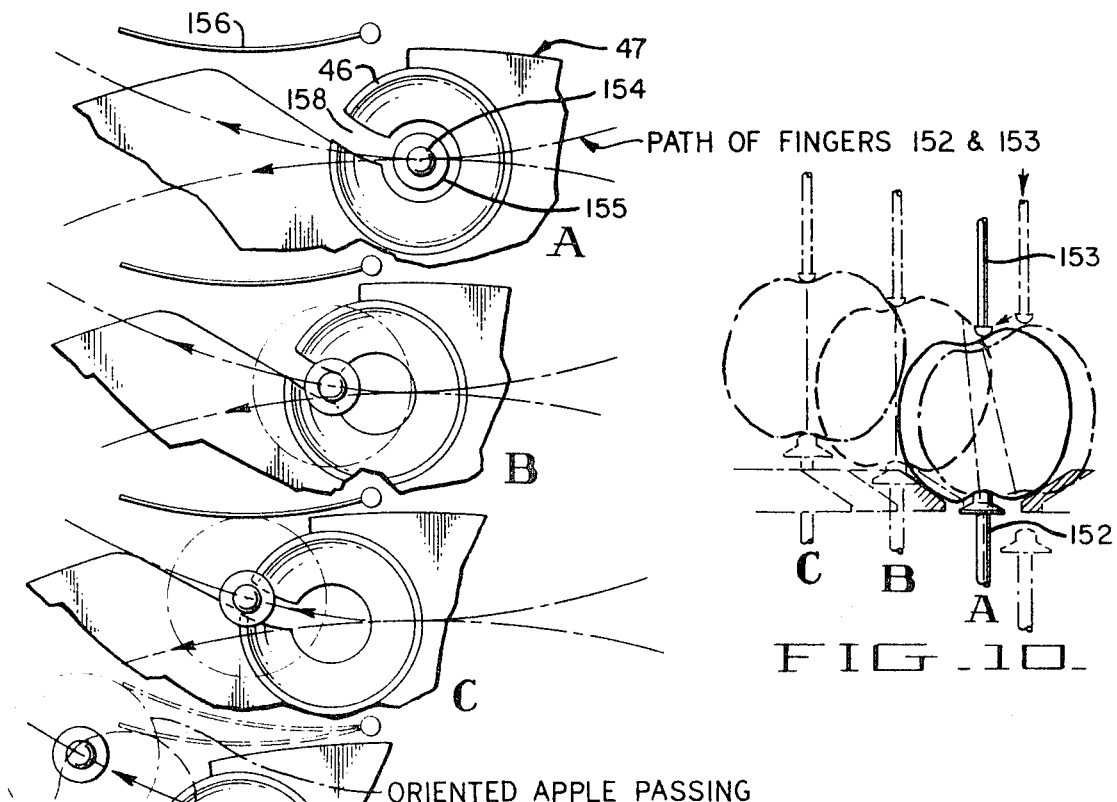
PATH OF FINGERS 152 & 153
ORIENTED APPLE PASSING
NON-ORIENTED APPLE BEING REJECTED
FIG_8_
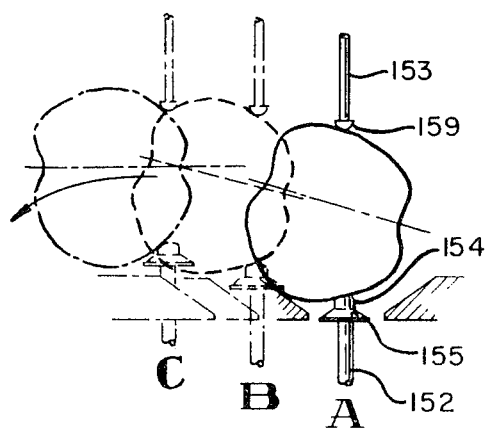
FIG_11_
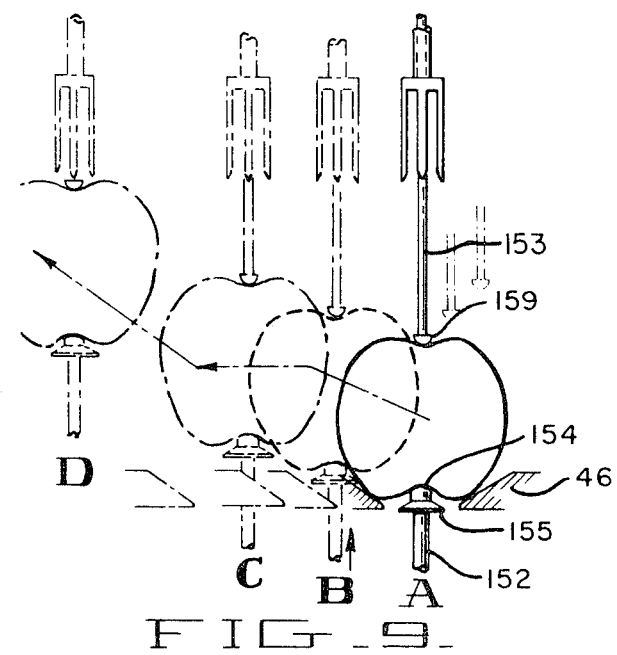
FIG_9_
FIG_10_

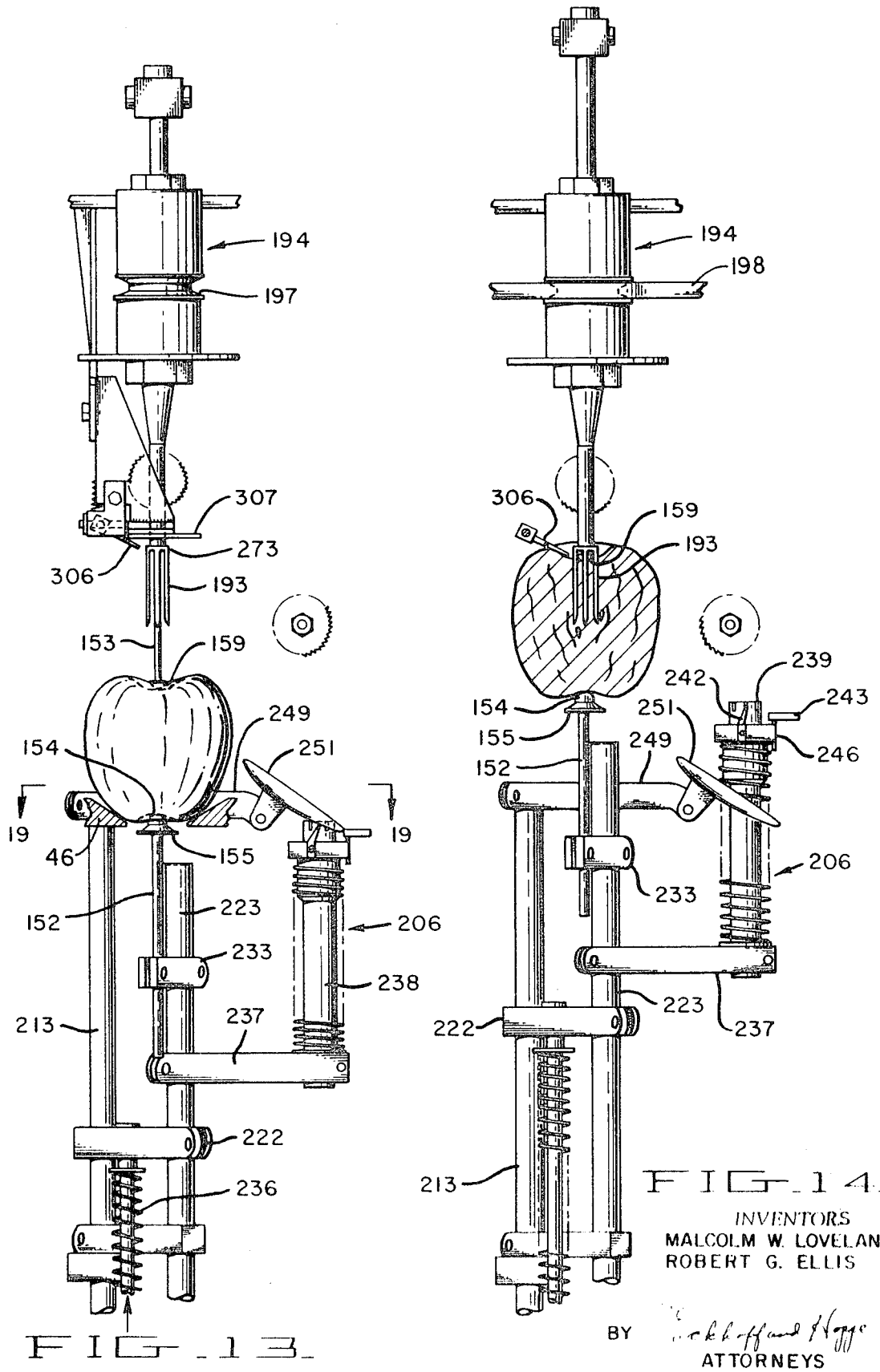

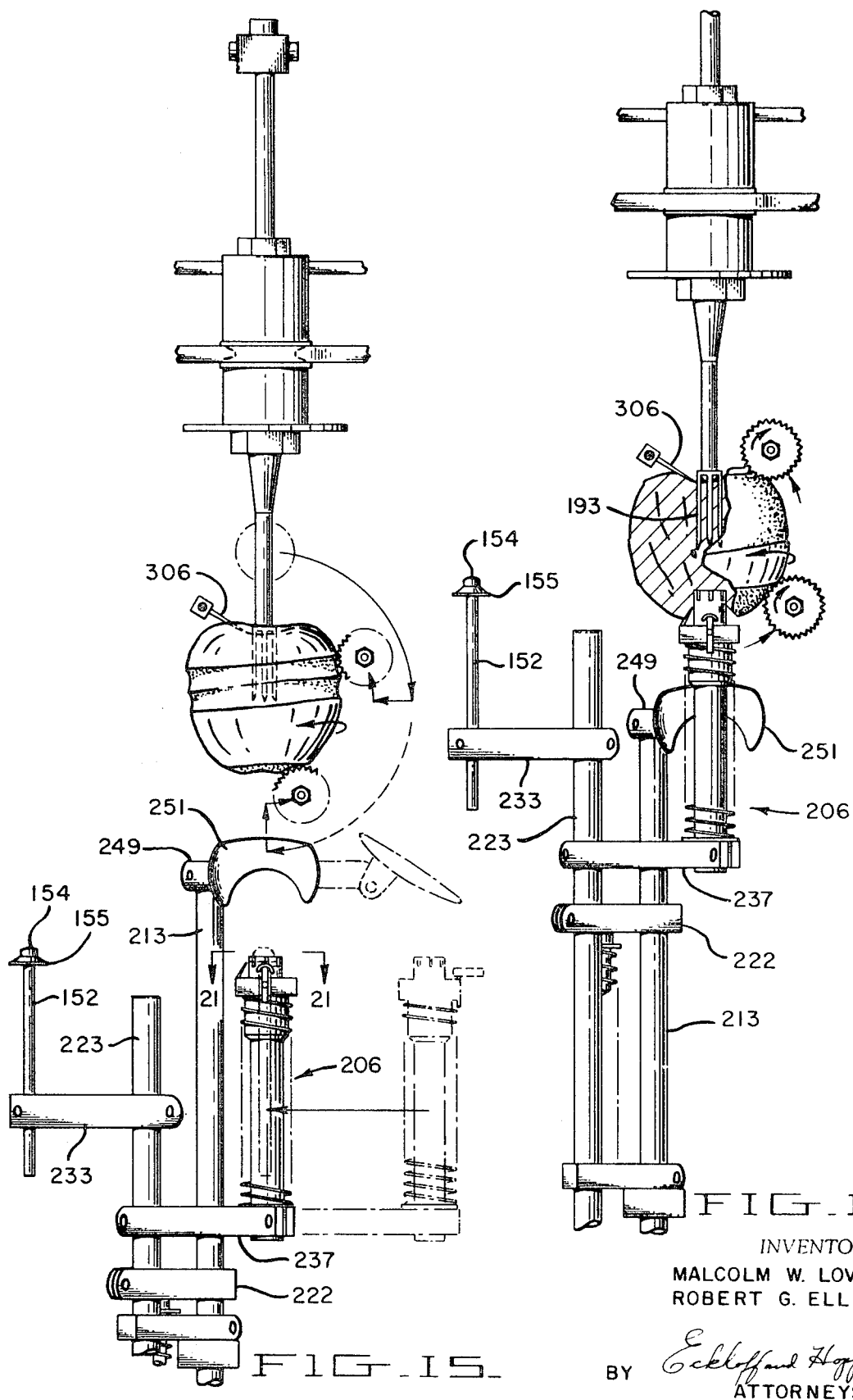

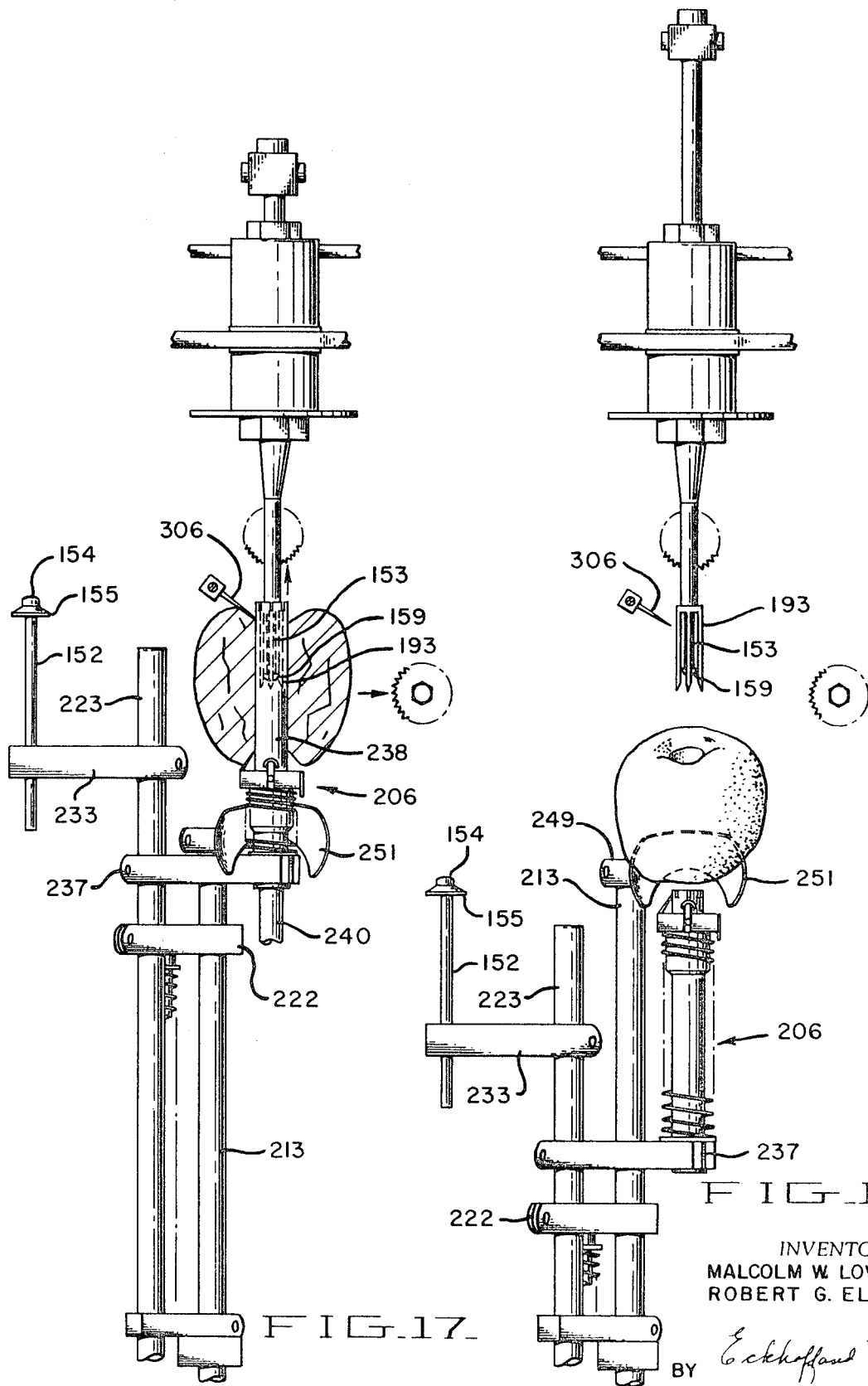

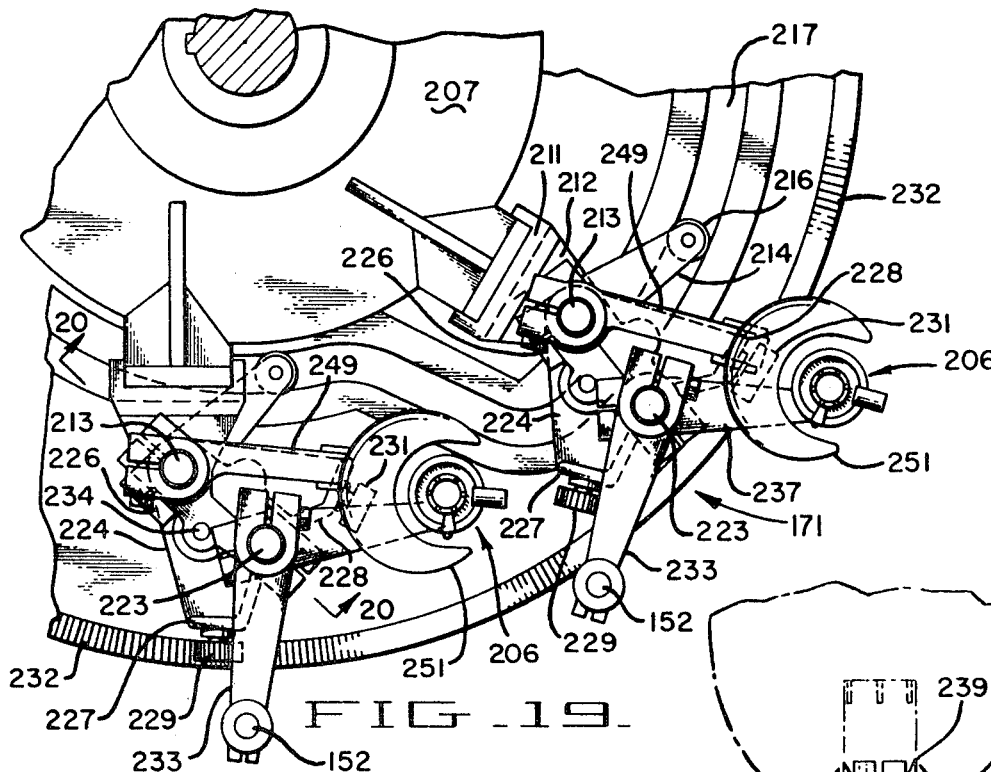
FIG. 19.
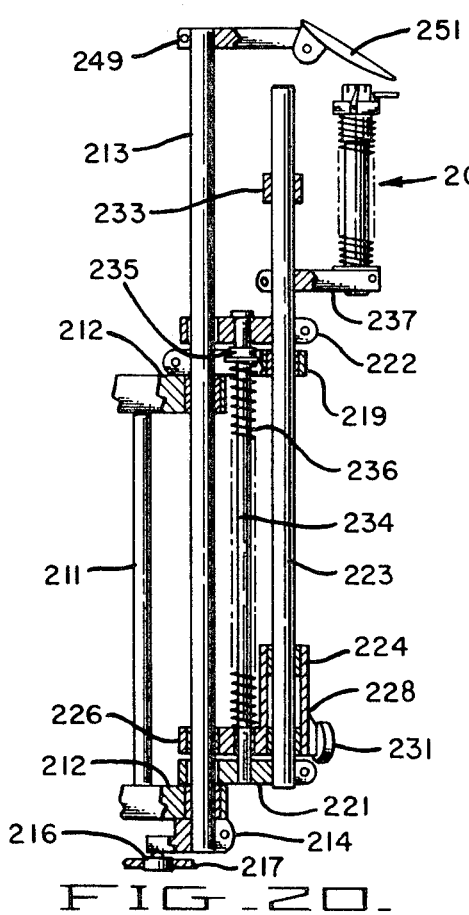
FIG. 20.
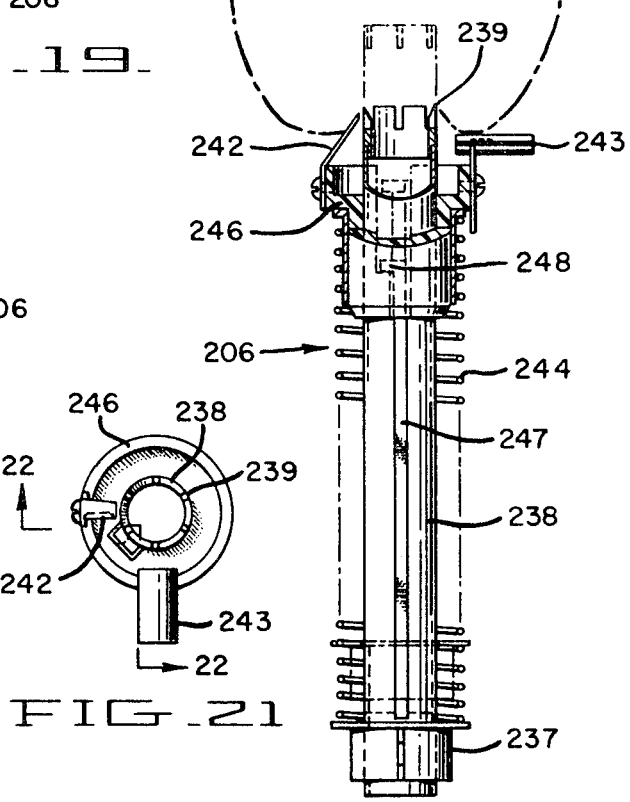
FIG. 21.
FIG. 22.
INVENTORS
MALCOLM W. LOVELAND
ROBERT G. ELLIS
BY Eckhoff and Hoppe
ATTORNEYS

INVENTORS
MALCOLM W. LOVELAND
ROBERT G. ELLIS

BY *Eckhoff and Hoppe*
ATTORNEYS

INVENTORS
MALCOLM W. LOVELAND
ROBERT G. ELLIS

BY Eckhoff and Hogg
ATTORNEYS

INVENTORS
MALCOLM W. LOVELAND
BY ROBERT G. ELLIS
Eckhoff and Hopper
ATTORNEYS

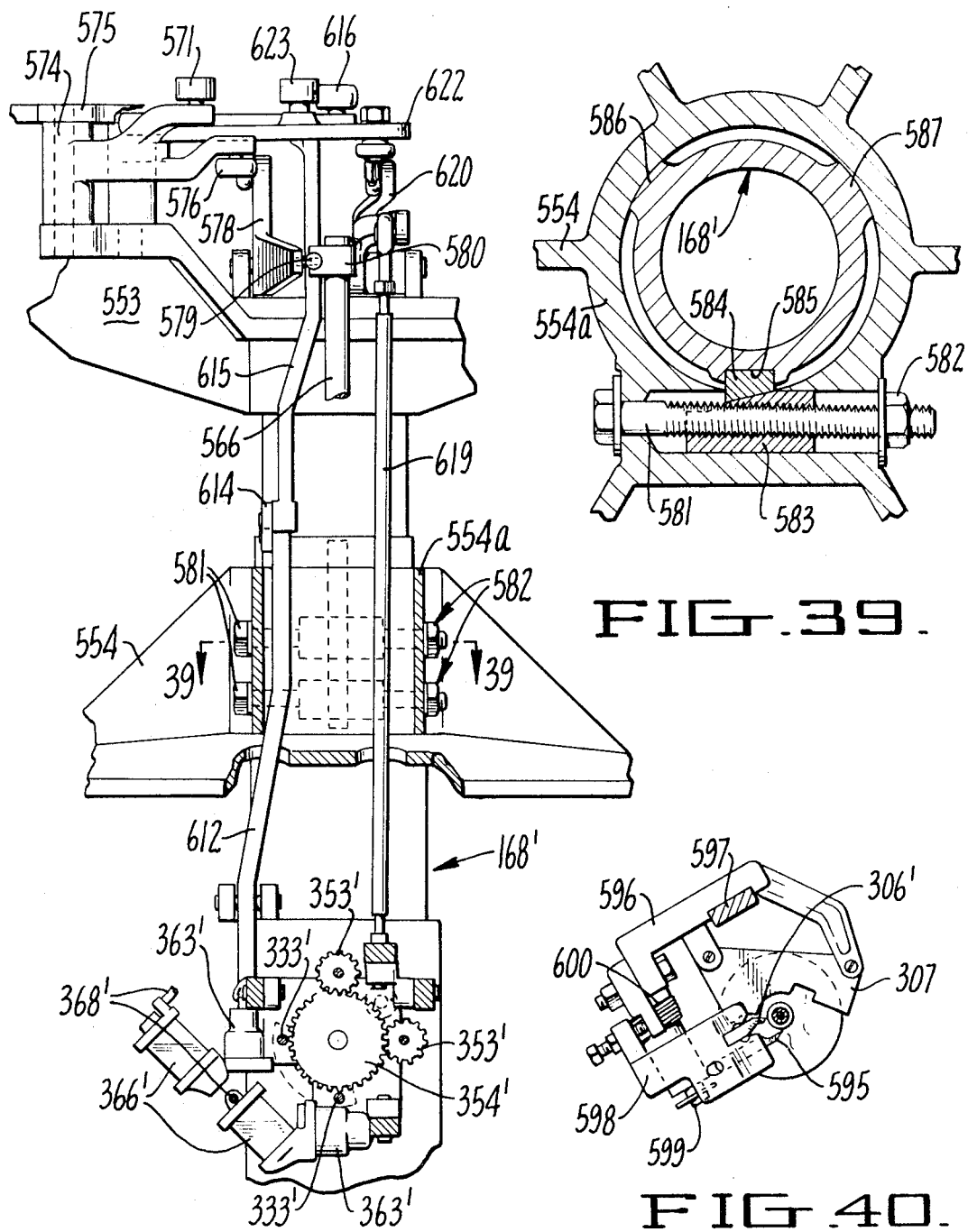

INVENTORS
MALCOLM W. LOVELAND
BY ROBERT G. ELLIS
Eckhoff and Hoppe
ATTORNEYS

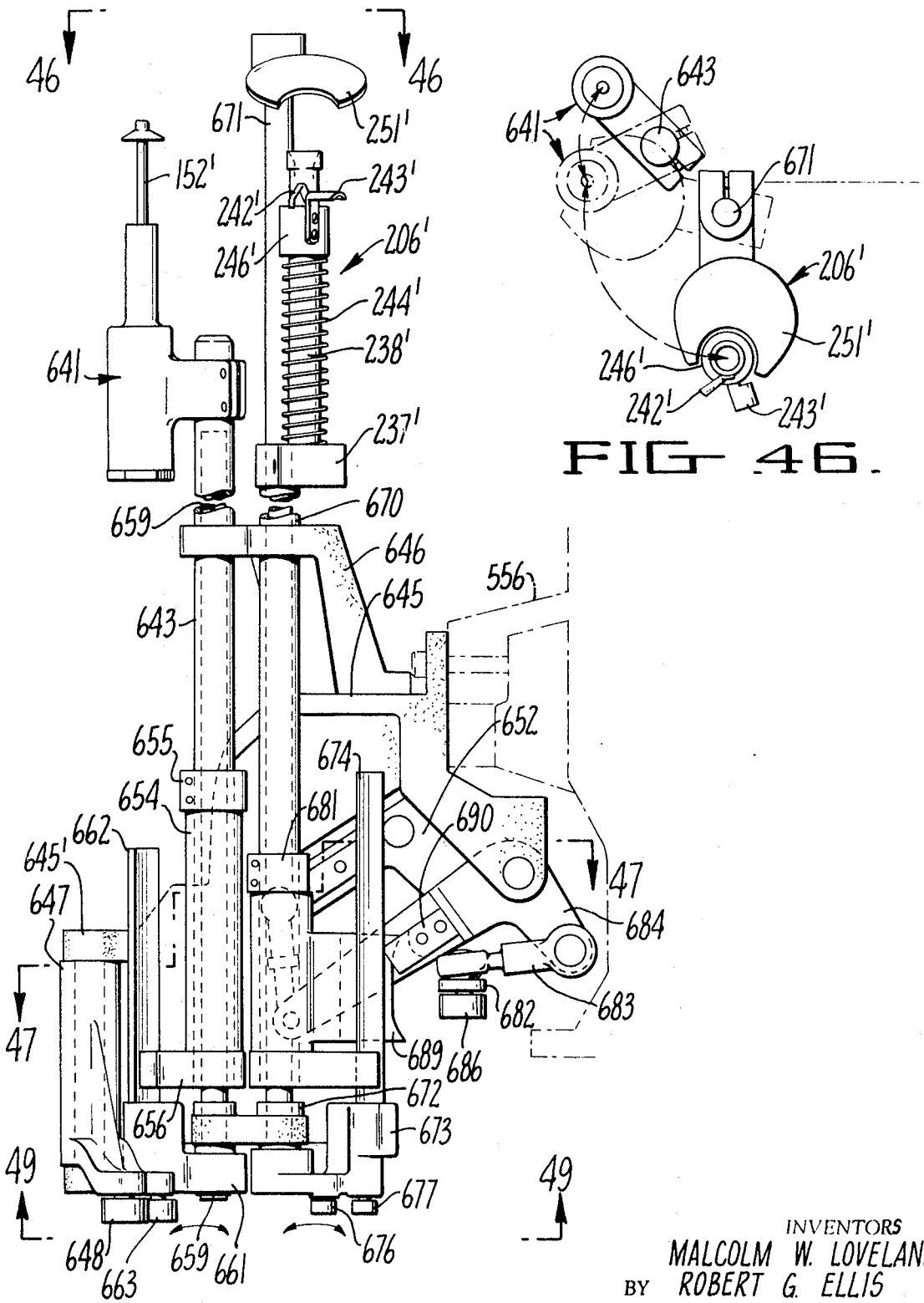

INVENTORS
MALCOLM W. LOVELAND
BY ROBERT G. ELLIS
Eckhoff and Hoppe
ATTORNEYS

INVENTORS
MALCOLM W. LOVELAND
BY  ROBERT G. ELLIS
Eckhoff and Hoppe
ATTORNEYS

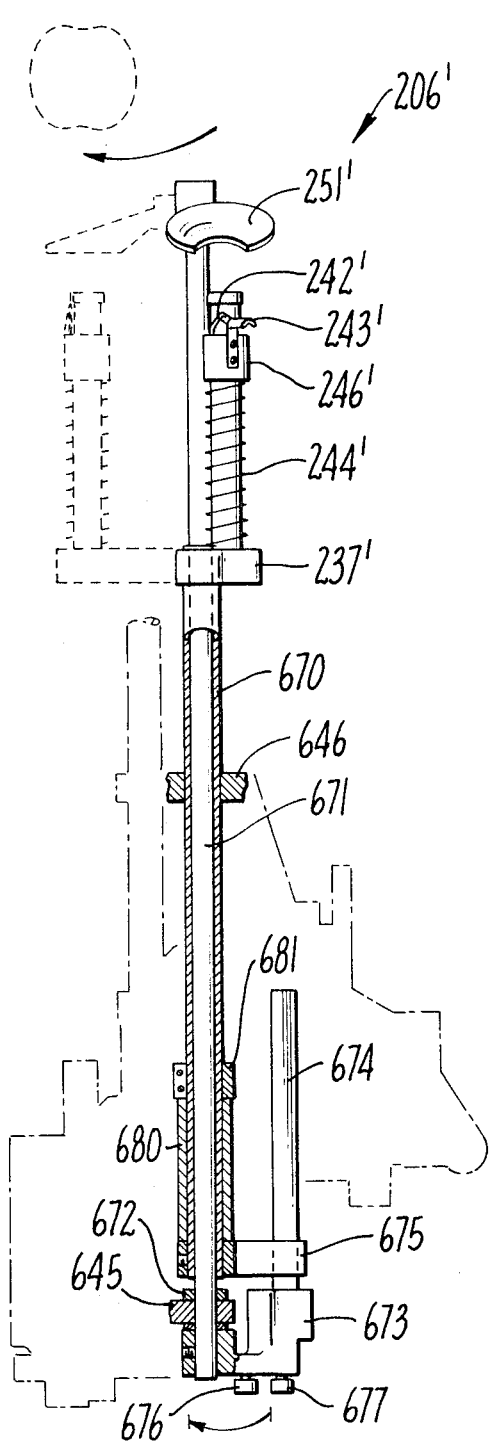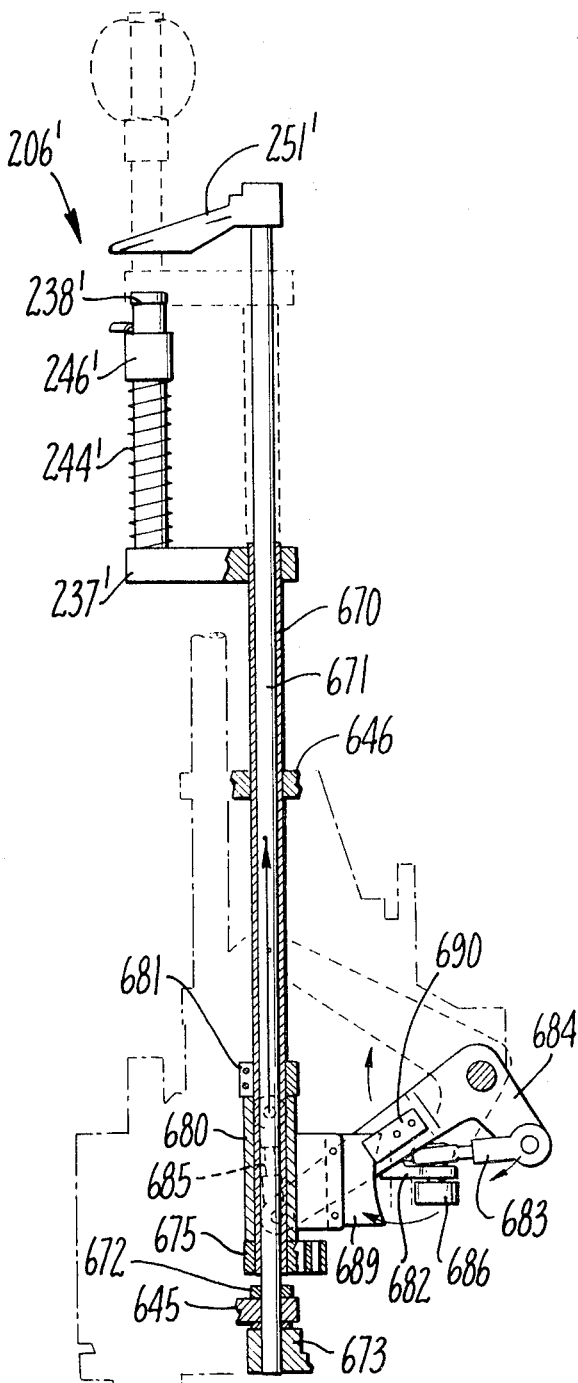
FIG.52.
FIG.53.

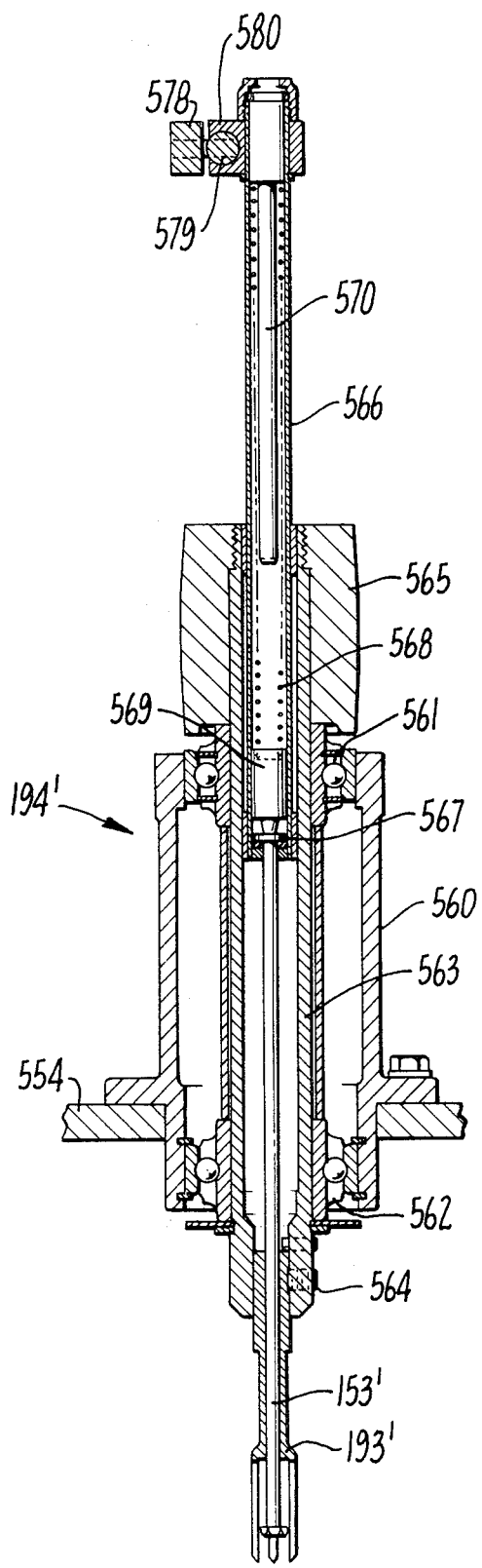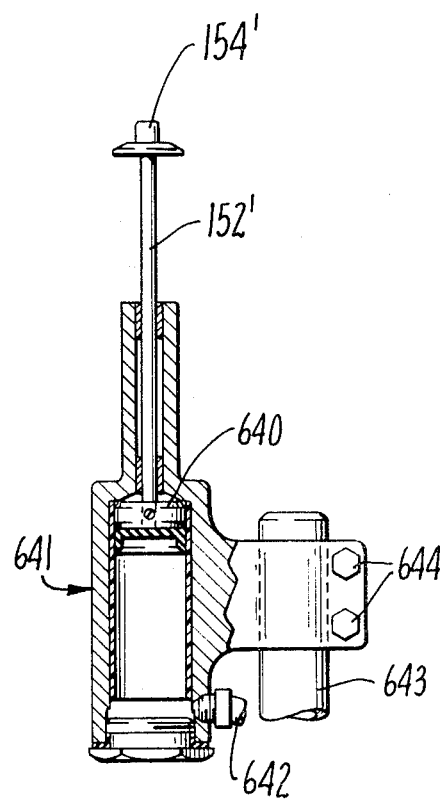
FIG. 54.
FIG. 55.

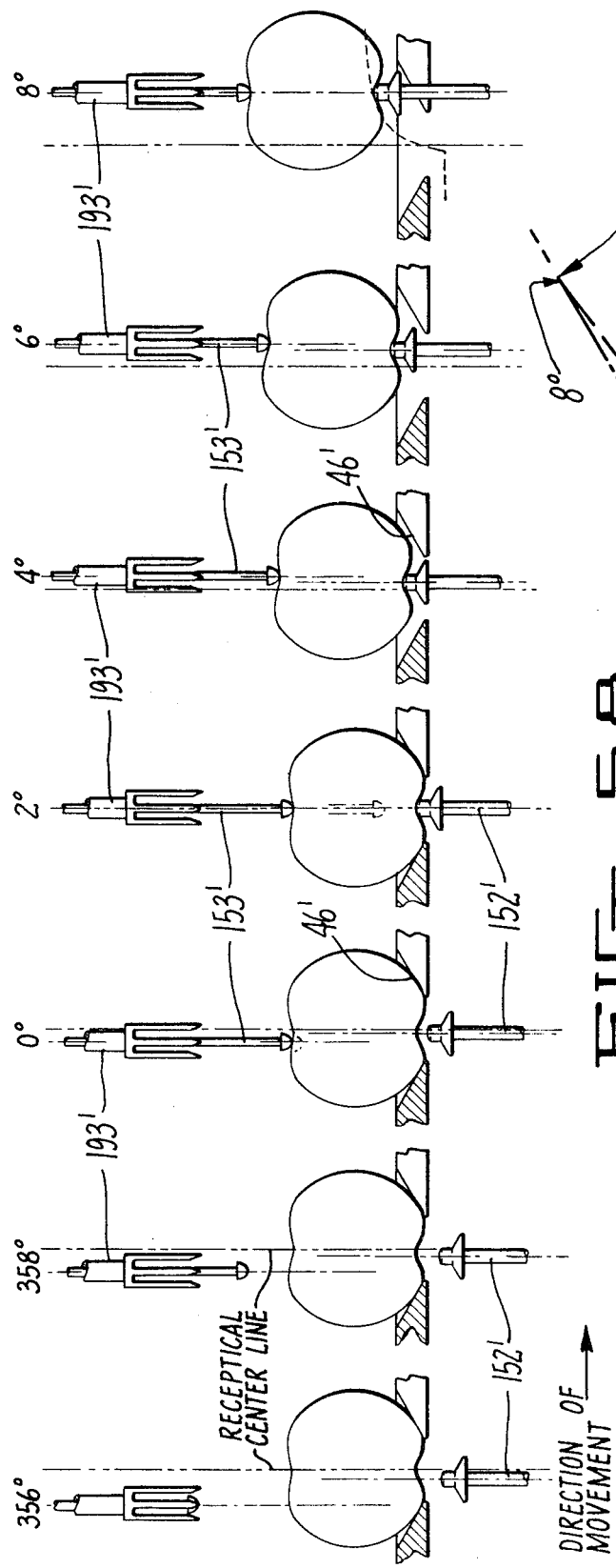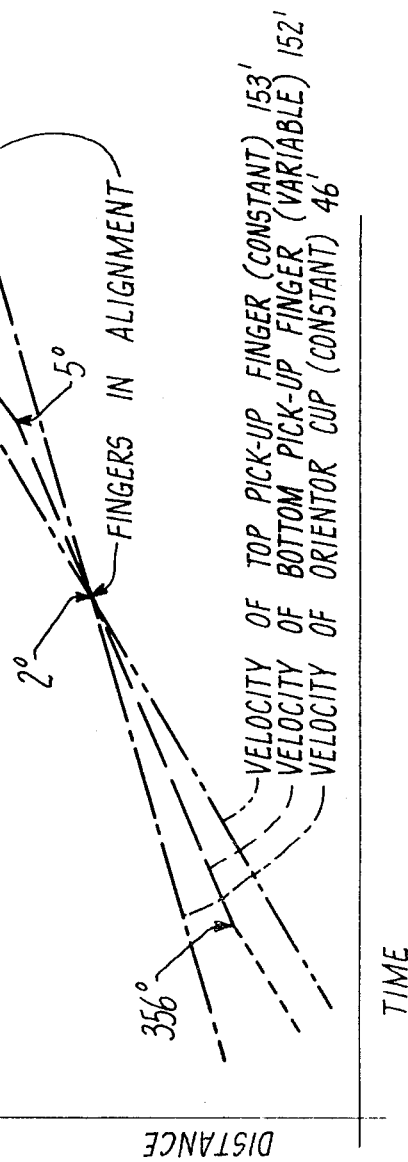

MACHINE FOR AUTOMATICALLY PEELING AND CORING APPLES FED FROM A BULK SUPPLY

This application is a continuation-in-part of application Ser. No. 629,600, filed Apr. 10, 1967, now abandoned.

FIELD OF THE INVENTION

Fruit-processing machinery which operates to provide cored and peeled apples continuously from a bulk supply wherein the apples may be positioned at random.

DESCRIPTION OF THE PRIOR ART

Apples have heretofore been generally fed by hand into peeling machines having a substantially conical cup. Each apple is located or positioned in the cup by sight and with reference to the upper visible indent of the apple. Thereafter the apple in the cup was impaled on a spindle which was then rotated to pass successive portions of the apple past a dead or still knife as to peel the apple. The core was removed during the peeling by a tubular knife passed axially through the apple. In some cases, the apples were mechanically fed and oriented prior to peeling but the orienting was always done by reference to only the outside surface and one indent of the apples rather than by reference to both indents.

Inasmuch as the apple peelers of the prior art have been largely hand fed, the success of their operation depends upon the operator and his ability to position the apple in a feeding receptacle with its stem blossom axis vertically aligned. This is especially true since the accuracy of positioning the apple may determine the completeness with which the stem and blossom cavities are removed, thereby limiting the amount of hand trimming required. But also—and since many of the apples used for canning are so imperfectly shaped as to be unsuitable for the fresh fruit market—the stem-blossom axis is frequently located eccentrically relative to the outside surface of the apple. Thus, locating the apple by reference to the outside surface of the apple may result in an imperfect alignment so far as the subsequent coring operation is concerned. Also, in many instances the peeling and coring machines of the prior art would fail to remove the blossom end of the apple. If this was not observed during inspection and thereafter removed by hand trimming, the blossom end found its way into the final product where it presented an unsightly appearance. The same problems have been encountered even when the peelers were fed mechanically by an orientor since here also the apples were located by reference to the outside surface of the apples and, at best, by one indent.

STATEMENT OF OBJECTS

It is one principal object of this invention to provide a continuous machine which impales the apple for peeling and coring while it is held by the stem and blossom indents so that the impaling is on their common axis.

Another object of the present invention is to provide a machine which operates continuously and is fully automatic, that is, it feeds, orients, peels and cores without the assistance of an operator.

Another object is to provide a machine wherein the stem-blossom axis of each piece of fruit is located, and the fruit is oriented with reference thereto, in two steps. The first step or primary orientation is by reference to the outside and one indent, and the second step perfects the orientation by reference to both indents independently of the outside surface of the fruit.

Another object of the invention is to provide a machine which will reject improperly oriented apples before any peeling operation has commenced.

Another object is to provide a machine which will peel with a minimum of waste.

Another object of the present invention is to provide a machine in which the pressure under which the peeling cutter is held against the fruit can be adjusted while the machine is operating.

Another object is to provide a machine which peels with one or more rotary cutters to minimize the torque which must be transmitted through the apple during peeling and so enables softer fruit to be handled successfully.

Another object of the present invention is to provide a machine in which the core removed is of a minimum diameter because of the reduced torque which must be transmitted through the fruit.

Another object is to provide a machine which operates continuously with a throughput speed greatly in excess of the speeds possible with present hand-fed machines.

Another object of the present invention is to provide a machine of the kind described for peeling and coring apples and comprising a primary orienting table having a plurality of apple receptacles which are rotated past a pickup station, and a peeling and coring turret having a plurality of spindles and pickoff devices which are moved synchronously with the apple receptacles and capable of picking up an apple held in one of the receptacles at the pickup station, impaling the apple upon a spindle, and peeling and coring the apple—all within one rotation of the turret.

A still further object is to provide a peeling turret having a plurality of members for engaging the indent of apples supported on a rotating orienting table, and means for moving each member counter to the direction of turret rotation for a brief period while they are engaging the indent of an oriented apple, thereby allowing said turret to be used with a much slower moving orienting table and increasing the amount of time available for engaging the indent of an apple and lifting the apple from the table.

A still further object of this invention is to provide a turret type of machine for peeling and coring apples and having mechanisms that may be adjusted for processing apples of various sizes to maximize recovery and yet produce a high quality of processed fruit.

Another object is to provide an apparatus of the kind described for peeling and coring apples on a turret and having lifting mechanisms for separately actuating a lower indent member and a coring tube so that each device may be operated with precise timing and independently of the other.

Another object is to provide a machine of the kind described for peeling and coring apples and having means for simultaneously adjusting the vertical position of a plurality of forks relative to a peeling head to accommodate apples of different sizes, each fork providing the main support for an apple during its processing.

Another object of the invention is to provide a machine of the kind described for peeling and coring apples which may be operated for long periods of time without adjustment and with a minimum of downtime for the replacement of worn cutters.

Other objects of this invention will become apparent in view of the following detailed description.

A BRIEF DESCRIPTION OF THE DRAWINGS

In the drawings accompanying and forming a part hereof:

FIGS. 1 through 31 illustrate a first embodiment of this invention wherein

FIG. 1 is a side elevation showing a portion of the feeding mechanism and the primary orienting, peeling an coring mechanisms;

FIG. 2 is a schematic view and flow diagram showing the flow of apples through the machine from a bulk supply to the condition of a peeled and cored fruit;

FIG. 3 is a section taken along the lines 3-3 of FIG. 1 showing the feeding mechanism, a plan view of the primary orienting mechanism, and a portion of the peeling mechanism;

FIG. 4 is a plan view of a portion of the primary orienting mechanism with some parts thereof broken away for purposes of illustration;

FIG. 5 is a section taken along the lines 5-5 of FIG. 4;

FIG. 6 is a section taken along the lines 6-6 of FIG. 4;

FIG. 7 is a section taken along the lines 7-7 of FIG. 4;

Figure 12:
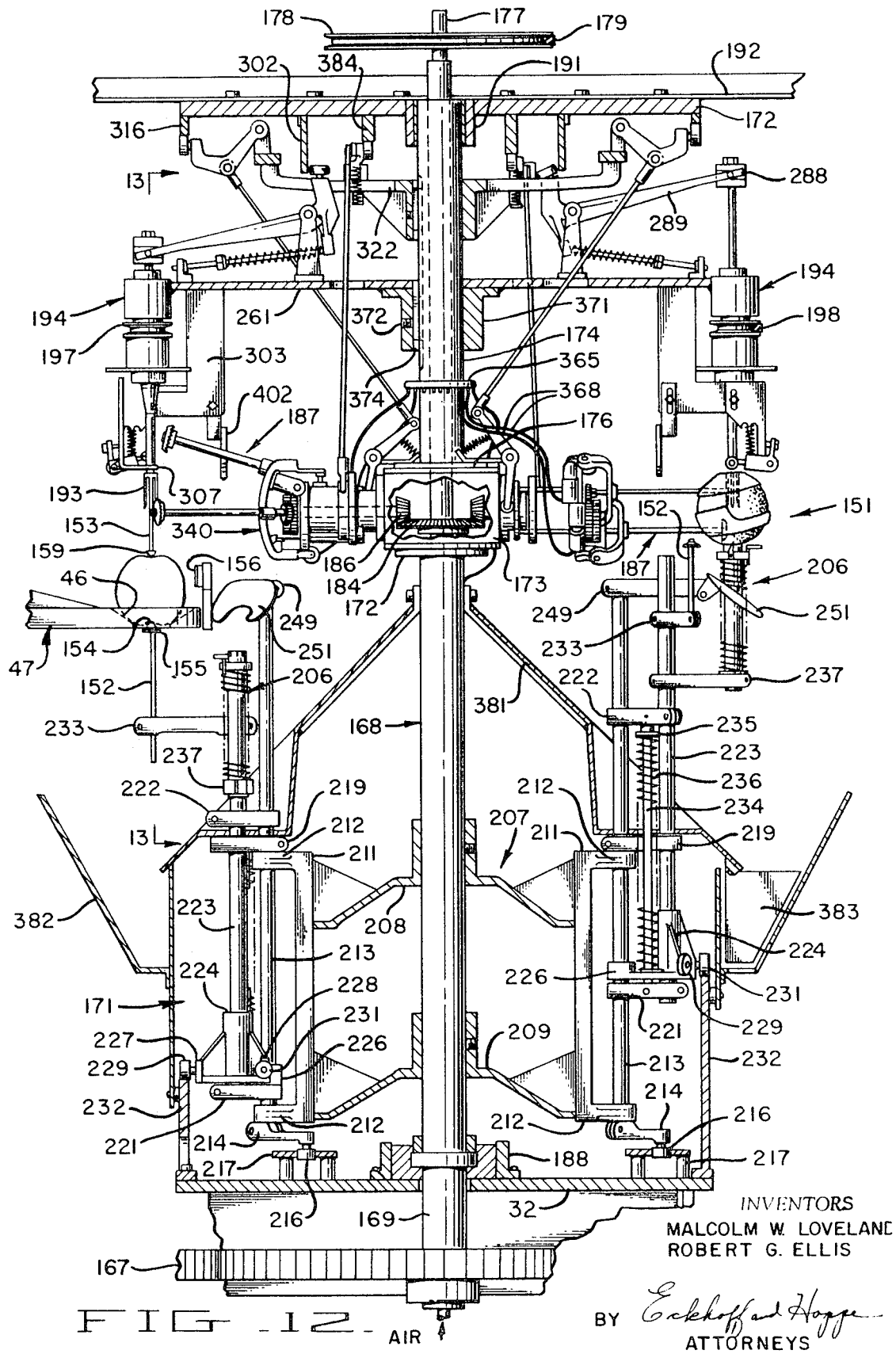
Figure 23:
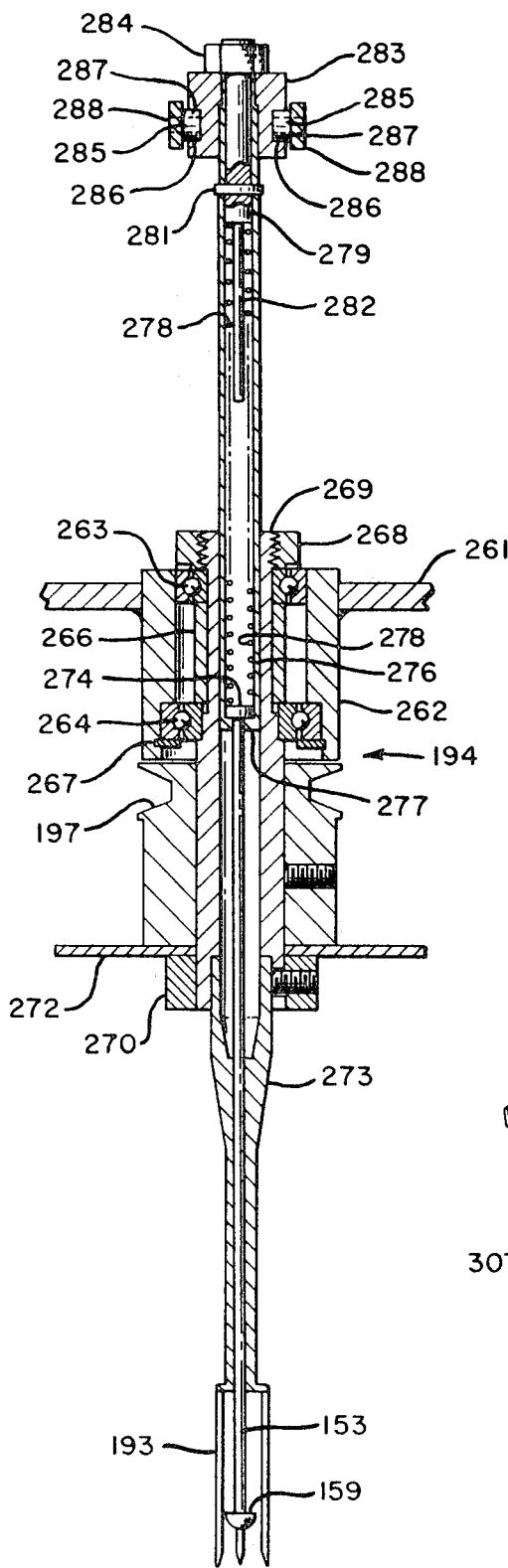
Figure 24:
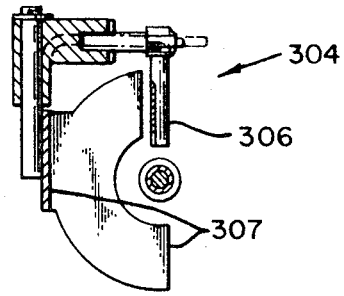
Figure 25:
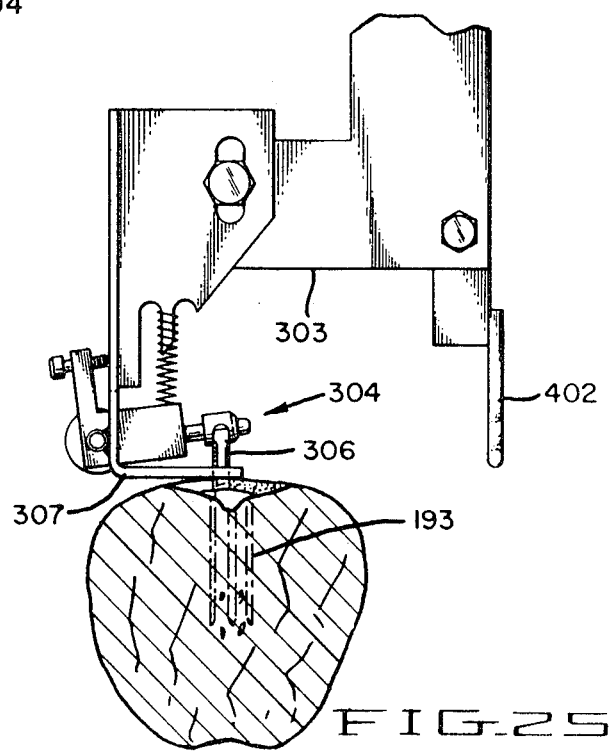
Figure 26:
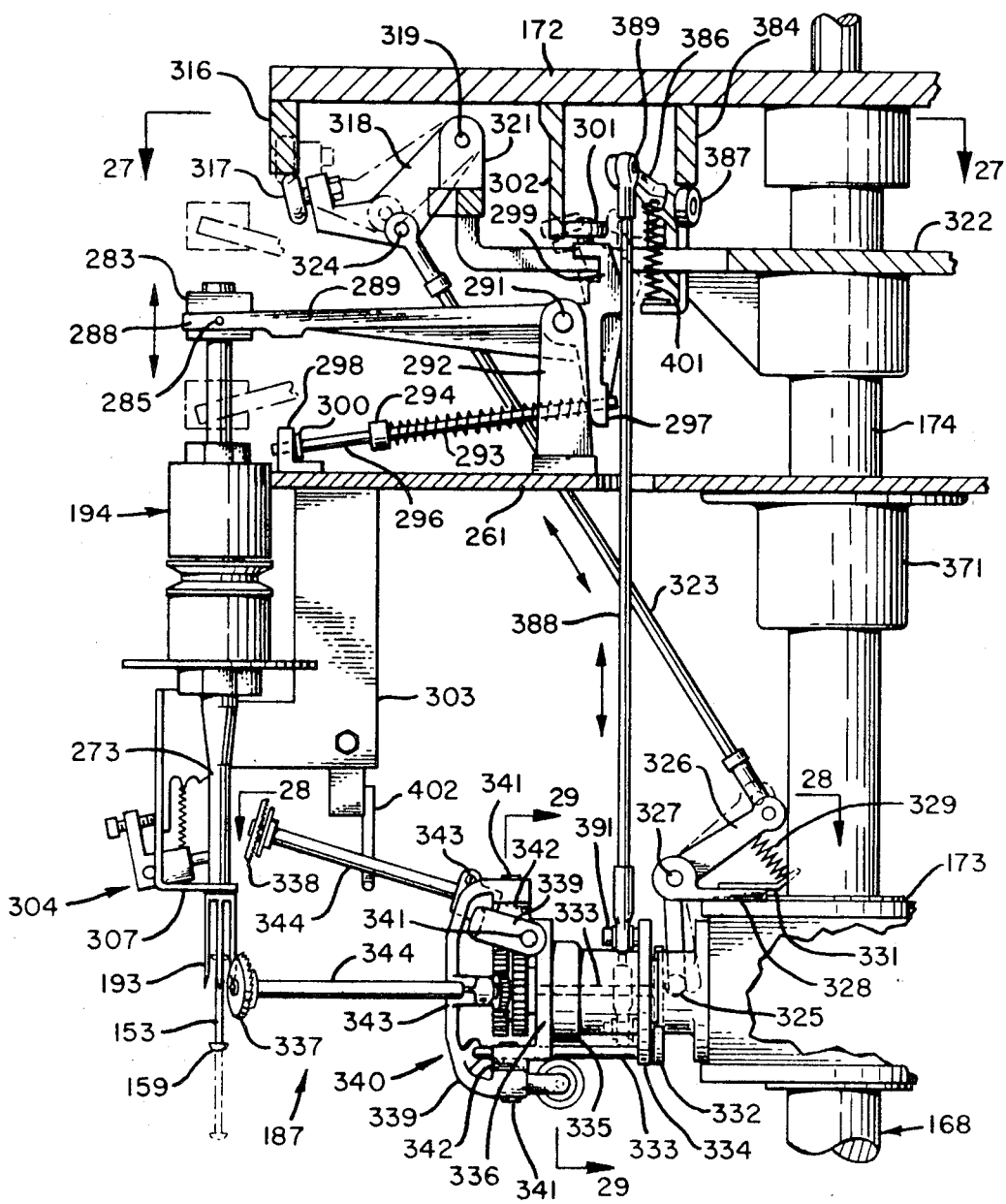
Figure 27:
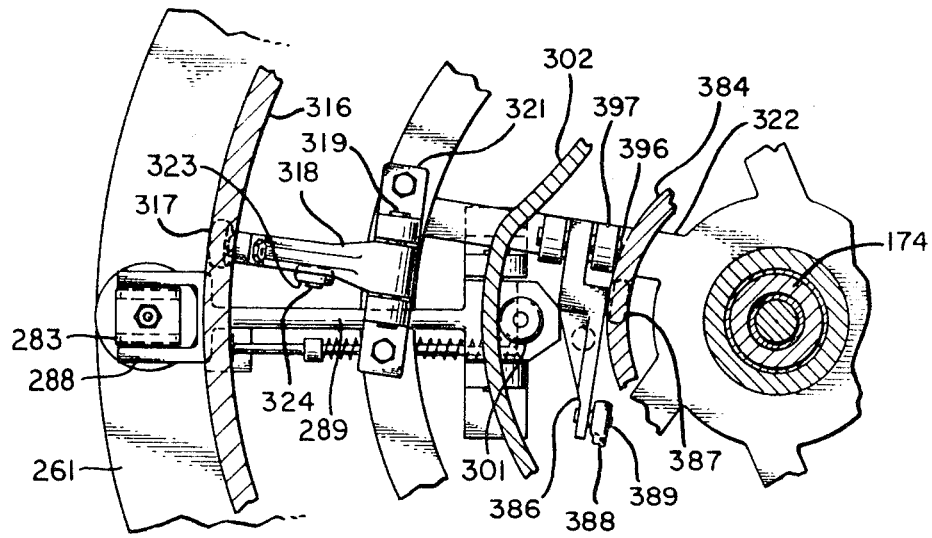
Figure 28:
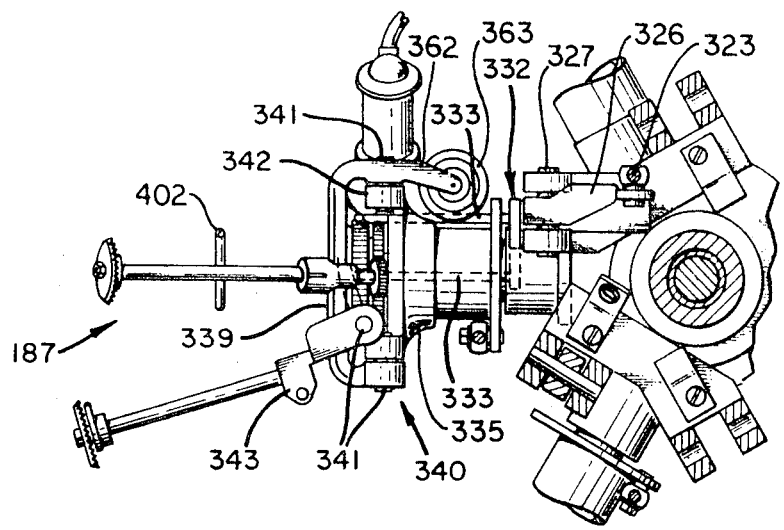
Figure 29:
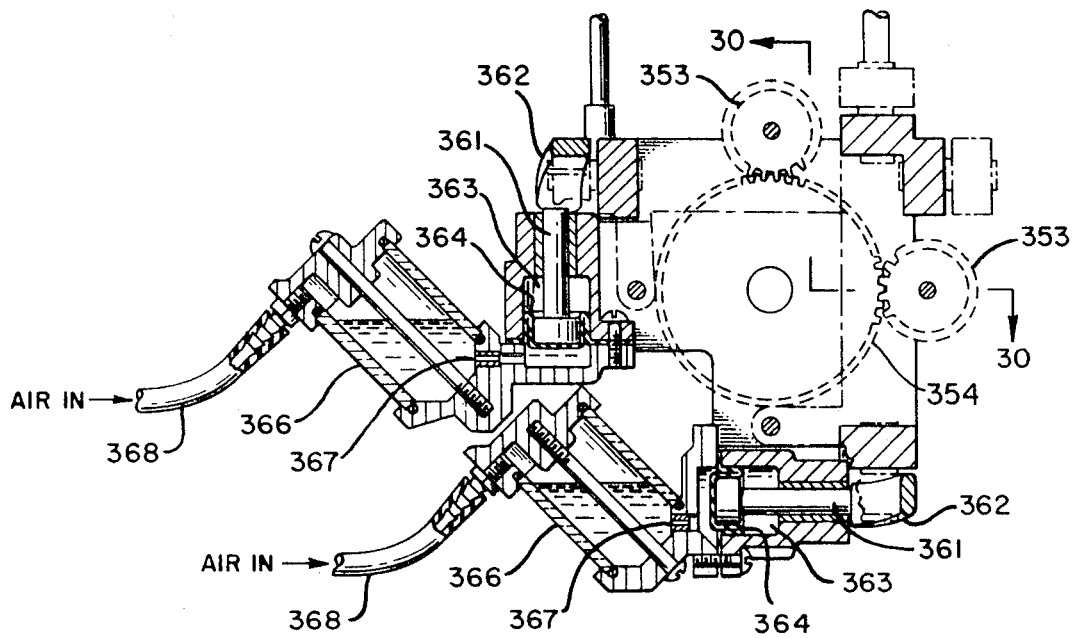
Figure 30:
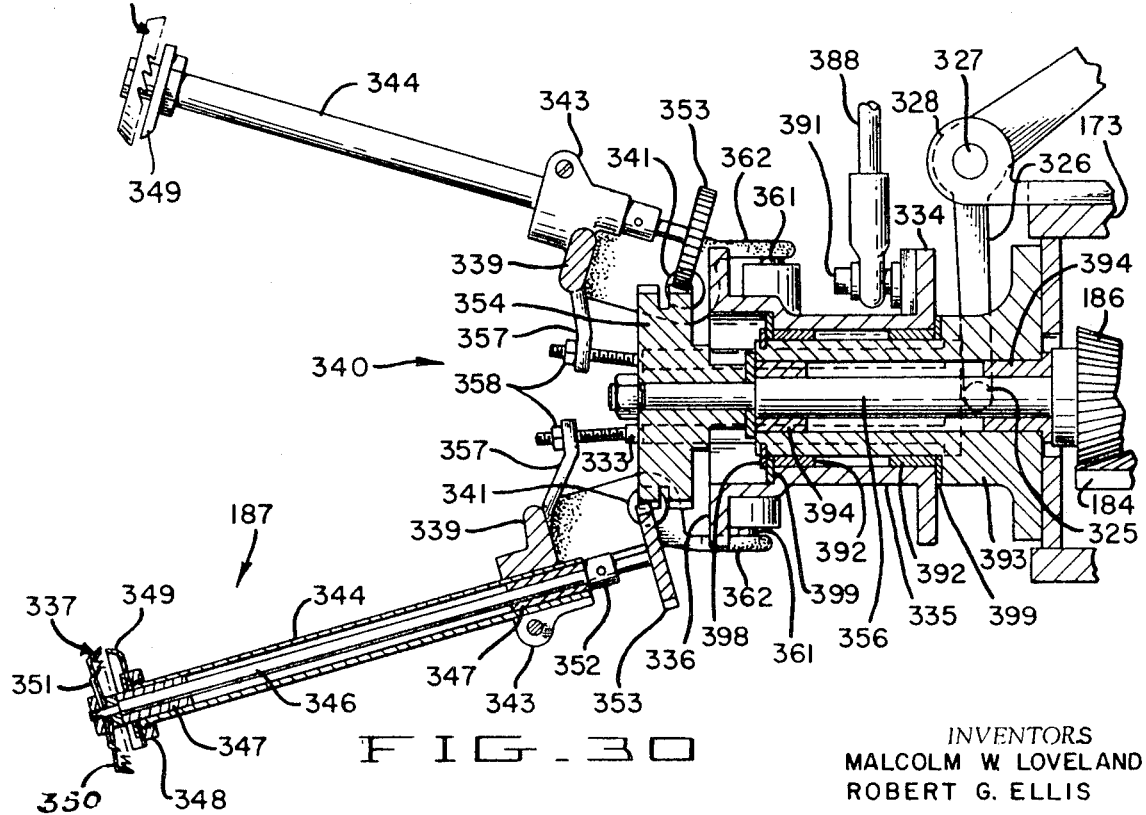
Figure 31:
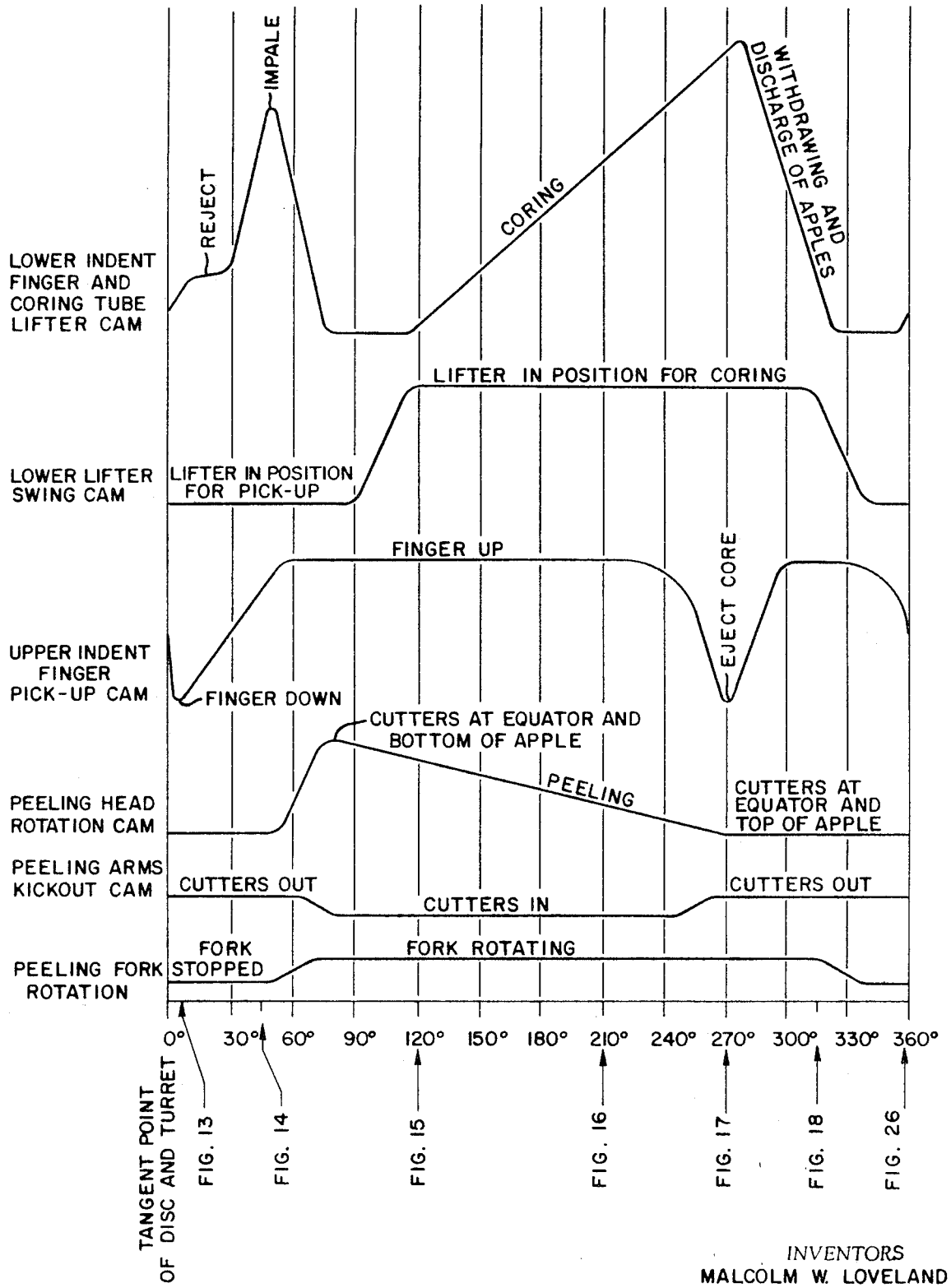
Figure 32:
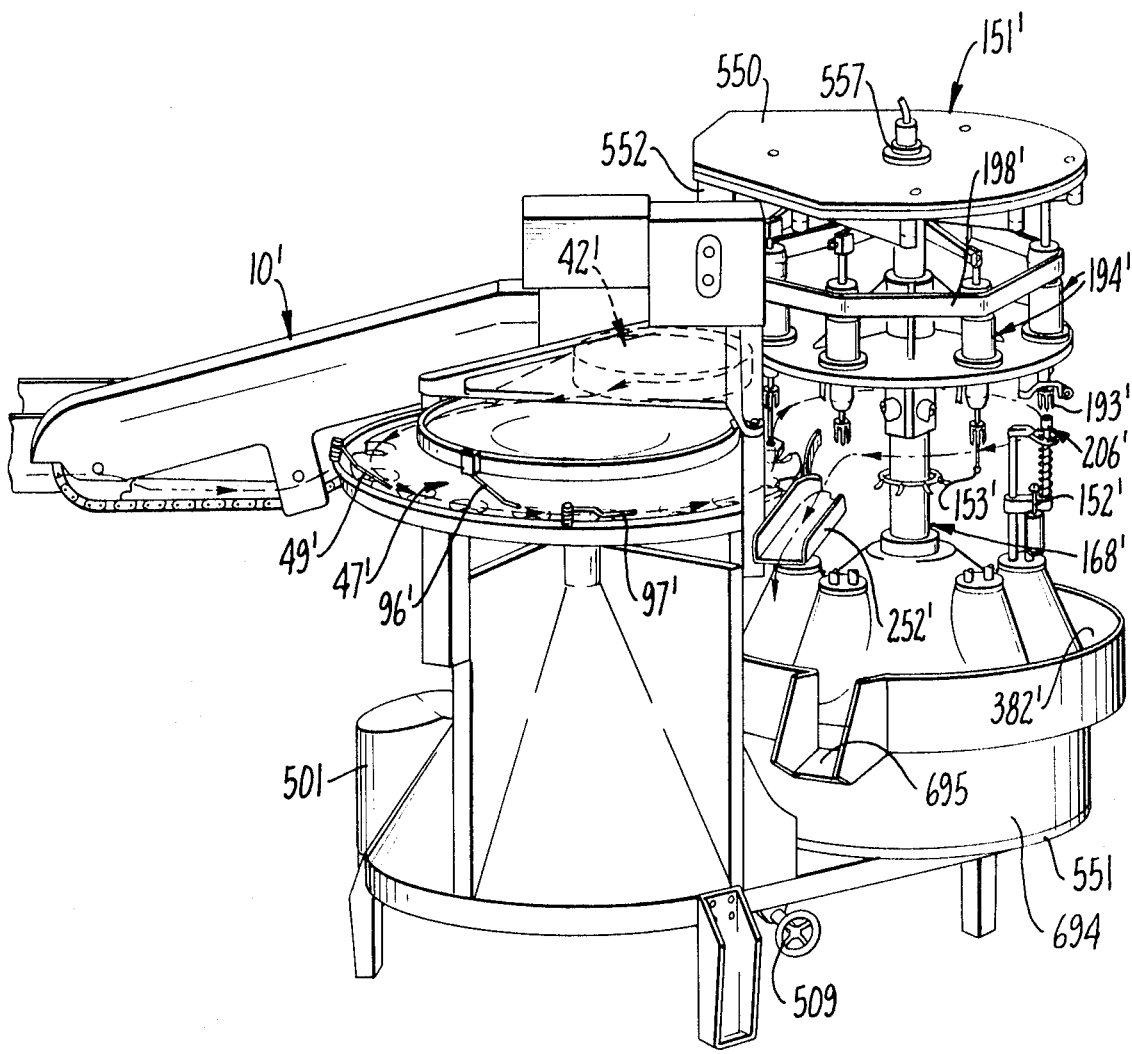
Figure 33:
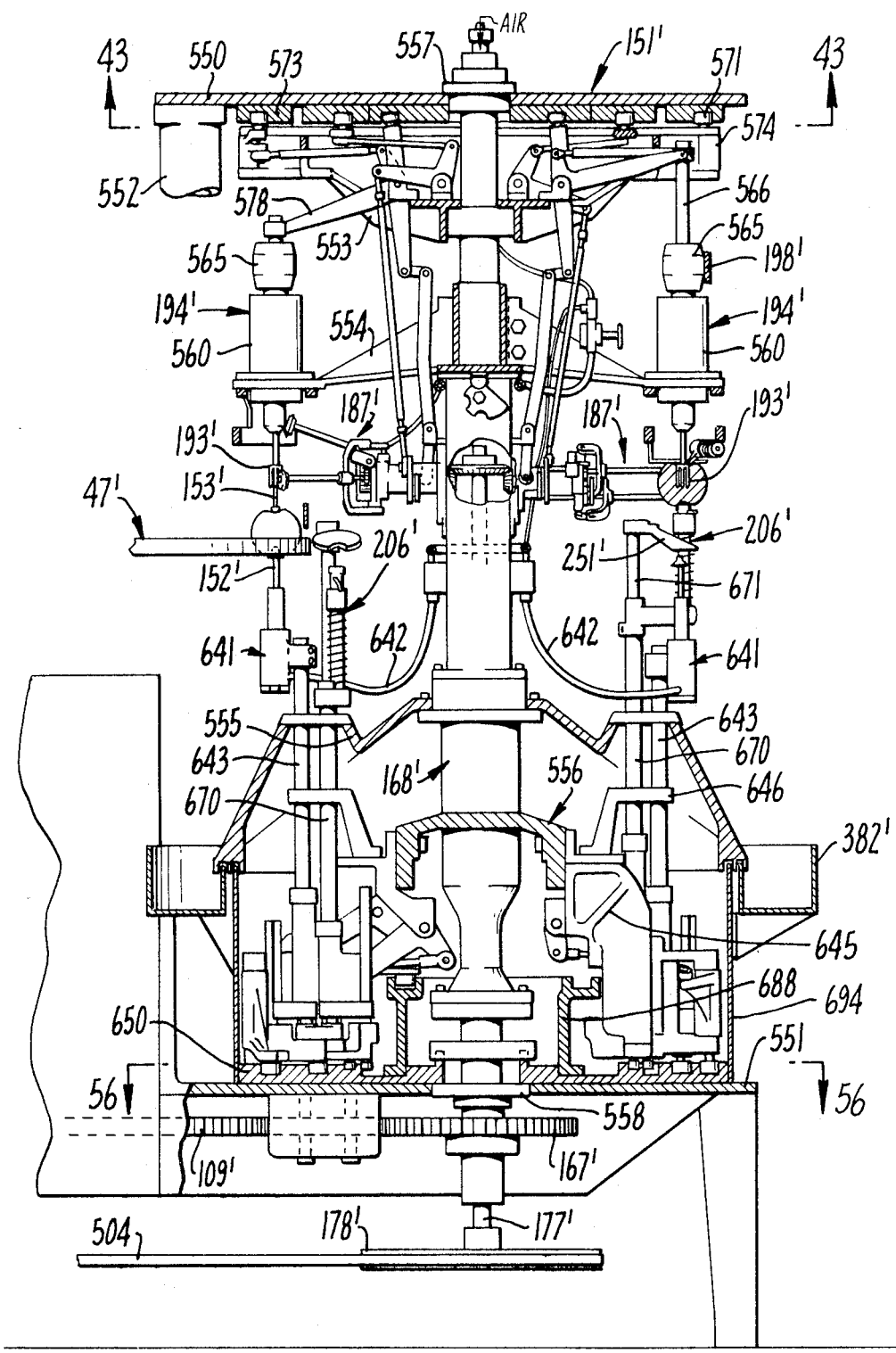
Figure 34:
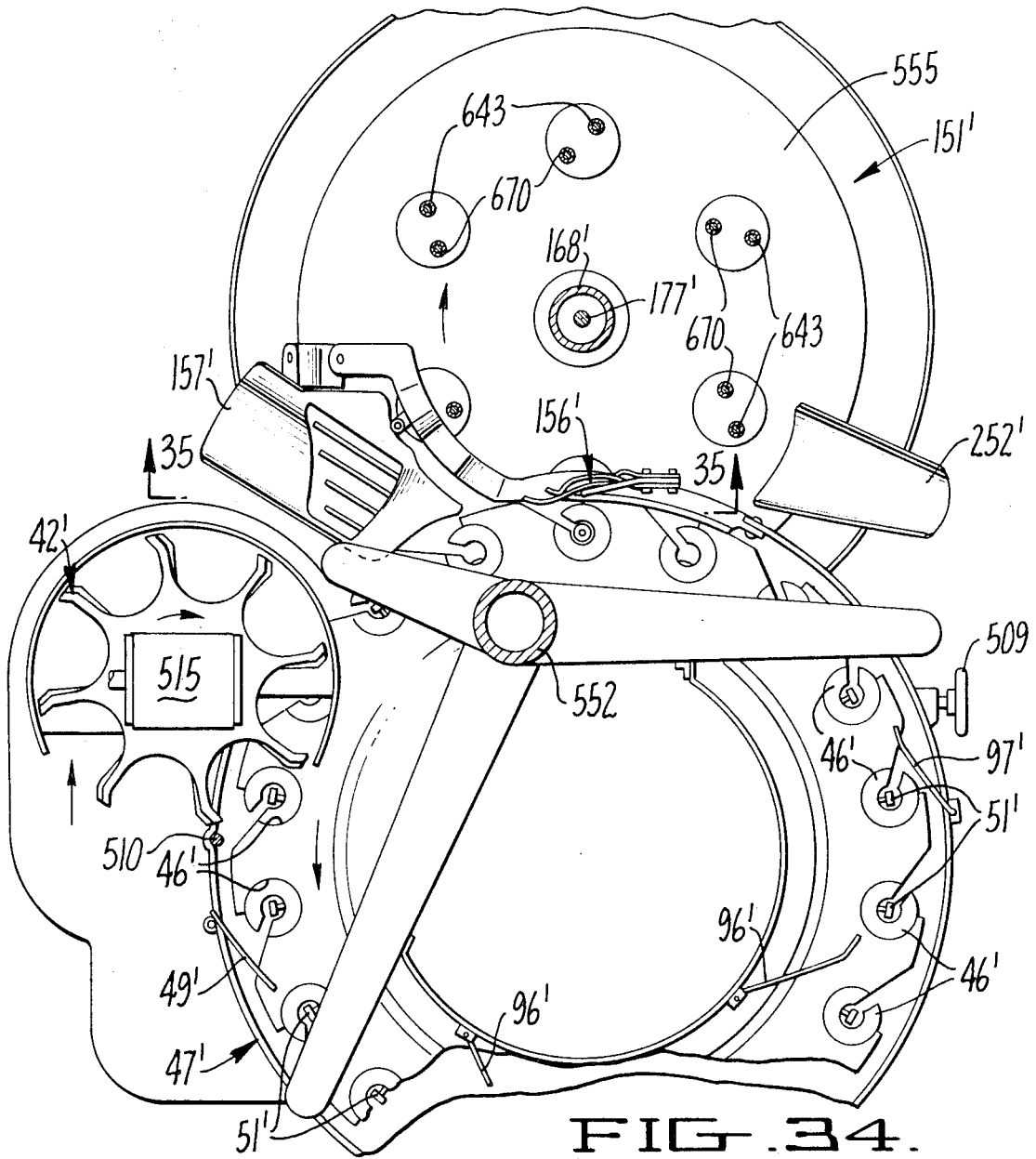
Figure 35:
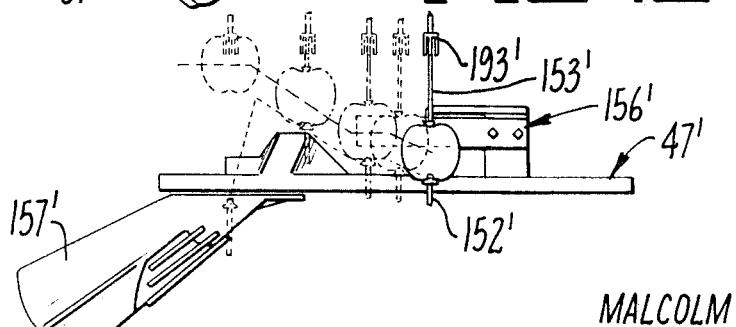
Figure 36:
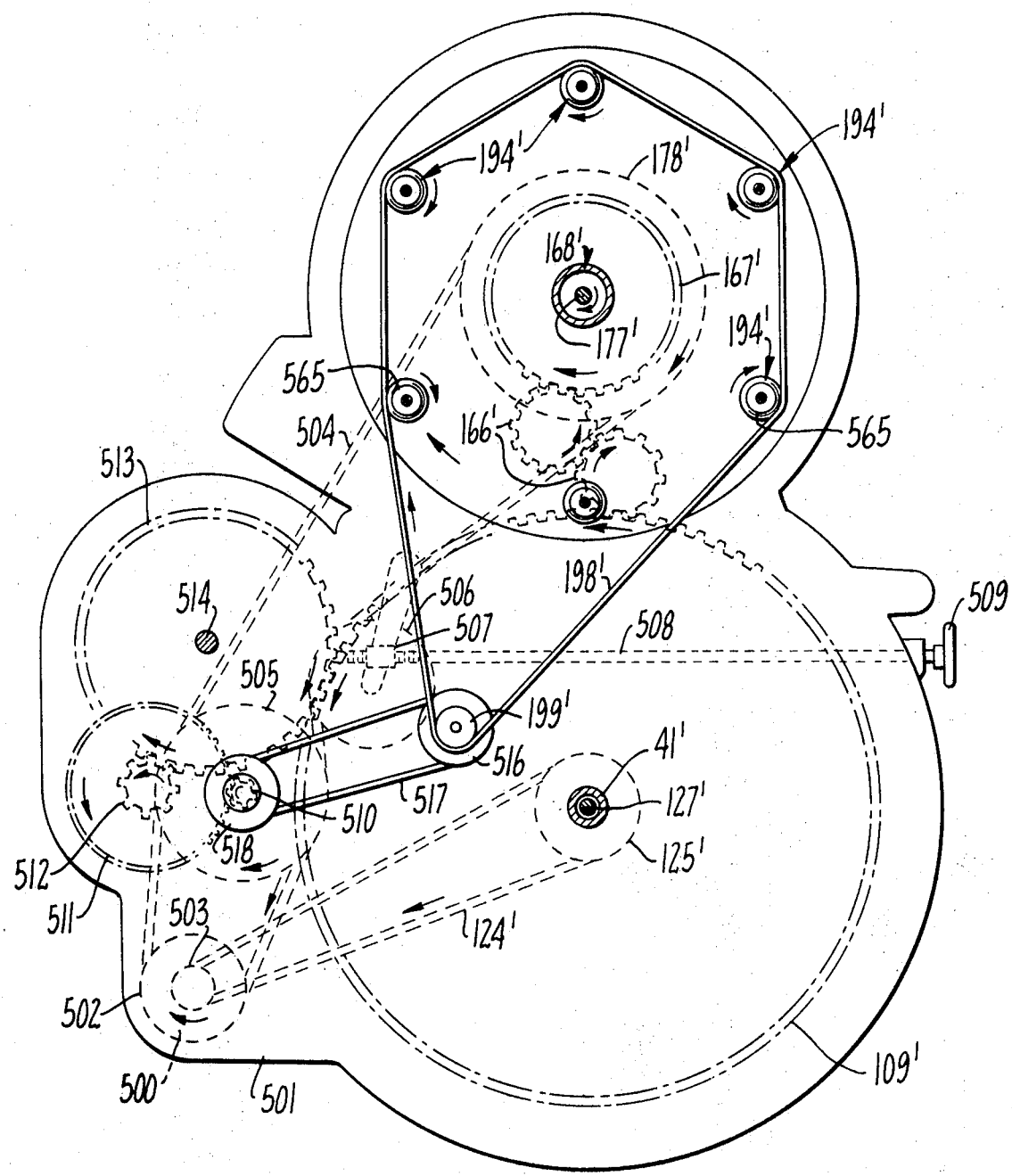
Figure 37:
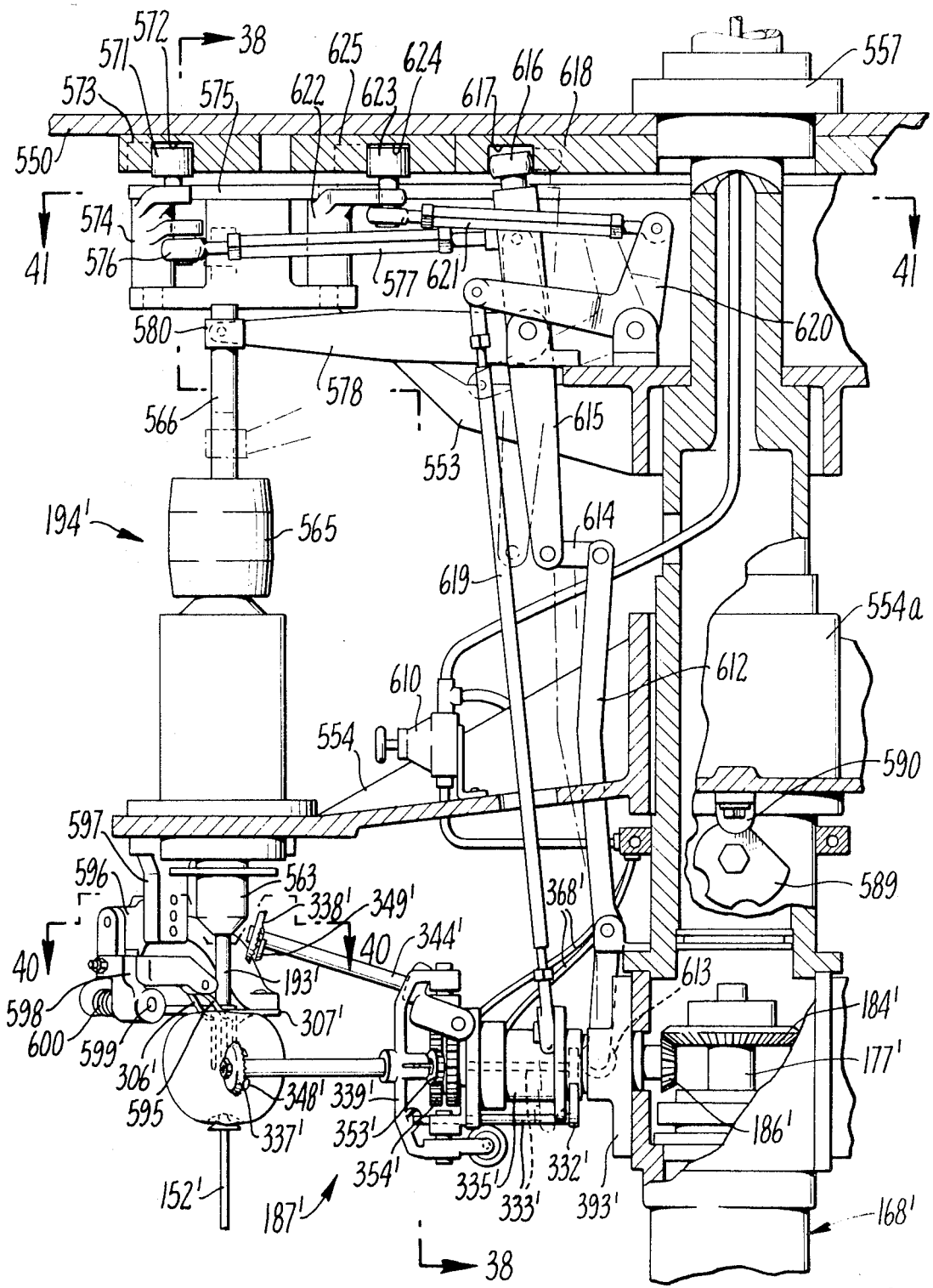
Figure 41:
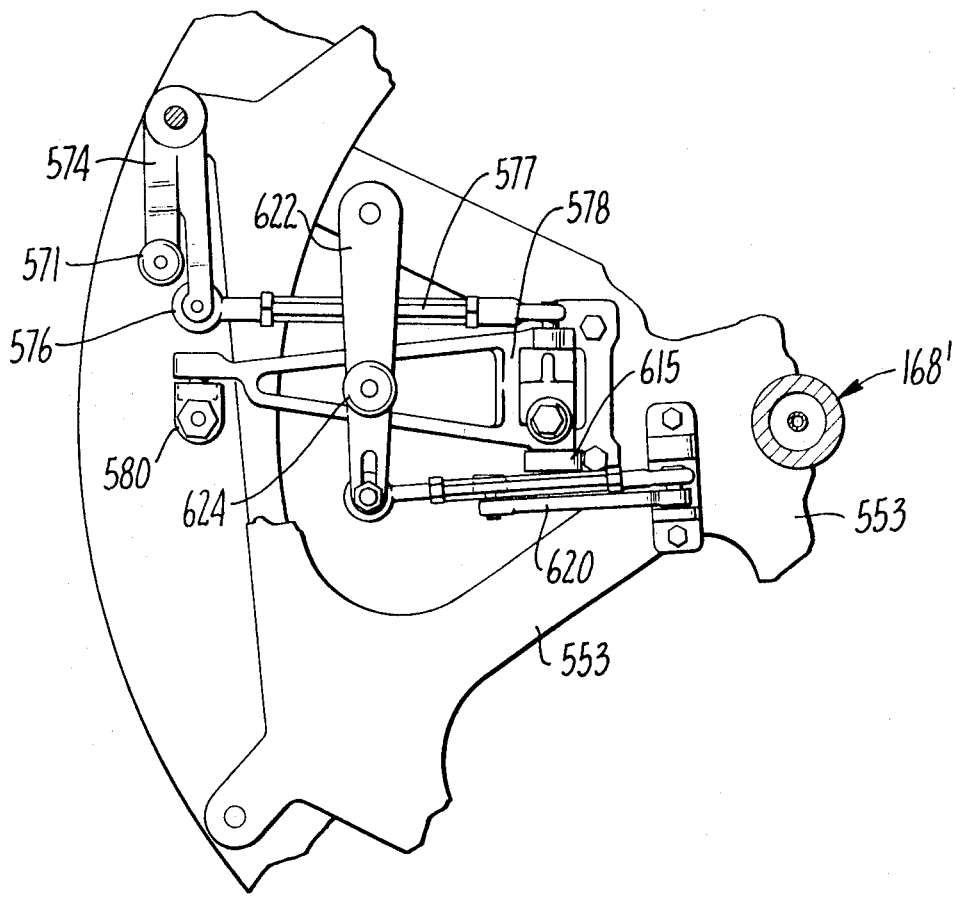
Figure 42:
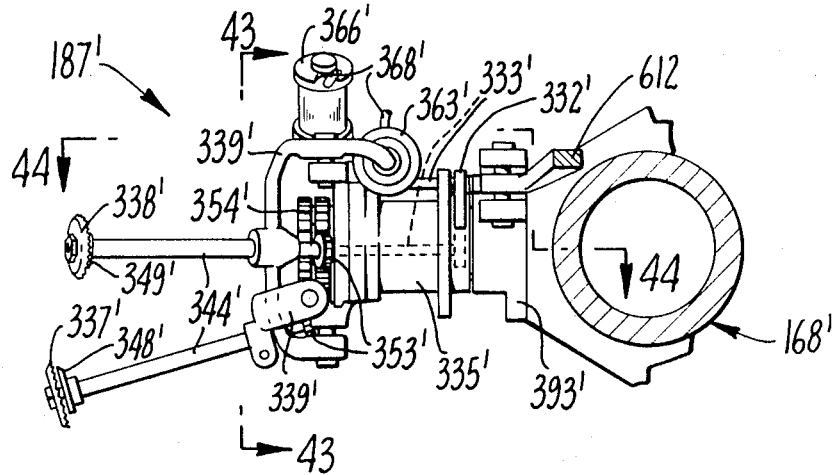
Figure 44:
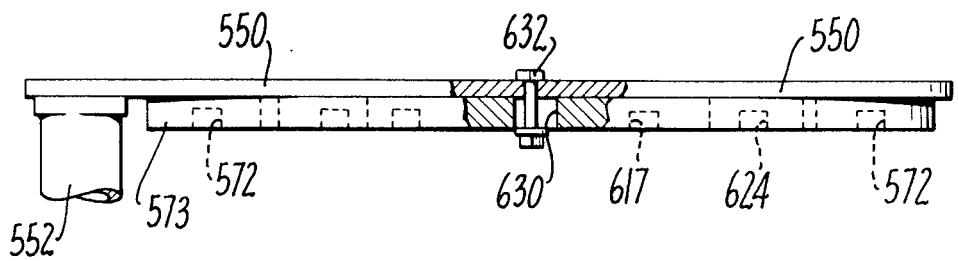
Figure 43:
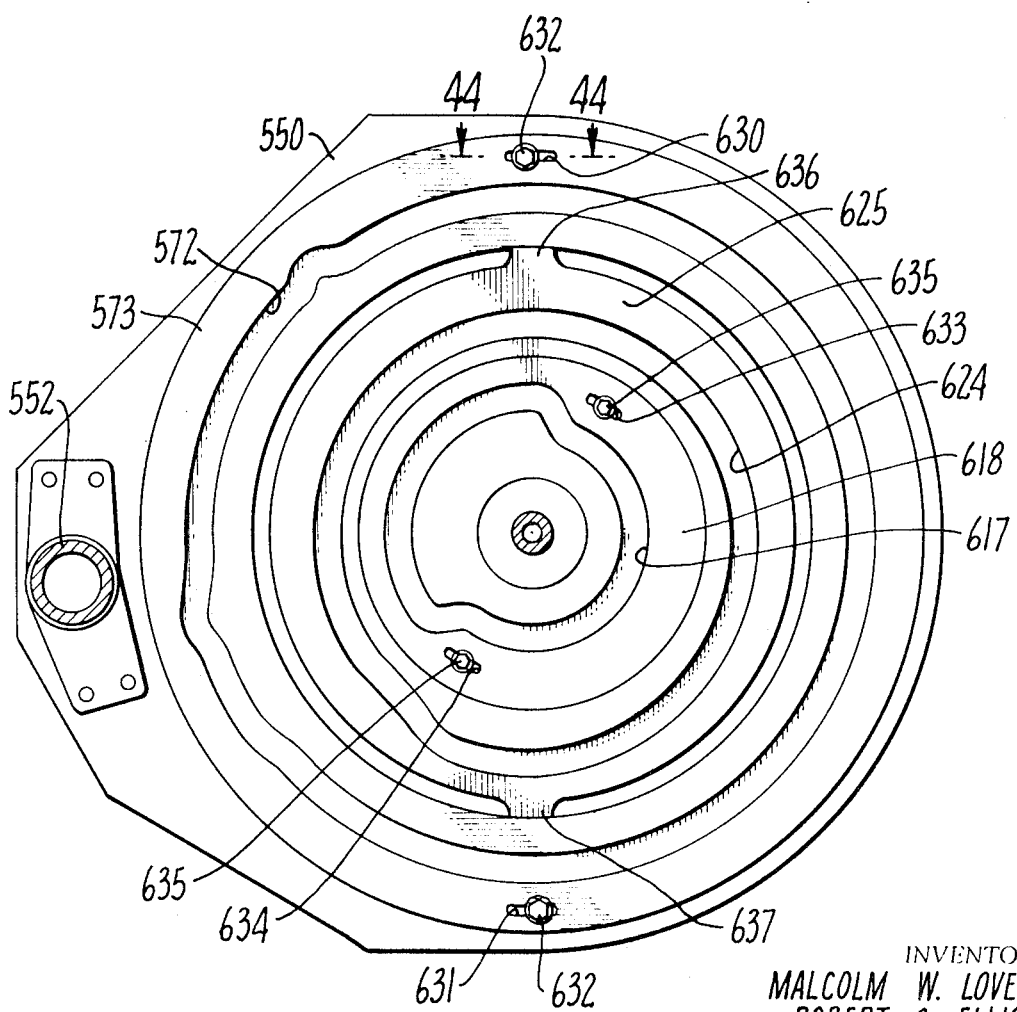
Figure 47:
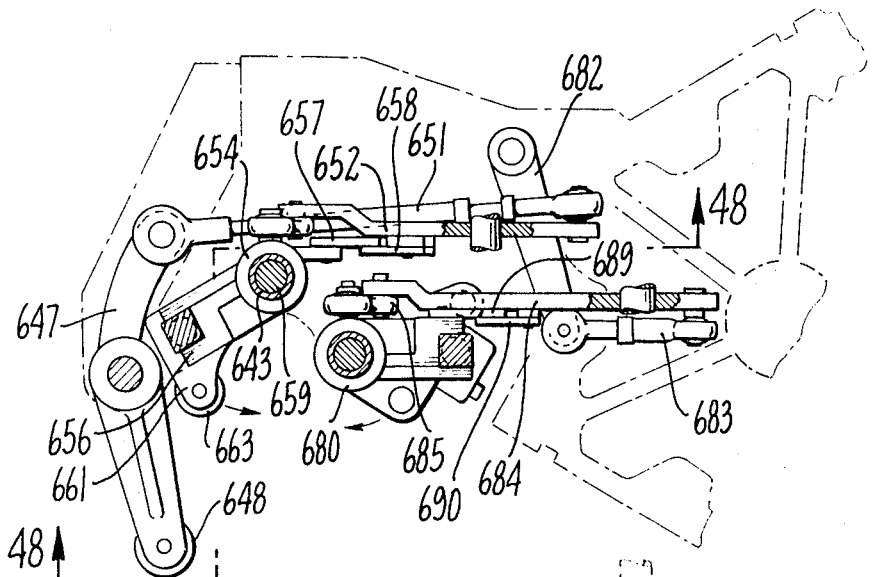
Figure 48:
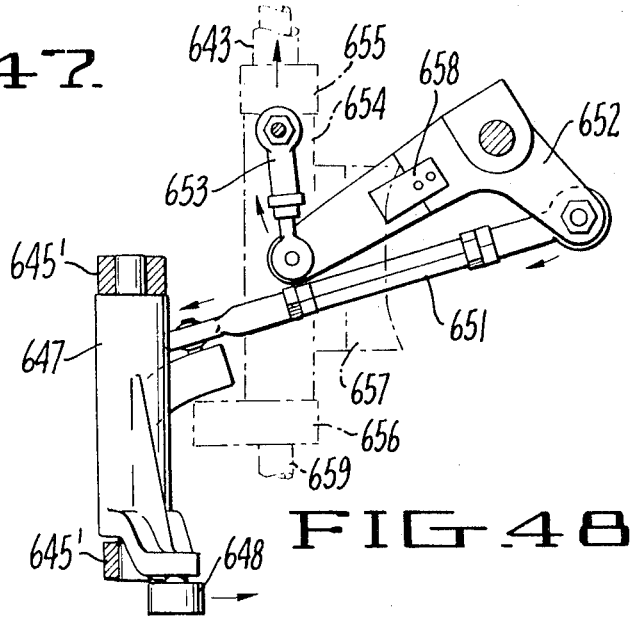
Figure 49:
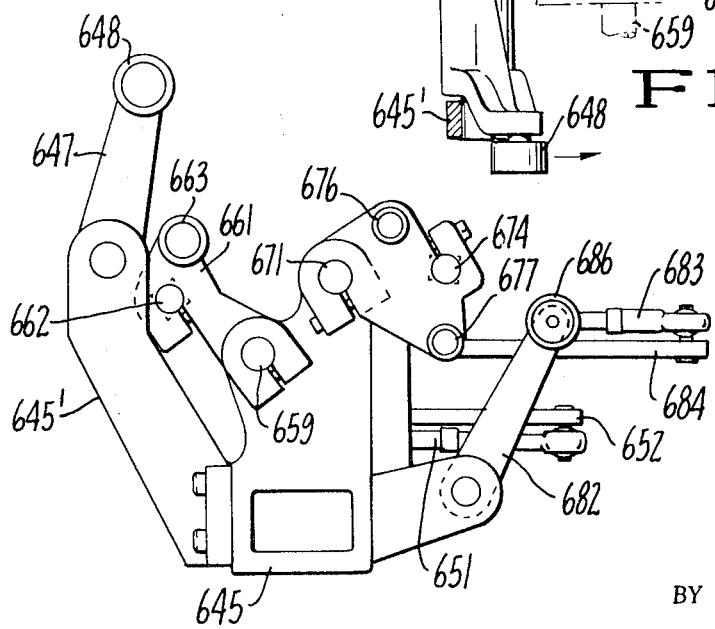
Figure 50:
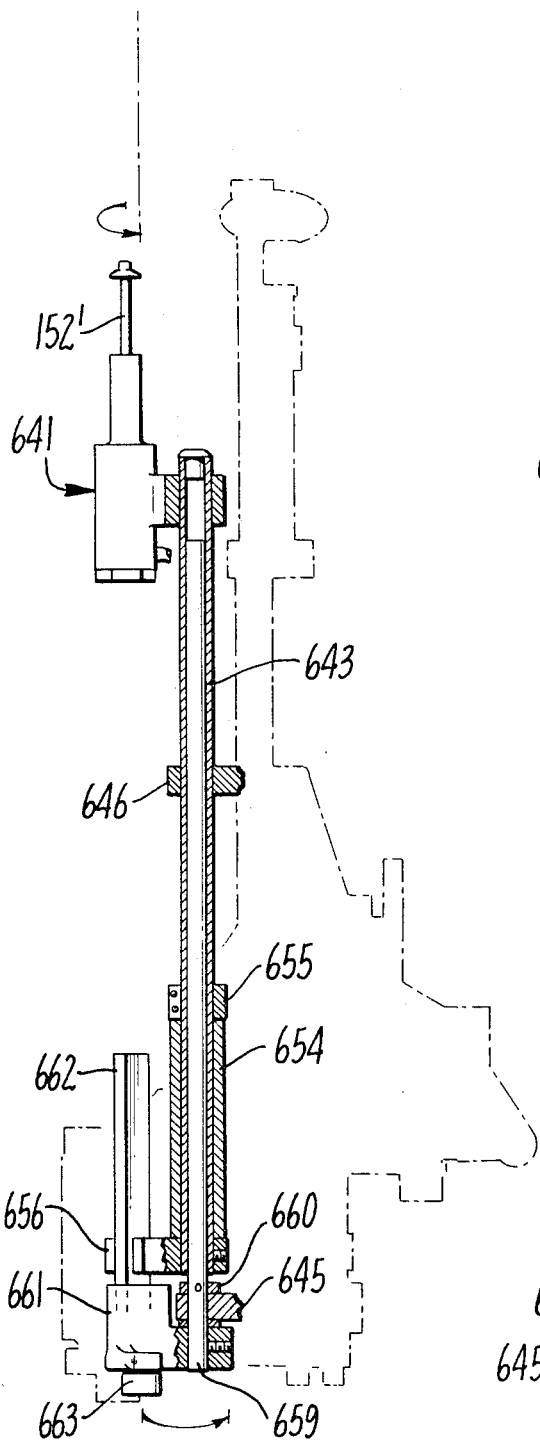
Figure 51:
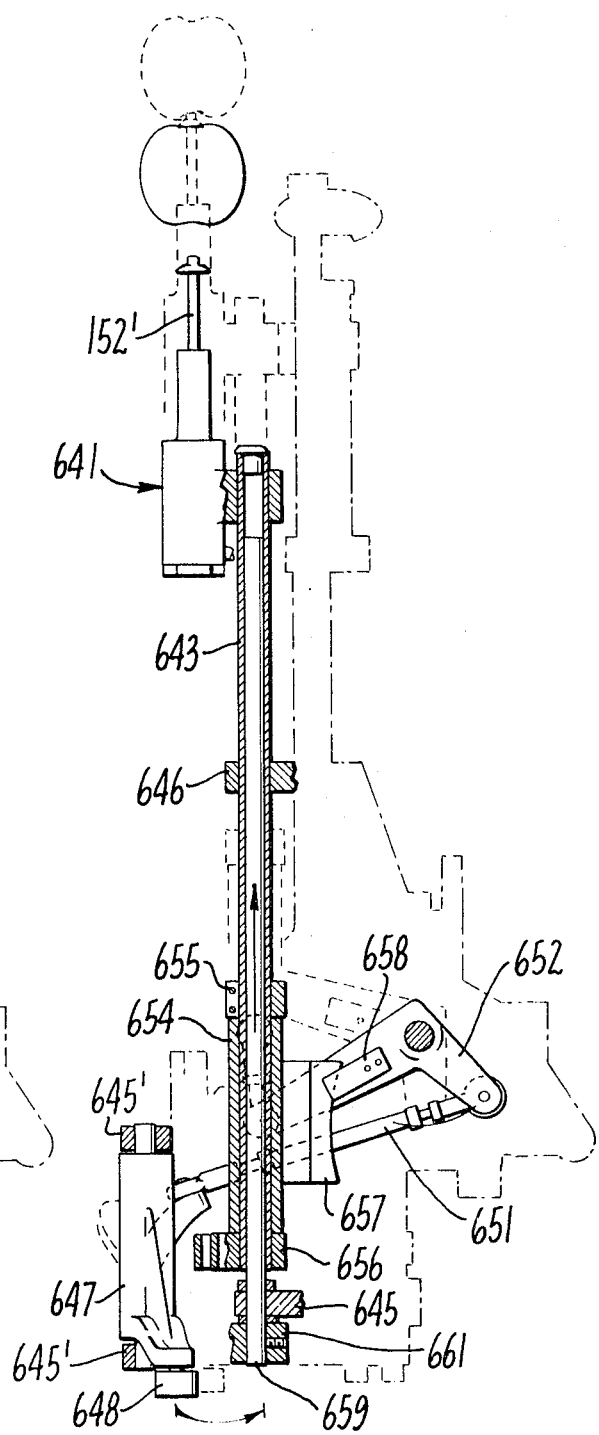
Figure 56:
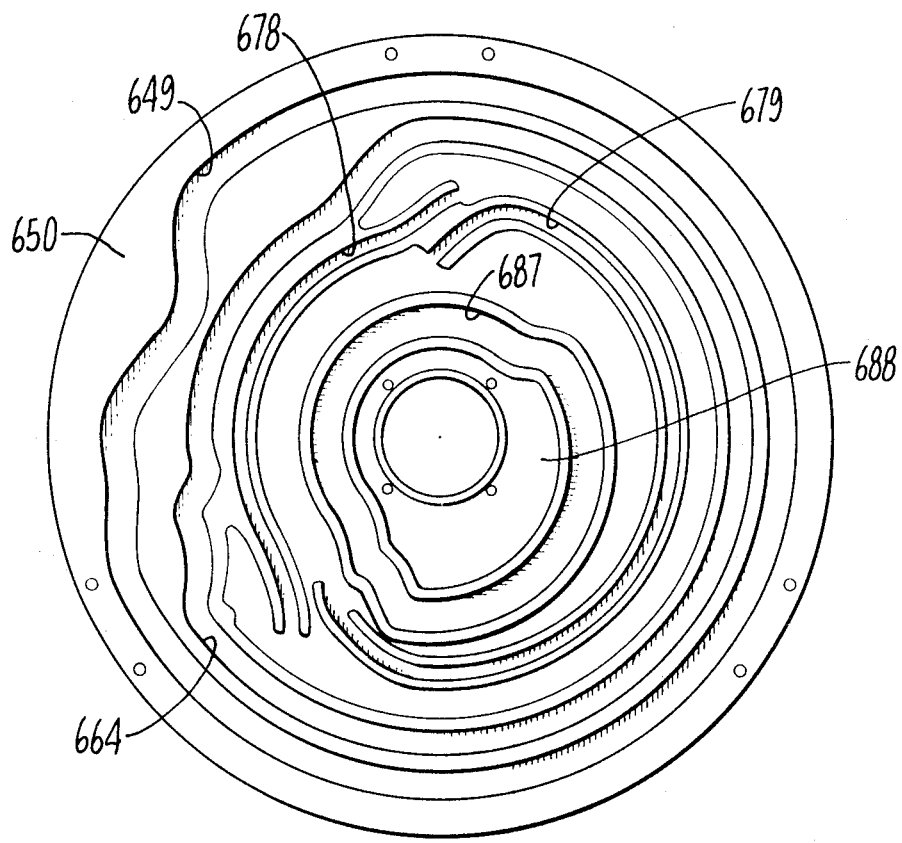
Figure 57:
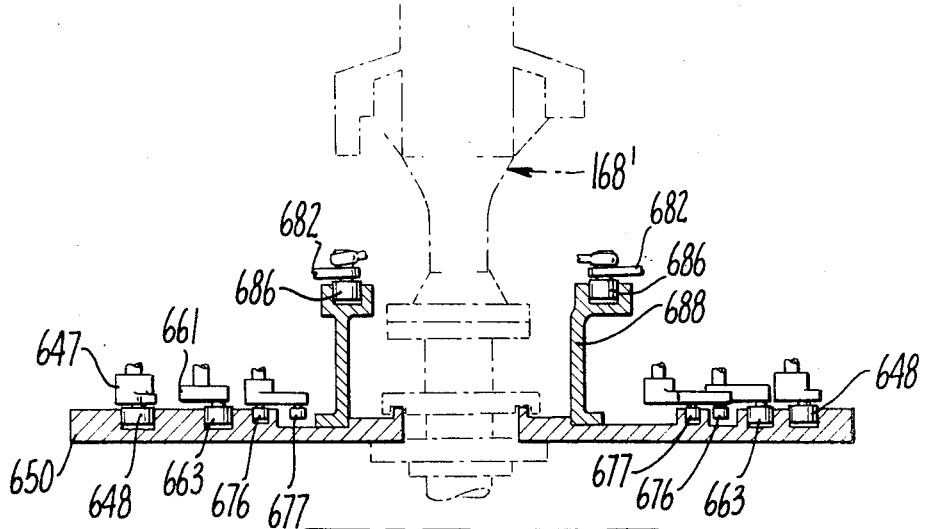
Figure 60:
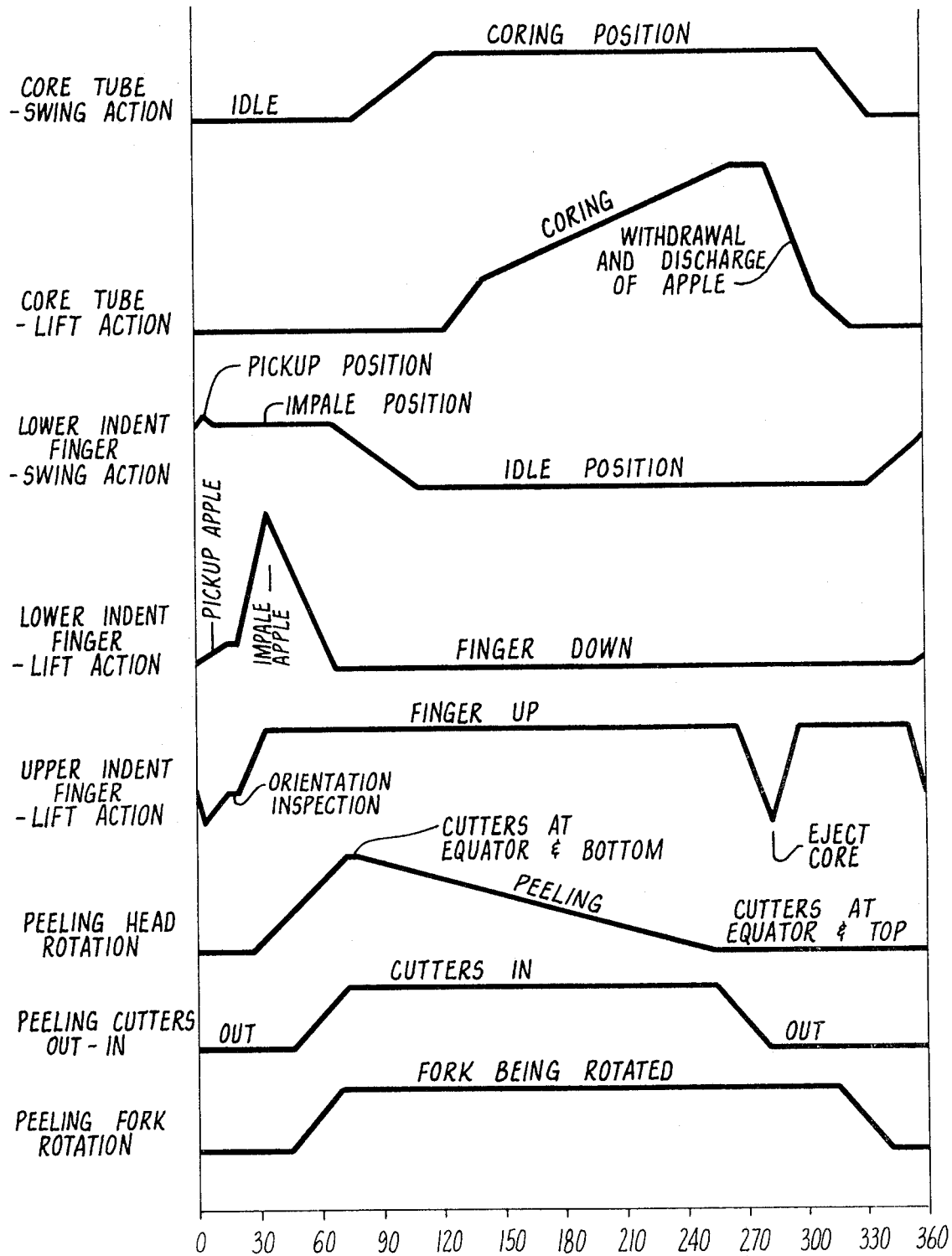

FIG. 8 is a diagrammatic view illustrating the movement of the conveyor of the first embodiment on which the primary orientation is effected in relation to the movement of the lower stem indent-engaging means, the successive views A, B, C and D illustrating the relationship of the fruit support cup and lower indent pickup finger, the movement of the latter as the fruit is carried away from the primary orienting conveyor, and the action of the reject mechanism on an unoriented apple which has been lifted by the lower indent finger;

FIG. 9 shows in side elevation the successive positions of the indent pickup fingers in relation to a fruit aligned on the primary orienting conveyor with the stem and blossom axis in a vertical position, the views corresponding to positions A, B, C and D in FIG. 8;

FIG. 10 is a schematic view, like FIGS. 8 and 9, illustrating the engagement of a lower stem indent finger with fruit which is semioriented and the manner in which upper indent fingers move into engagement with the upper indent so the fruit is fully aligned and held with its indents engaged;

FIG. 11 shows schematically the operation of the indent pickup fingers with improperly oriented fruit and the manner of rejection whereby the pickup fingers slip off the surface prior to any peeling operation;

FIG. 12 is a vertical section taken substantially along the lines 12–12 of FIG. 3, and illustrating a first peeling and coring mechanism in positions out of engagement with an apple as at "pickup" (on the left-hand side of the figure) and positions in which a second peeling and coring mechanism in positions of engagement with a fruit (on the right-hand side of the figure);

FIG. 13 is a section taken along the lines 13–13 of FIG. 12 and in which the indent pickup fingers alone are engaged with the fruit;

FIG. 14 is a view similar to FIG. 13 but in which the fruit has been impaled upon held fork for turning the fruit while the fruit is held by the indent pickup fingers, as shown in FIG. 13;

FIG. 15 is an elevation showing the peeling mechanism in relation to the fruit during initial peeling of the fruit;

FIG. 16 is an elevation similar to FIG. 15 but at a more advanced stage of peeling and an initial stage of coring;

FIG. 17 is a view similar to FIGS. 15 and 16 but showing the peeling mechanism moved out of engagement with the fruit and with the apple fully cored by the coring mechanism;

FIG. 18 is another view illustrating the operation for ejecting cored and peeled fruit;

FIG. 19 is a plan view showing the mechanism for operating the lower indent pickup finger and coring device, said view being taken along line 19–19 of FIG. 13;

FIG. 20 is a section taken along the lines 20–20 of FIG. 19;

FIG. 21 is a section taken along the lines 21–21 of FIG. 15;

FIG. 22 is a section taken along the lines 22–22 of FIG. 21;

FIG. 23 is a side elevation view of the mechanism for supporting and operating the upper indent pickup finger and the fork on which the fruit is impaled for peeling;

FIG. 24 is a plan view of the knife used for trimming the upper indent end of the fruit;

FIG. 25 is a side elevation of the mechanism for trimming the upper indent of the fruit;

FIG. 26 is a side elevation showing the mechanism for operating the rotary cutters and for moving these cutters into and out of fruit engagement;

FIG. 27 is a section taken along the lines 27–27 of FIG. 26;

FIG. 28 is a section taken along the lines 28–28 of FIG. 26 showing further details of the means for moving the rotary knives into and out of fruit engagement;

FIG. 29 is a section taken along the lines 29–29 of FIG. 26;

FIG. 30 is a section taken along the lines 30–30 of FIG. 29;

FIG. 31 is a timing chart showing the relative timing of the various operations of the first embodiment in a machine for orienting, peeling and coring apples;

FIGS. 32 through 60 illustrate a second embodiment of the invention and various improvements wherein FIG. 32 is a perspective view of the second embodiment in an apple coring and peeling machine;

FIG. 33 is a partial vertical center section and elevation of the peeling turret;

FIG. 34 is a plan view and partial horizontal section taken through the machine to illustrate the relationship of the peeling turret and orienting disc;

FIG. 35 is an elevation illustrating various positions of an apple and its supporting mechanisms during pickup from the orienting table to the peeling turret as viewed along lines 35–35 of FIG. 34;

FIG. 36 is a diagrammatic illustration of the connections for driving the orienting mechanism and the peeling turret;

FIG. 37 is an enlarged detail and partial section of a portion of the peeling turret mechanism shown in FIG. 33;

FIG. 38 is a section taken on the broken lines 38–38 of FIG. 37;

FIG. 39 is an enlarged section taken on the lines 39–39 of FIG. 38 to illustrate one of the clamping devices that secures the peeling fork turret plate to the turret column and allows said turret plate to be raised or lowered to accommodate various apple sizes;

FIG. 40 is a plan view and section taken on lines 40–40 of FIG. 37 and showing portions of the apple stop plate, the indent trim knife and the stem trim knife;

FIG. 41 is a plan view and partial section taken on line 41–41 of FIG. 37 to illustrate the mechanism for operating the upper indent engaging member and the head rotation mechanism;

FIG. 42 is a plan view of the peeling head and actuating mechanism;

FIG. 43 is a bottom plan view of the upper cam plate for actuating the upper indent engaging member and peeler head, this view being taken on line 43–43 of FIG. 33;

FIG. 44 is an elevation of the upper cam plate and its support and further illustrating a partial section taken on line 44–44 of FIG. 43 to show a connection which allows the cam plate to be angularly adjusted;

FIG. 45 is an enlarged detail and elevation of the actuating mechanism for operating the bottom indent engaging member and coring mechanism;

FIG. 46 is a plan view of the bottom indent-engaging member and coring mechanism as viewed on lines 46–46 of FIG. 45;

FIG. 47 is an enlarged section taken on the broken lines 47–47 of FIG. 45;

FIG. 48 is an elevation of mechanism mostly hidden by other parts as illustrated in FIG. 45 and as viewed along the broken lines 48–48 of FIG. 47, some parts being shown in section;

FIG. 49 is a bottom plan view of the operating mechanism shown in FIG. 45 and as viewed along line 49–49;

FIG. 50 is a vertical section of the support sleeve for the bottom indent-engaging member showing its relationship to the swinging mechanism and other portions of the operating mechanism which is shown in phantom;

FIG. 51 is a section similar to FIG. 50 showing the support sleeve and its relationship the mechanism for raising and lowering the sleeve;

FIG. 52 is a vertical section of the support sleeve for the coring tube and illustrating its relationship to the swinging mechanism and to other portions of the operating mechanism which is shown in phantom;

FIG. 53 is a section similar to FIG. 52 illustrating the support rod and its relationship to mechanism for raising and lowering the rod;

FIG. 54 is a vertical section taken through a peeling fork spindle;

FIG. 55 is a vertical section of the air cylinder for operating one of the bottom indent-engaging members;

FIG. 56 is a plan view of the cam plates for actuating the bottom pickup and coring mechanism, this view being taken on line 56–56 of FIG. 33;

FIG. 57 is an enlarged vertical section of the lower cam plates and illustrating the relationship of cam tracks and followers;

FIG. 58 illustrates various positions of lower and upper indent-engaging members relative to an apple receptacle of the orienting table;

FIG. 59 illustrates a graph of relative velocities at various angular positions for the upper and lower indent-engaging members and an apple receptacle; and FIG. 60 is a timing chart showing the relative timing of the operations for the second embodiment.

DESCRIPTION OF THE FIRST EMBODIMENT

General Description of the Units Involved

The machine of the present invention includes a feed conveyor 10 (FIGS. 1, 2 and 3) which delivers apples in single file and one at a time to a feed star 42. The feed conveyor 10 includes a chain 20 movable about a path defined by several sprockets including a drive sprocket 8 mounted on shaft 11. The chain has a plurality of spaced lugs 37 thereon which pick up and roll or push the apples along a shelf 25 to discharge into feed star 42. Apples may be fed to conveyor 10 as from bulk supply bin 21 (FIG. 3) including a belt 23 and deflectors 24 and 26. Such a feed is described in the copending application of Ellis, et al. Ser. No. 615,000, filed Feb. 9, 1967. The apples can also be fed from a water-flume system as described in another copending application of Ellis, Ser. No. 626,794, filed Mar. 29, 1967.

Feed star 42 discharges the apples one at a time onto a conveyor, shown here as disc 47 wherein each apple is given a primary orientation in one of a plurality of receptacles 46 which are provided around the periphery of the disc. Apples are confined to the feed star by rim 43 extending about the feed baseplate 44.

The Drive for the Feed and Orientation

The several units so far described are driven in a positive and timed relationship from a prime mover, as will be presently described. All units described and to be described are supported by a frame generally indicated as 6 (FIG. 1).

The conveyor 10, the feed star 42 and the disc 47 move in a timed relationship such that as each receptacle 46 comes beneath a pocket of the feed star an apple is dropped into a receptacle. This drive is effected by a prime mover 101 having a pulley 102 about which a belt 103 extends (FIG. 3). The belt also extends about pulley 104 on a gearbox 106 from which a vertical shaft 17 depends. A pinion gear 108 on shaft 107 drives bull gear 109 (FIGS. 3 and 6) which is mounted on shaft 41 which is journaled in bearings 40 on frame members 32 and 33. Members 32 and 33 are portions of the generally indicated frame 6. Shaft 107 also has a sprocket 111 attached to it and a chain 112 passes about that sprocket to a sprocket 113 on shaft 114. Feed star 42 is mounted on shaft 114 which also carries a bevel gear 116 which in turn drives another bevel gear 117 on shaft 11 to drive the conveyor 10.

The Primary Orientation Mechanism

Means are provided for suitably rotating a primary fruit orientor, generally designated at 50, in each one of the receptacles 46 (FIGS. 4—7). The primary orientor includes a wheel 51 mounted upon one end of a shaft 52. Preferably the wheel is mounted eccentrically on the shaft and its periphery is preferably knurled as at 53 (see U.S. Pat. No. 3,198,312). Shaft 52 is journaled in a bearing support 54, collars 56 and 57 being provided at opposite ends of the shaft to retain the shaft in position with each wheel 51 centered under a receptacle. The bearing support 54 terminates in a Y-shaped yoke 58 (FIG. 4) having arms 61 and 62 journaled by pins 64 on ears 63 on the underside of the disc 47. Arm 61 has an upwardly extending extension 65 and a spring 66 is extended between this extension and a stud 67 provided upon the underside of the disc so the spring normally maintains the wheel in the position in which it rotates within the confines of the receptacle as in FIGS. 5 and 6.

The yoke arms 61 and 62 are joined together to provide a common depending arm 70. The arm 70 carries a roller 81 which rolls along a cam track 82 supported from the frame member 33 to move the yoke 58 and wheel 51 as will appear.

During the operation it is desirable to move the wheel from the confines of its associated receptacle so that a certain secondary orienting and pickup mechanism can operate. This is effected by providing a cam track 82 radially about the center of shaft 41 and in such a location in relation to the shaft that the wheel and its support structure are moved from the position shown in FIG. 6 to the position shown in FIG. 7 in which the wheel is away from the receptacle over a small portion of the rotation of disc 47, e.g. about 15°—20° measured on each side of and from the tangent point of the orientor disc 47 and presently to be described turret 151. Thus, the overall extent of the cam is 30°—40°. With some apples having an elongated shape, efficient primary orientation cannot be easily attained. In this case, the start of the cam is provided at a point about 90°—120° in advance of the tangent point so that the apples can be visually observed and hand turned into position if necessary.

Rotation of the wheel in a clockwise direction, as viewed looking to the left of FIG. 4 and shown in FIG. 5, is effected through a flexible cable 86 attached as at 87 to the shaft 52 and attached as at 88 to shaft 89 which extends through the bearings 91 mounted in turn in the sleeve 90. At one end the shaft 89 is held in a fixed position longitudinally by collar 92 while at the other end it carries a bevel gear 93 which is enmeshed with the bevel gear 131. The bevel gear 131 is secured to the reducer output shaft 127 and is driven by a drive which includes a motor 122 having a pulley 123 thereon. A belt 124 passes about this pulley and about a pulley 125 provided about a speed reducer 126 attached to disc 47 (FIGS. 1 and 6).

The sleeve 90 for each orientor 50 is secured in ring 118 bolted to the orientor disc 47 and plate 121 which is secured on the upper end of the shaft 41. Thus, the orientors 50 and the orientor disc 47 rotate with shaft 41 while the orientor wheels 51 are rotated by the drive through bevel gears 131 and 93.

In one machine, disc 47 was 38 inches in diameter at the line of center of the receptacles and was turned at between 5—8 r.p.m. while wheels 51 were turned at about 100 r.p.m. by the drive through bevel gears 131 and 93. The speed of rotation of the wheel 51 should be kept substantially constant and independent of the speed of rotation of the disc. The speed of rotation of the disc is coordinated with the ease with which the apples being run may be oriented and peeled. The primary stage of orientation is achieved when the apple in the receptacle has been tumbled and turned until one indent or the other encompasses the wheel 51. The proportions of the wheel and receptacle are such in relation to an indent in an apple that when the wheel is within an indent the wheel no longer attempts to turn the apple. When this condition is obtained, the apple may be described as semioriented, that is the lower indent and the outside surface of the apple are in correlated positions but position of the upper indent has been wholly disregarded up to this time. The secondary orientation, presently to be described, refines the position of the upper indent in relation to the lower indent at the expense of the position of the outside surface of the apple.

In accordance with this invention, means are provided for assuring that an unoriented apple is disturbed from its unoriented position and is subject to an orientation attempt. It happens all too frequently that an apple will come to rest in a stable but oriented position generally forward of the wheel and out of engagement with its associated orienting wheel 51 or in a position where the wheel 51 cannot obtain sufficient purchase to turn the apple. To cause the apple to turn into the position in which it is engaged with the wheel, we provide means to disturb an unoriented apple and cause it to move into wheel engagement. These means are shown in FIG. 3 as fingers 49, 96 and 97. Fingers 49 and 97 are preferably mounted on the circular rim 48 outside the disc 47 and extend over the path of travel of the receptacle 46 in such relation that any unoriented apple is caused to move backwards and sideways into a new engagement with the rotating wheel. Finger 96 is mounted on the extension 99 on the inside of path of travel of the receptacles to disturb any apple which may profit by a disturbance in that direction. The fingers 49, 96 and 97 are lightly spring loaded toward the centers of the receptacles. The spring is strong enough to dislodge an unoriented apple yet not dislodge an oriented apple. In actual use, it was found that the presence of the fingers was sufficient to increase the primary orientation effected by the wheels from about 85 percent to over 95 percent.

The Secondary Orientor

Referring particularly to FIG. 4, as the disc and its associated structure moves each orientor 50 from the second to the third of last position there shown, the wheel 51 is moved out of position so that presently described secondary orienting mechanism can come into operation and move in to engage fruit. This secondary orientation mechanism is carried on a suitable carrier such as a turret, generally indicated at 151 (FIGS. 1, 3, 4 and 12). The path of the secondary orienting mechanisms as these are moved continuously by the turret is over a path which, at station A (FIGS. 8—11), coincides with and has a common tangent point with the path of travel of the centers of receptacles 46 of the orientor disc 47. The secondary orienting mechanism includes opposite lower and upper indent pickup fingers 152 and 153 carried on the turret which, as previously stated, is generally indicated at 151.

As the semioriented apple is nearly at the tangent point of disc 47 and the turret 151, the lower indent pickup finger begins to rise through the central hole of the receptacle, but does not quite touch a semioriented apple until about at the tangent point. The upper indent pickup is also moved downward into the indent of an average sized apple which is oriented, or nearly so, at the tangent point or just prior to the tangent point if the apple is larger than average. The peripheral velocity of the indent pickup fingers 152 and 153 on the turret 151 is about double the velocity of the orientor disc 47 taken at the centerline of the receptacles.

The upper indent pickup has a button 159 on its ends which assists this pickup in its function. Thus, if the upper indent pickup 153 contacts a large apple before the tangent point is reached, the button end on the indent pickup slides forward over the apple surface until it settles into the indent. This is shown in the several views in FIG. 10. If the upper indent is to the left of center, as shown in FIG. 10, the upper indent finger will traverse the top surface of the apple because of its greater velocity and will settle in the indent, thus correcting the orientation. If the indent had been inclined to the right, the upper indent pickup would have settled into it at the first contact and force the indent to center as the apple is lifted from the receptacle 46. If the upper indent is either to the front of center or to the rear of center as the indent pickup traverses the apple, the pickup has a strong tendency to be funneled into the indent if possible. The lower indent is located sufficiently well by the wheel 51 so that the lower indent pickup has no problem centering the lower indent. The upper indent pickup is light in weight to keep its inertia to a minimum so it can move rapidly and without delay. In addition, the upper pickup is lightly spring loaded so that it will seek the upper indent, yet will not punch a hole in the apple if it makes contact outside of the indent. Both indent pickups have a rounded fruit contact surface which slips over the apple surface easily.

Substantially at the tangent point, the apple is lifted free from the primary orientor receptacle by the lower indent pickup finger which continues to lift until the bottom of the apple clears the receptacle fully, the apple being held between the top and bottom indent pickup fingers. As soon as the apple is high enough to clear the receptacle, its upward rise ceases and the apple is subjected to a light side pressure by spring reject finger 156 which will dislodge an apple which is not being carried with both fingers seated in the indents and discharge the apple into chute 157 to return to the bulk supply for recycling (FIG. 3). Finger 156 is supported on frame 6 by means not shown.

The spring pressure applied by the upper indent pickup finger is just enough so that an apple engaged by both indents will not be dislodged while apples not engaged by both indents will not be dislodged by spring finger 156. Thus, apples which are not fully oriented are rejected, while those which are, pass on to be peeled. The accuracy of orientation of the top indent is improved as much as one-half inch or more and the percentage of perfectly oriented apples is improved as much as 50 percent in some varieties over the semioriented condition as delivered by the disc 47. If the semioriented apples were impaled without further regard to the upper indent, several times as many apples would require hand trimming as compared to apples processed by the present invention.

It is a feature of the lower indent finger that it includes an upper substantially cylindrical end 154 with a rounded free end and from which depends a larger diameter flange 155. The end 154 is of a diameter and height to approximate the indent of an average apple with the flange engaging that annular surface portion surrounding the indent to provide sufficient area to accomplish impalement of the apple. When engagement of end 154 with an apple indent occurs at the tangent point and the apple is lifted free of the receptacle 46, the upper end of the apple is guided by the button 159 on the upper indent pickup finger 153 and the spring 278 (FIG. 23) is compressed according to the size of the apple. However, when the rounded ends 154 and 159 engage the sides and not the indents of an apple, as in view D in FIG. 8 and in FIG. 11, the apple is lifted on the smooth apple surface and so is unstably supported by both indent pickup fingers.

When an apple is unoriented, as in FIG. 11, the upper indent pickup generally makes its initial contact behind the apple center and has a strong tendency to slip off the smooth, rounded apple surface without the side pressure of the reject finger 156 and so is rejected. This occurs because of the approximate 2-1 ratio of velocity between the apple carried by disc 47 and pickup fingers of turret 151. Should the apple be picked up by other than both indents, the side pressure of reject finger 156 dislodges and rejects the apple.

After the apple has been removed from the receptacle, the wheel swings back into its FIG. 6 position under the center opening in the receptacle ready to repeat the cycle. The apple held between the indent pickup fingers 152 and 153 moves away from the tangent point of the disc 47 and turret 151, and the lower indent pickup finger stem passes through slot 158 in the receptacle from which the apple is removed (FIGS. 8, 9 and 10). Further lifting of the lower indent pickup finger, by a mechanism yet to be described, impales the fully oriented apple onto fork 193 while the apple is guided by the indents. The upper indent finger remains in contact with the apple indent under spring pressure by a mechanism yet to be described.

The Drive for Turning the Turret Structure, the Rotary Cutters and the Impaled Apples The turret structure 151 is rotated in a timed relation to the primary orientor disc 47 and, as has been related heretofore, at about twice the peripheral speed of the disc. To accomplish this, a pair of pinion gears 166 (FIG. 3) is provided and is driven by bull gear 109 on the shaft 41 which supports the primary orientor disc 47. The driven chain of pinion gears 166 drives gear 167 which is on the composite turret shaft, generally designated as 168 (FIG. 12).

Mounted on and rotatable with the lower portion 169 of the composite shaft 168 is the means for raising and lowering the lower indent pickup finger 152 and moving this into and out of position and for raising and lowering apple-coring means to be presently described, such means being generally designated as 171 (FIGS. 12—21). Lower shaft 169 is tubular and presently described air line 368 passes up through the shaft (see FIG. 12).

Mounted on flange 172 which is secured on the upper end of the lower portion 169 of the composite shaft 168 is a gearbox 173. An upper tubular shaft section 174 has a flange 176 at its lower end which is secured to gearbox 173. A shaft 177 is suitably journaled for rotation in tubular shaft 174. At its upper end shaft 177 carries a pulley 178 about which a belt 179 is trained (FIGS. 1, 3 and 12). The belt also passes about pulley 181 which is on shaft 182 of motor 183. The lower end of shaft 177 carries a bevel gear 184 in gearbox 173, the former driving bevel gears 186 which drives the rotary cutters, generally indicated at 187 (FIGS. 1, 12 and 30).

The composite shaft 168 is suitably journaled for rotation, lower shaft section 169 riding in bearing 188 carried by lower frame plate 32 while upper shaft section 174 rides in bearing 191 carried on upper frame plate 192 which is suitably supported from the lower frame plate 32.

A plate 261 is mounted on upper shaft section 174 for a limited vertical movement to provide for an adjustment in elevation and is the means for supporting the spindles for rotating an apple impaled on one of the six forks 193. Each fork 193 is included in a structure arranged for rotation, generally designated as 194, and which includes a pulley 197. A belt 198 is trained about 4 or 5 of the six pulleys as they fall within the scope of the belt during rotation (FIGS. 1 and 3) and is driven by variable pitch pulley 199 mounted on shaft 201 of motor 202 (FIGS. 1 and 3).

As the turret 151 rotates on shaft 168, each of the pulleys 197 successively engage belt 198 about 45° after tangent point and are disengaged from belt 198 during the secondary orientation and pickup of the apple.

The Means for Moving the Lower Indent Pickup Fingers, the Core Knife and Associated Mechanisms Mounted on the lower shaft portion 169 and as part of the means, heretofore generally designated as 171, for moving the lower pickup finger 152, coring and associated mechanism yet to be described, is a spider support structure, generally designated 207. The spider includes upper and lower plates 208 and 209 secured to the shaft 169. Secured between these plates at equally spaced intervals are six brackets 211 having spaced ears 212. A shaft 213 is rotatably mounted in the ears. One end of an arm 214 is secured on the lower end of shaft 213 with a cam follower 216 secured on the other arm end to ride in a positive action cam 217. The travel of the follower 216 in the cam 217 is effective to cause shaft 213 to oscillate through about 70° as can be seen by comparing the showing of the two positions of shaft 213 in FIG. 19.

The oscillatory movement of shaft 213 is effective to move the lower pickup finger 152 into pickup position at one extreme (see FIGS. 12—14) and, at the other extreme, to move the lower pickup out of position and to bring into position certain presently described coring mechanism, generally designated as 206 (also see FIGS. 15—22).

The coring and pickup finger mechanism is mounted slidably to shaft 213 by spaced upper and lower brackets 219 and 221 (FIGS. 12 and 20). Bracket 219 is secured to shaft 213 while bracket 221 is slidable on shaft 213. Also mounted for sliding on shaft 213 is a third bracket 222 which is secured on a vertical rod 223 which is slidable vertically along shaft 213 because of the slidable mounting of its supporting brackets 221, 219 and 222. The oscillation of shaft 213 produced by cam 217 and arm 214 with roll 216 is transmitted to shaft 223 by means of arm 219 which is clamped to shaft 213 and is slidable connected to shaft 223. At its lower end, rod 223 carries a member 224 which has the shape generally of an equilateral triangle (FIGS. 12, 19 and 20). At one corner 226 the member is slidably mounted on shaft 213 while at the other corners 227 and 228 carrying, respectively, cam followers 229 and 231 which ride along the cam track 232 to raise and lower member 224. When cam follower 229 is riding the cam track 232, the pickup 152 is centered under fork 193 to be raised and lowered. When thereafter in the cycle shaft 213 is turned through approximately 70°, the cam follower 231 rides the cam 232 and the coring knife 206 is centered under fork 193 to be raised and lowered.

To provide for variation in apple size engaged by indent pickup finger 152, the latter is mounted by arm 233 on rod 223 to raise, lower and oscillate with that rod. To permit member 224 to move upwardly to the maximum required by cam 232 and yet not move the pickup finger 152 excessively if it is engaged with a large apple, means permitting overtravel of rod 223 is provided. This means includes a rod 234 secured between bracket 222 and bracket 221 and having a spring 236 engaged with collar 235 clamped on rod 234 below the bracket 222 and with its other end riding on member 224. If the pickup finger 152 cannot move upwardly because it is engaged with a large apple fully seated on fork 193 and if further movement of member 224 is required by cam 232, the spring 236 is compressed but the apple is not damaged.

The Coring Mechanism

Mounted on rod 223 is the coring mechanism 206 for removing a core from the apple which includes the apple seed cell. An arm 237 is secured to rod 223 to carry a tube 238 having a serrated and sharpened end 239. When rod 223 is raised, the core tube is raised and is forced into the apple which has earlier been impaled on the rotatable fork 193 (FIGS. 16 and 17). This raising movement is effective to cut a core in the apple through the upper surface of the apple and severs the apple from the core of the apple engaged by the fork.

Lower Indent Trimming

As the core tube is raised, means for trimming the annular area about the lower indent engages the apple. This means includes knife 242 and guard 243 (see FIGS. 14 and 19—22) slidably mounted on the core tube and urged upwardly by a spring 244. The knife and guard are carried on a sleeve 246 against which the spring presses from arm 237. The sleeve is held against rotation by a key 247 on the core tube engaged with a slot in the sleeve, the upward travel of the sleeve being limited by lateral extension 248 of the key. The guard 243 engages the apple and limits the depth of cut by the knife as the apple is rotated by the fork.

Removal of the Cored Apple

As the core-cutting mechanism 206 is lowered from the fully raised position wherein the apple is cut free from the core, the apple clings to the tube 238 and is lowered with it. To remove the cored apple, an arm 249 is mounted on the upper end of shaft 213. The arm 249 carries an apple discharge fork 251 which, as the core tube is lowered, engages the core apple and strips it off the tube (compare FIGS. 17 and 18 with FIG. 20) so the peeled and cored apple tumbles into the discharge chute 251 (FIG. 1).

The Means for Moving the Upper Pickup Finger and for Rotating an Impaled Apple

Keyed to the upper shaft section 174 and slidable up and down for adjustment is a circular plate 261 (FIGS. 12, 23 and 26). Mounted at equally spaced intervals about its periphery are six fork-rotating means, generally designated as 194, and which means also include the upper indent finger 153. The centerline of each fork-rotating means coincides with the centerline of the related lower indent pickup finger 152 and with the centerline of the coring mechanism 206 when these are in their active positions. Each fork-rotating means 194 includes a housing 262 secured to plate 261 (FIG. 23). Within the housing 262 ball bearings 263 and 264 are provided, these being spaced apart by annular separator 266. The lower bearing 264 is mounted in a recess in the housing in which it is held by annular retainer 267. The upper bearing 263 is held in place by a nut 268 screwed onto a rotatable sleeve 269 mounted in the bearings 263 and 264. At its lower end sleeve 269 carries a pulley 197 about which belt 198 is trained to rotate the sleeve 269. A splash plate 272 is held on an end of the sleeve by a collar 270. Secured on the lower end of sleeve 269 is a tubular member 273 which terminates in the apple-impaling fork 193.

The upper indent pickup finger 153 is slidably mounted in the tubular member 273 and sleeve 269 for movement into and out of apple engagement. Thus, the upper end of the pickup rod 153 has a head 274 thereon slidable in a sleeve 276 and, in the absence of an apple, resting in engagement with sleeve end 277. The sleeve 276 is in turn slidable within sleeve 269. A spring 278 is confined in the sleeve between the head 274 and a plug 279 fixed at the upper end of the sleeve by pin 281. A rod 282 extends down from the plug. When the coring of an apple impaled on the fork 193 is completed and the core is cut free, as shown in FIG. 17, the sleeve 276 with spring 278 and pin 282 are moved downwardly by means to be presently described. The upper pickup finger button 159 is held at the top of the fork 193 by the apple and shoulder 274 is lifted free of the sleeve end 277 (FIGS. 14 and 23). The downward motion of sleeve 276 causes pin 282 to engage the head 274 of upper pickup finger 153 to push it and its button 159 downward, as shown in FIG. 17, to push the apple core some distance into the core tube 238. Core 240 from a previous apple which may have remained inside the core tube 238 is ejected into the refuse catching through to be described presently.

At its upper end, the sleeve 276 has a rectangular member 283 secured by nut 284. The rectangular member has slots 286 along its opposite vertical sides. Slide blocks 287 are moved back and forth in these slots and the blocks are carried on pins 285 in the forked end 288 of bellcrank 289 (FIG. 26). The bellcrank 289 is mounted on pin 291 in a bracket 292 secured to plate 261. A spring 923 extends between an adjustable collar 294 on rod 296 and arm 297 on the bellcrank. The spring is supported by the rod 296 which has one end passing through stop 298 on plate 261. A flange 300 on rod 296 prevents it from passing through stop 298, the other end of rod 296 passing through the arm 297. The other arm 299 of the bellcrank has a cam follower 301 thereon held in engagement by spring 293 with a cam 302 supported on flange 172. The cam 302 has a deep face so that the follower 301 can ride thereover in various positions of vertical adjustment of plate 261 and the mechanisms thereon. The contour of cam 302 is such that the position of the upper indent pickup finger 153 is altered as turret 151 is rotated about its circular path and as is shown in FIG. 31.

Adjustably mounted on a bracket 303 attached to plate 261 adjacent each fork 193 is an apple stop 307 (FIGS. 24—26). Pivotally attached to the stop is an upper indent trimmer 304 which includes a knife 306 mounted to one side of apple stop 307, the knife extending down at an angle into the upper indent (FIG. 17) to trim this end of the apple. The depth of cut is adjustable to suit the apples being run. The stop 307 limits the upward travel of the apple on the fork 193 to a position wherein the upper end of the fork is seated as deeply as possible without crushing into the apple.

Adjustment of Peeling Means in Relation to an Apple

It has been mentioned heretofore that cam 302 has a deep face so that the cam follower can ride the cam in various positions of vertical adjustment of plate 261 and the mechanisms thereon. Plate 261 is slidably mounted on collar 371 keyed by key 374 on the upper shaft 174 (FIG. 12) being retained in place by setscrew 372 at a desired elevation. The vertical change in elevation of plate 261 enables the position of an apple in relation to the cutters 187 to be adjusted so that the most economical cutting is attained. What is desired during peeling is that center of the average size apples being run approximately coincides with the pivot axis of peeling heads 340.

Orchard-run apples can be run but best yields are obtained when settings are made for small, medium or large apples.

The Rotary Cutting Means

The rotary cutting means, generally designated as 187, have cutters which are each movable between an inward cutting position and an outward position in which it is free of an impaled apple. (Compare the two showings of the cutting means in FIG. 12). As the apple is impaled on the fork 193, the cutting means are in the outward position and one is at the top of the apple and the other is at the equator, as shown in the left-hand assembly 187 in FIG. 12. As soon as the apple is impaled, the cutting means rotates 90° and the cutters move to the inward position whereupon one cutter commences cutting at the lower indent and sweeps up over the rotating apple to its equator. The other cutting means commences cutting at the equator and sweeps up over the revolving apple to the upper indent. The means for providing the sweeping action will be presently described. The means for causing the cutters to be inward or outward from the apple includes a circular cam track 316 (FIG. 26) mounted on upper plate 172. A cam follower 317 is mounted on one arm of lever 318. The other arm of the lever is hinged by pin 319 on bracket 321 which is carried on a spider on upper shaft section 174. A rod 323 is secured by pin 324 intermediate the ends of the lever 318 and extends to an arm on another bellcrank 326. This bellcrank is supported by pin 327 on bracket 328 on the gearbox 173. A spring 329 is mounted between the upper arm of the bellcrank 326 and a stop 331 on the gearbox to urge the cam follower against the cam 316 (FIG. 26). The other arm of the bellcrank 326 carries roller 325 which rides against a semicircular member 332 which has pins 333 at its opposite ends (FIGS. 26, 27 and 28). Each of the pins is slidable in opposite flanges 334 and 336 (FIGS. 26 and 30) to move the rotary cutters 337 and 338 between an inward cutting position and an outward fruit-free position as will be described.

Each of the rotary cutters is mounted on a yoke 339 supported by pins 341 on spaced pairs of ears 342. The yokes extend in directions 90° apart from one common corner (FIG. 26). Intermediate the ends of each yoke 339 is a split receptacle 343 which is clamped about a housing 344. A shaft 346 is journaled by bearings 347 in each housing (FIG. 30). Secured by a nut 348 on an end of housing 344 is a guard 349 while on the protruding end of shaft 346 a cutter 350 is fastened. Protruding through holes in the substantially radial portion of both cutters 337 and 338 is a two-pronged knife 351 which cuts the ribbon of peeling produced by the toothed cutting edge of cutters 337 or 338 into about ½-inch long segments for easy disposal. The guard and cutter structures are more particularly disclosed in U.S. Pat. No. 3,058,502. At the other end of shaft 346, collar 352 prevents axial movement of the shaft 346 in the housing 344. Mounted on the end of each shaft 346 is a gear 353. Each gear 353 is meshed with a gear 354 which is mounted on shaft 356 carrying a bevel gear 186 meshing with bevel gear 184 in gearbox 173.

Each of the yokes 339 has an arm 357 projecting therefrom and carrying an adjusting screw and locknut 358 positioned to be engaged by a slidable pin 333, as has been heretofore described. As pin 333 slides, it moves the cutters between an inward cutting position and an outward fruit-free position.

As shown in FIG. 26, cutter 338 cuts a path offset from the central plane of the apple so that the cutter may clear the tubular member 273 when the cutter is in contact with the apple. Cutter 337 cuts in a path substantially in the central plane of the apple.

The cutters 337 and 338 are constantly urged into fruit engagement under an adjustable regulated pressure application. This pressure is applied by a piston rod 361 (FIG. 29) which engages an arm 362 provided at an end of each yoke 339. Each piston rod 361 is carried in a cylinder 363, the piston end of the piston rod being covered by a flexible diaphragm 364 which extends between it and the cylinder. Fluid pressure is applied to the side of the diaphragm opposite from the piston from a chamber 366 through an orifice 367 (see U.S. Pat. No. 3,277,941). Preferably chamber 366 is filled with a liquid such as water but the pressure application is by means of air supplied through lines 368 under an adjustable pressure from a central source. The water from chamber 366 flowing through the orifice 367 serves to dampen movement of the piston and provide a reluctance to any sudden change in position of a cutter. Air is supplied through lines which extend up through tubular shaft 169 and which exit below gearbox 173 to a distribution manifold 365 provided above the gearbox.

The initial cutter contacts with the apple to begin with cutter 337 at the lower indent and cutter 338 substantially at the equator. The apple has begun to rotate and is up to speed as pulley 197 picks up full contact with belt 198 (FIG. 3) at a position corresponding to about 75° of rotation of turret 151 beyond the tangent point of disc 47 and turret 151 (FIG. 31 bottom curve). After the cutters have made initial contact with the apple, they move in uniform increments per each apple revolution toward a position substantially 90° around the apple from the initial contact point. Thus the cutter starting at the lower indent reaches a final position at the equator while the cutter which started at the equator finishes at the upper indent. Since the speed of spindle rotation is variable by means of the adjustable pitch pulley 199, the number of increments in moving the cutter from start to finish may be adjusted as required to meet the condition of the apples being run and the end use to which they are to be put. The mechanism to produce the rotation of the cutter mechanism consists of cam 384 attached to plate 172 (FIGS. 26, 27 and 30). Lever 386 is pivoted on pin 396 carried by bracket 397 which is mounted on spider 322 which is attached to shaft 174. Lever 386 carries cam roll 387 intermediate its ends, the cam roll 387 being engaged with cam 384. Rod 388 with swivel ends is attached at one end to lever 386 by means of a pin 389 while the other end of rod 388 is attached by bolt 391 to flange 334 of the peeling head body 335. Peeling head body 335 pivots around sleeve 393 on bearings 392 and is held on sleeve 393 by snap ring 398 and suitable thrust bearings 399 (FIG. 30).

Inside sleeve 393 are bearings 394 supporting shaft 356. Sleeve 393 is flanged at the inner end and is bolted to gearbox 173. The point of attachment of the end of rod 388 to the body 335 is such that as the rod is forced downward (FIG. 26) by the action of cam 384, the entire peeling head, generally indicated as 340, is rotated clockwise as viewed from the left about a radial axis in a plane normal to shaft 174. Spring 401 resists the downward action of cam 384 and so keeps cam roll 387 in engagement and so returns the peeling heads 340 to the position shown in FiG. 26. Finger 402 (FIGS. 26 and 28) is an L-shaped rod attached to bracket 303 and is positioned so that in the absence of an apple on fork 193, the horizontal portion of finger 402 engages the housing 344 and prevents cutter 338 from engaging the upper end of fork 193 at the end of the peeling operation.

Waste Disposal

During peeling and coring, considerable waste material develops consisting of peelings and cores which are distributed over about half of the circumference of the turret 151. In order to collect and concentrate this waste, a system is provided which also protects the lower mechanisms from accumulation of such waste. Mounted on shaft 168 and on spider 208 is a conical shield 381 which serves to deflect peel and cores into the trough 382 which is fixed on the outside of the circular cam 232. The shield carries a paddle 383 (FIG. 12) which moves the waste along the trough to a discharging opening, not shown. A shield 385 is also provided (FIGS. 1 and 3) about that position of the path of turret 151 wherein the major peeling occurs. Within shield 385, water sprays, not shown, are used to assist in keeping the peeling mechanism washed free of peeling and to flush the waste into trough 382.

SUMMARY OF OPERATION

The following provides a general description of the machine and its operation without reference to specific details as are provided in the preferred embodiment.

A chain-type feeder 10 (FIGS. 1 and 3) is provided to feed apples one at a time from a bulk supply at the required rate of speed. The chain feeder discharges into a feed star 42 (FIG. 3) which feeds the apples one at a time into the receptacles 46 on the primary orientor disc and at a velocity which closely approximates the velocity of the disc 47.

Primary orienting is done in much the same manner as in U.S. Pat. No. 3,198,312 except that the movement of the disc is continuous and that means are provided for disturbing unoriented fruit. An eccentrically mounted knurled wheel 51 rotates clockwise as viewed from its outer end. This rotation causes an apple which has not been turned so that an indent is down to ride toward the leading edge of the receptacle 46. A feature of this aspect of the machine is the provision of lightly spring-loaded drag fingers 49, 96 and 97 which are provided in the path of the receptacles to disturb a nonoriented apple but not disturb one with an indent down. Thus an apple riding forward on the receptacle 46 may not touch the wheel 51 or cannot turn because the apple is resting on an obstruction or flat spot on the apple. The drag fingers push the apple to one side or the other end rearwardly enabling the wheel 51 to obtain a new purchase and begin to tumble the apple again until an indent is found by the wheel. The primary orienting is complete when the lower indent encompasses the wheel and the apple rests in the receptacle. No regard has been given the upper apple indent at this point.

Just prior to the tangent point, the wheel 51 is withdrawn from the hold in the receptacle to leave a clear path for the upward movement of a lower indent pickup finger 152 of the peeling turret 151 which also rotates over a circular path. As the apple is nearly at the tangent point of the disc 47 and the peeling turret 151, the secondary orientation begins the refinement of the vertical alignment of the indents. The lower indent pickup finger begins to rise through the central hole of the receptacle, but does not quite touch an apple with its indent downward until at about the tangent point of the disc and turret. During this time, the upper indent pickup finger 153 has been moved downward toward the apple. The point of engagement of the upper indent pickup finger with the fruit depends on its size. With an average size apple, the engagement occurs at the tangent point or if the apple is a large one, then just prior to the tangent point, the timing of the upper pickup is readily adjusted to suit conditions. The peripheral velocity of the apple-peeling turret is about double the velocity of the disc 47 at the receptacle centerline so the upper pickup finger scans the upper indent area of the apple in the direction of travel. The scanning action of the spring-biased upper indent finger combined with the funnel shape of the indent causes the finger to seek a central position in the upper indent. The lower indent is located well enough by the wheel so that the lower indent pickup finger has no trouble finding a central position within the indent. Thus as the apple is being lifted out of the receptacle under the guidance of the indent pickup fingers, the fingers settle into the indents as fully as possible to achieve final orientation in relation to the indents without regard to the outside surface of the apple. If the apple in the receptacle does not have its lower indent on its underside, the pickup finger may slide off and release the apple to chute 157. If the apple is picked up though not oriented, the reject spring finger 156 applies side pressure to the apple as the apple moves toward the impaling point and the apple slips from between the indent pickup fingers into chute 157.

After the apple has been lifted out of the receptacle by the indent pickup fingers, the apple is lifted under light spring pressure until it is impaled on a peeling fork 193, the lower indent pickup 152 having a broad flange 155 of sufficient area to push the apple onto the fork. The apple encounters a stop 307 set approximately at the top of the fork to prevent a large apple from being excessively impaled. The mechanism lifting the lower indent pickup finger has an overtravel spring mechanism which permits the lift mechanism to continue to move after an apple engages the stop 307. During this movement, the upper indent pickup is within the prongs of the fork 193.

As soon as the apple is impaled, the lower indent pickup 152 moves down away from the apple so that the peeling operation can commence. The cutters are of the construction shown in U.S. Pat. No. 3,058,502. The dual rotary peeling cutters idle in the position shown in FIG. 26 are about 90° away from the start of peeling position up to this time. They are held clear of the largest apple by a kickout mechanism. They are then rotated into position to begin peeling and are swung inwardly toward the center of an apple of average diameter. The entire cutter mechanism is arranged to pivot about a radial axis which passes through the center of an average apple and is in the radial plane of the fork 193. Just prior to the start of the peeling cycle, one cutter is at the fork on which the apple is impaled in line with the axis of the apple, while the other cutter is at the equator of the impaled apple. When the lower indent pickup finger has dropped away, the peeling heads pivot 90° about the radial axis in bringing the cutters to their initial cutting positions, that is with one at the lower indent and the other at the equator of the apple. The kickout mechanism thereupon releases the cutters and both swing in to touch the apple which, by this time, has begun to rotate about its axis. The spindle speed is adjustable to permit the number of peeling turns to be adjusted to suit the size and end use of the apples being peeled.

The cutter which starts peeling at the lower indent is set to be on the centerline of the fork 193 when in contact with an average apple. The cutter which starts at the equator and finishes at the fork is set off center enough to clear the fork in its final position. Both cutters are held in against the fruit by air pressure transmitted through an intervening mass of water and through an orifice as shown in U.S. Pat. No. 3,277,941; each cutter has its own water and pressure system (see FIG. 29). As a spindle moves around with the turret, the peeling heads pivot 90° from their respective initial contact positions, each cutter having peeled one semisphere of the apple. When the final position is reached, each cutter is lifted from the apple.

As soon as the bottom cutter is out of the way, the coring begins. This is achieved by a core tube 238 sharpened on its end and which rises slowly to cut the core free just after the completion of the peeling. The core knife is mounted on the mechanism which carries the lower indent pickup finger (FIGS. 13—22). After the apple is impaled, the mechanism lowers and swings to bring the core knife under the apple instead of the lower indent finger.

Also mounted on the tubular core knife is a lower indent-trimming knife holder provided by a sleeve keyed to and sliding on the core knife tube (FIGS. 21 and 22). A light spring encircling the tube holds the lower indent cutter in contact with the apple while a knife blade 242 at the top of the sleeve cuts an annular area. A limit stop shoe 243 near the knife stops the advance of this knife when the proper depth has been reached. The top indent of the apple is trimmed by another spring-loaded knife mechanism 304 mounted on the apple stop (FIGS. 24 and 25).

When the apple is fully cored, the apple clings to the core-cutting tube and is lowered with the tube as the tube is withdrawn. It is removed from the tube by a stripper plate 251 which strips the apple from the core knife and discharges it from the machine.

While the core knife is still encompassing the peeling fork, the core clinging within the fork is pushed into the hollow core knife from which it is free to fall or be pushed off by the core of the next apple. Both the peeling and core waste collect in a circular pan at the lower peeling turret level and is swept around and out an opening in the pan by a paddle attached to the lower peeling turret turntable.

When the core knife is fully retracted, the combination core knife and lower indent pickup mechanism swing to bring the lower indent pickup under the peeling spindle ready to begin the next secondary orientation and pickup of fruit.

SECOND EMBODIMENT OF THE INVENTION

FIGS. 32 through 60 illustrate a second embodiment in a machine for processing fruit, this machine being of a more recent development and including various improvements. Inasmuch as many operations of this second embodiment are essentially the same as the first already described, an attempt will be made to relate the functions of one machine to the other by identifying many of the machine parts of the second embodiment with the same reference number as given for the corresponding part of the first machine. The machine parts will then be distinguished by the addition of a prime marking (') which is added to those numbers designating a part of the second embodiment. This numbering system, it is believed, will enhance an early understanding of the machine's operation. Of course, new reference numbers will be assigned to parts of the second embodiment which either have no counterpart in the first described machine or which, because of their relationship to other parts, are best designated by new reference numbers.

General Description of Machine and Its Operation

Like the first described embodiment, a feed conveyor 10' delivers apples one at a time to a feed star 42' that deposits a single piece of fruit into a receptacle 46' on an orienting table or disc 47'. As the orienting table rotates, each piece of fruit is given a primary orientation by contacting it with a rotating wheel 51' and fingers 49', 96' and 97'. In most instances, the pieces of fruit are oriented with respect to one of its indents (found by the wheel 51') by the time the fruit arrives at a pickoff station, a position from which the fruit is picked up by a peeling and coring turret 151'. It is at this stage of processing that the fruit is given a second of final orientation as it is engaged at its lower and upper indents by a pair of lower and upper pickup fingers 152' and 153'. These pickup fingers form an integral part of the peeling and coring turret 151' and support the apple while it is challenged by a spring reject finger 156'. If the fruit is properly oriented and engaged at its indents, it will be carried past the reject finger 156' to be impaled upon a fork 193' of an apple support spindle 194'. But should the apple be improperly oriented and, therefore, rejected by finger 156', it will be discharged into a return chute 157' and recycled, all in the manner described in connection with the first embodiment.

Once the apples are impaled upon a fork 193', they are acted upon by rotary cutter means 187'. Simultaneously, a coring knife or tube 238' is moved upwardly into engagement with and through the fruit. This coring operation is completed shortly after the cutter means 187' have peeled the apple. The severed apple core is then discharged through the core tube by a downward movement of the upper pickup finger 153'. This is followed by a downward movement of the core tube which carries the peeled and cored apple into contact with a stripper plate 251'. A further downward movement of the core tube strips the apple therefrom and the apple is discharged into a chute 252'.

With the foregoing explanation in mind, a more detailed description will now be given in connection with those structural features which distinguish the second embodiment from the first.

Means for Giving Fruit Primary Orientation

For the sake of brevity, and since the mechanism of the second embodiment which gives the fruit a primary orientation is essentially the same as that described in connection with the first embodiment, no further description of parts is necessary. It is to be understood, therefore, that the various details of conveyor 10', feed star 42' and orienting table 47' are the same as or equivalent to those used with the first embodiment. However, one of the improvements in the second embodiment involves a drive connection which allows all mechanisms of the machine to be operated off a single motor.

Machine Drive Connections

Referring to FIGS. 34 and 36 in particular, the machine as a whole is driven by a single motor 500 which is housed below table 47' within a lower housing 501. The shaft of motor 500 drives a pair of pulleys 502 and 503. Pulley 502 is the primary source of power for all mechanisms of the machine, the one exception being power supplied to rotate orienting wheels 51', this being derived on a takeoff from pulley 503.

Tracing the drive connections from pulley 502 first, pulley 502 drives a belt 504 entrained around a main machine pulley 505, a peeling cutter pulley 178' (for operating the cutters of rotary cutting means 187') and an idler pulley 506. The idler pulley is mounted on a threaded block 507 which travels along a threaded shaft 508 upon rotation of a handwheel 509 and so tightens the belt 504.

Main machine pulley 505 is coaxially connected to a pinion 510 which operates in a gear reduction chain consisting a of gear 511, a second pinion 512 coaxially connected to gear 511, and a gear 513 secured to drive shaft 514. This shaft rotates feed star 42' and also a bevel gear (not shown) forming a part of a gearbox 515 through which conveyor 10' is operated.

Gear 513 is also enmeshed with a gear 109 ' mounted on a tubular shaft 41' which supports and rotates table 47'. It will be further noted that the rotation of gear 109' is imparted to a second gear 167' through a pair of idler gears 166'. Gear 167' is secured to the lower end of a main turret shaft 168' and rotates the peeling and coring turret 151' as a whole, details of which will be more particularly described.

From the foregoing description, it will be apparent that motor 500 operates conveyor 10', feed star 42', orienting disc 47', peeling and coring turret 151' and the peeling cutters of rotary cutting means 187'. Moreover, each of these assemblies is interconnected by a positive drive system that synchronizes the movements or rotation of each. The size of the various gears is selected, of course, so that each of the assemblies operates in timed relationship to the other assemblies in essentially the same manner as described in connection with the first embodiment.

In addition, motor 500 also operates two other mechanisms of the machine. The first of these mechanisms comprises the orienting wheels 51' which are driven off of pulley 503 with a belt 124' entrained around a planetary gearbox 125' connected to an output shaft 127'. The other mechanism operated by motor 500 comprises apple support spindles 194', each spindle being rotated when pulleys 565 contact belt 198' that is driven by a pulley 199'. This latter pulley is coaxially attached to a pulley 516 that is operated with a belt 517 entrained around a variable pulley 518 secured to the same shaft as main machine pulley 505.

General Construction of Peeling-Coring Turret

In general, turret 151' comprises a plurality of ample support spindles 194' including upper pickup fingers 153' and impaling forks 193'. A rotary cutting means 187', a lower indent pickup finger 152' and a coring mechanism 206' are also provided in operative association with each support spindle. It will be further seen that each of these mechanisms and their controls are mounted on a turret shaft, generally indicated by reference 168', that rotates in a frame comprised of upper and lower support plates 550 and 551 and a vertical frame column 552. Turret shaft 168' more particularly comprises four support units 553, 554, 555 and 556 which provide a support means for the operating turret mechanisms, and the shaft is rotatably supported in bearings 557 and 558, respectively mounted to plates 550 and 551.

Improvements in Construction of Peeling-Coring Turret

It will be evident that peeling-coring turret 151' comprises many of the same mechanisms used in connection with the first embodiment. However, the shape, size and arrangement of the actuating mechanisms have been changed in several respects to improve the overall operation. The following improvements are to be particularly noted:

Separate support and actuating mechanisms have been provided for lower pickup fingers 152' and coring mechanism 206'. This feature allows flexibility in positioning each of the operated mechanisms which, because of their different motions and purposes of function, require that they be moved to greater or lesser degree and suggests that they be operated independently of one another. In the corresponding mechanisms of the first embodiment, swinging motion of the support tube could only be achieved when the tube was in the fully down position. The improved construction permits both support tubes to be swung at any point in their rise. This permits an improved pickup action. More particularly, it is desirable to provide an actuating mechanism for the pickup fingers which allows them to be moved with as near a vertical rise as possible relative to the apples which are picked up from receptacles 46' of orienting disc 47'. This is not easily accomplished when the fruit is being moved horizontally with about half the velocity of the pickup fingers. Theoretically, of course, it is possible to move fingers 152' with a vertical motion which will make any horizontal component of movement relatively insignificant. But, from the practical standpoint of machine design and from the standpoint of engaging a piece of fruit without puncturing its skin, the speed with which the pickup fingers 152' may be moved vertically is definitely limited. It is to be understood, therefore, that the actuating mechanism for the lower pickup fingers is regarded as having substantial importance in providing an improved operation. This operation will be more fully described following a detailed description of the actuating mechanism for the lower pickup fingers.

A second major improvement in the construction of turret 151' relates to the cam controls for actuating the upper pickup fingers 153' and the rotary cutting means 187'. In the first embodiment, the cam controls were of a barrel type which gave a positive action in one direction only and allowed few adjustments for a change in apple size. This has been changed in the second embodiment and instead there is provided a plurality of cam rings horizontally disposed one within another, each cam ring having one or more cam tracks with cam followers which give a positive control for each operated mechanism. In addition, a change was made in the location of the cams and the lever mountings to position them with greater concern for their function while also permitting an adjustment in the timing relationships of the controlled mechanisms. These changes are especially important in adjusting the machine for use with different types and sizes of apples.

Construction and Mounting of Apple Spindles and Actuating Mechanism

Referring to FIGS. 37 and 54 in particular, each apple support spindle 194' comprises a spindle housing 560 mounted to support 554. A pair of ball bearings 561 and 562 are provided at opposite ends within housing 560 and rotatably receive a tubular spindle 563 which carries a fork 193' in its lower end. Setscrews 564 are used to secure forks 193' to their respective spindles 563. A crown pulley 565 is threadedly connected on the upper end of spindle 563, this pulley being contacted by the belt 198' as the turret is rotated and thereby imparting rotation to the forks 193'.

Each apple support spindle 194' further comprises an upper indent-engaging finger 153' which is reciprocally received in a guide passage through tubular forks 193'. The upper end of each finger 153' is also reciprocally received in a tubular member 566, an enlarged head 567 being provided on the end of finger 153' to prevent separation of the finger from the tubular member but allowing a relative telescopic movement of the finger into member 566. The body of the finger 153' is made of tubular material to keep the inertial mass as low as possible. Finger 153' is normally biased into a position as shown in FIG. 54 by the relatively light force of a coil spring 568 disposed within tubular member 566. The force of spring 568 is actually applied to head 567 of finger 153' through a movable plug 569 which provides a seat for the spring. A bayonet 570 is also disposed within tubular member 566, the upper end of the bayonet being secured to the upper end of tubular member 566 as to be movable therewith and provide an upper internal seat for spring 568.

The foregoing arrangement of parts is such that finger 153' may be moved against the bias of spring 568 as an apple is impaled on the tines of the fork 193'. In addition, however, finger 153' may be moved downwardly a substantial distance beneath the end of fork 193' by lowering tubular member 566 and bringing bayonet 570 into contact with movable plug 569. This operation occurs once each cycle when the apple core is to be ejected from fork 193' into the coring tube 238'. It may be further noted that finger 153' is also moved downwardly to expose its lower end well beneath the end of fork 193' at the time an apple is picked up from a receptacle 46' of orienting table 47'. At such time, however, bayonet 570 is not brought into operation. The simple lowering of tubular member 566, together with the pressure of spring 568, will effect the necessary downward movement of finger 153' as required to engage the upper indent of an apple. Importantly, the resiliency of spring 568 provides sufficient give at the time of contact with an apple so that the apple will not be pierced. The spring must be strong enough, however, so that when the apple is engaged by its indents, it may be accelerated from the velocity of the receptacle 46' to that of the spindle 194' without fumbling the apple.

Referring to FIG. 37, the vertical position of tubular member 566 which controls the movement of finger 153' is determined at all times by the position of a cam follower 571 which tracks in a groove 572 of a cam ring 573 mounted to the undersurface of upper frame support plate 550. The actuating mechanism for moving tubular member 566 comprises a lever 574 to which cam follower 571 is mounted, said lever being pivoted on a vertical axis and supported between the rim of support 553 and a plate 575. Lever 574 includes an arm which is pinned with a ball joint 576 to a link 577, the opposite end of said link being pinned with a ball joint to a bellcrank 578 pivotally mounted on support 553. One arm of bellcrank 57 is also pinned to a rod 579 which slides in a block 580 connected to tubular member 566. This last-named connection allows the bellcrank to operate member 566 with substantial vertical movement.

Vertical Adjustment for the Spindle Support

Referring to FIGS. 37—39 in particular, it will be seen that the vertical height of support 554, which supports each of the spindles 194', may be vertically adjusted without adversely affecting the linkage connections for positioning upper pickup fingers 153'. Moreover, the adjustment mechanism allows changes to be made in the vertical position of support 554 with relative ease and quickness and without affecting the concentricity or azimuthal relationship between support 554 and turret shaft 168'. This is important since vertical adjustments must be made without changing the positions of spindles 194' relative to pickup 152' and core tube 238'.

The foregoing objects are essentially accomplished by means of a pair of locking devices which are provided on the inner sleeve 554a of support 554. Each locking device comprises a bolt 581 and a locking nut 582, each bolt having a threaded portion that supports a threaded traveling block 53, one side of said block having a slanted face which complements the slanted face on a wedge-shaped key 54. It will be further noted that key 584 is disposed in a keyway through sleeve 554a and is carried in a second keyway 585 formed along one section of shaft 168'. A pair of lands 586 and 587 are provided longitudinally on the exterior of shaft 168', each of these lands projecting axially outward a distance which when contacted by the inner surface of sleeve 554a places the sleeve and shaft in precise coaxial alignment. The wedging action of block 583 forces key 584 against the one side of keyway 585, and such action accurately positions support 554 both concentrically and azimuthally relative to shaft 168'.

In operation, each of the locking devices is operated by simply loosening the nut 582 on each bolt 581 and then rotating the bolt to move the block 583 either into engagement or out of engagement with key 584. Moving the block 583 into contact with the wedge-shaped key will, of course, force the wedge radially toward tubular shaft 168', bringing the lands 586 and 587 into contact with the inner surface of sleeve 554a. In effect, traveling block 583 and key 584 form a binding engagement which brings sleeve 554a into precise coaxial relationship to shaft 168' and rigidly locks them together.

A change in the vertical position of support 554 is best accomplished by the use of a cam plate 589 rotatably mounted on the outer surface of shaft 168'. Plate 589 is formed with three indents, any one of which may be aligned in the vertical direction to receive a roller 590 mounted on sleeve 554a. It will be seen that the proximity of the indents relative to the axis of rotation of plate 589 varies so that the vertical height at which roller 590 engages the bottom of each indent varies depending on which is used. The three indents represent three positions of adjustment, one for small, one for medium and the third for large sizes of apples so that the center of the average apple of each size range coincides with the center of rotation of the cutter means 187'.

Referring to FIG. 37, support 554 also supports an apple stop 307', an upper trim knife 306' and a stem cutter 595. All three of these devices are mounted from a common bracket 596 which may be adjustably fastened in the most desirable vertical position relative to a depending support arm 597 attached to the underside of support 554. Thus, the vertical position of bracket 596, together with its supported apple stop 307' and knives 306' and 595, may be adjusted to accommodate the particular apple type or size of apple being processed.

In the preferred mounting construction illustrated, knives 306' and 595 are also separately supported from apple stop 307' so that the knives themselves do not interfere with the positioning of the apple upon the fork. This is accomplished by mounting the knives to an arm 598 which is pivoted from bracket 596 upon a pin 599. A torsion spring 600 is disposed about pin 599, one end thereof being connected to bracket 596 and the other to arm 598. Spring 600 applies a torsion bias which urges arm 598 and cutting knives 306', 595 into a stop position shown in FIG. 37 but allows arm 598 to be pivoted, and knives 306', 595 to be moved upward, as an apple is impaled upon a fork to the full depth allowed by stop 307'. Then, as the apple begins to rotate, the torsion spring 600 causes the knives to trim the top indent and cut off stems until arm 598 reaches its stop position.

Peeling Mechanism and Operation

The construction and operation of cutter means 187' is essentially the same as the cutter means 187 described in connection with the first embodiment. Accordingly, reference will be made only to the more basic parts of the cutter mechanism and to the novel operating means for bringing a pair of cutters 337', 338' into engagement with an apple and rotating the cutter means substantially 90° around an apple that is supported upon the fork of an associated spindle 194'. In general, each cutting means 187' comprises a pair of rotary cutters 337' and 338' with associated peeling depth gauges 348' and 349', each rotatably mounted in a yoke 339' which is pivoted upon a peeling head body 335'. Cutters 337' and 338' are each separately rotated by a pinion 353', which is held into engagement with the teeth of a gear 354'. Pinions 353' remain in engagement with gear 354' for each position into which yokes 339' may be pivoted; and each yoke is biased to be pivoted inwardly by the piston of a fluid-actuated diaphragm 363' which communicates with a pressurized fluid reservoir 366'. Air pressure is introduced into each reservoir 366' through a hoseline connection 368'. In addition, yokes 339' are adapted to be moved against the force of diaphragm 363' by a pair of pins 333' mounted to an arcuate plate 332'. The above is substantially as described in the earlier application.

Referring to FIG. 37, it will be noted that the air pressure applied to reservoirs 366' is controlled with a pressure-regulating valve 610. This valve may be used to reduce the main line pressure, which may be in the range of 30 to 50 p.s.i., to a more suitable pressure, such as 10 to 15 p.s.i., for holding the peeling cutters against the surface of an apple.

As with the first embodiment, gear 354' is driven through a shaft that carries a bevel gear 186' that is enmeshed with a second bevel gear 184' on shaft 177'. At the same time, peeling head body 335' may be rotated coaxially relative to gear 354', said body being rotatably supported from a sleeve 393' bolted to main turret shaft 168'.

Although cutting means 187' is essentially the same as the cutter means of the first embodiment, it is actuated by a cam control and linkage mechanism that differ from those used with the first machine. More particularly, arcuate plate 332' and pins 333' are actuated by a lever 612 pivotally supported from the main turret shaft 168'. The lower end of lever 612 carries a roller 613 which contacts arcuate plate 332'. The upper end of the lever is pivotally connected to a relatively short link 614 that has its other end pivotally joined to a second lever 615 carries a barrel-shaped cam follower 616 which tracks in a groove 617 formed in a cam ring 618.

Peeling head body 335', together with cutters 337' and 338', are adapted to be rotated with an actuating mechanism comprising a rod 619 pinned to a flange on body 335' with a ball joint. Another ball joint pivotally connects the upper end of rod 619 to one arm of a bellcrank 620 which is itself pivotally mounted to support 553. The other arm of the bellcrank is connected to a link 621 and is operated by a pivoted lever 622 having a cam roll 623 that tracks in groove 624 of cam ring 625. Ball joints are employed at both ends of link 621. In operation, pivotal movement of lever 622 imparts vertical movement to rod 619.

Adjustment of Cam Ring Assembly

Referring to FIGS. 43 and 44 in particular, cam rings 573, 625 and 618 are horizontally disposed one within another. Cam rings 573 and 618 may be angularly adjusted relative to the turret axis as to change or adjust the timing relationships of the various mechanisms controlled by these cams. In addition, cam ring 573 is mounted so that it may be radially adjusted towards or away from table 47' without disturbing the position of cam rings 618 and 625. For these purposes, cam ring 573 is formed with a pair of angular slots 630 and 631, and through each slot projects a bolt 632 which mounts the cam ring to the underside of support plate 550. The angular location of slots 630 and 631 are approximately 90° displaced from that portion of the cam groove 572 which controls the action of the upper pickup finger at the moment of pickup; and the clearances provided between slots 630, 631 and bolt 632 allow cam ring 573 to be either radially shifted (to adjust the vertical position of pickup finger 153' for small, medium or large apple sizes) or angularly adjusted for proper timing. During normal operation, of course, bolts 632 are tightened as to maintain cam ring 573 in a fixed position relative to support plate 550.

Cam ring 618 is mounted in a manner similar to cam ring 573 to provide an angular adjustment for timing. More particularly, cam ring 618 is provided with a pair of slots 633 and 634 which receive a pair of bolts 635 and mount the cam ring to support plate 550.

Cam ring 625 is nonadjustably bolted to plate 550 and receives cam ring 618 with a slidable fit. A pair of ears 636 and 637 provided peripherally on cam ring 625 serve as a guide and centering means for cam ring 573. It will be noted that these ears permit relative angular movement of cam ring 573 about the turret axis. Sufficient clearance is also provided to allow the radial movement of cam ring 573 to effect an adjustment in movement of the upper pickup finger as described above.

Lower Pickup Finger and Actuating Mechanism

Lower pickup fingers 152' are actuated by mechanisms that provide vertical lift and a swinging movement. Although these same actions were utilized in the machine of the first embodiment described, the swing action could only take place when the vertical lift was fully down. The improved mechanism permits the swinging action at any point of the left action. By combining the life and swing action, each pickup finger 152' may be moved with a more nearly vertical rise as it passes through receptacle 46' to contact the lower indent of the apple at the pickup point.

Referring to FIG. 55, lower pickup fingers 152' are mounted to a piston 640 of an air cylinder 641, air pressure being supplied to the cylinder and in back of piston 640 through a hose 642. The air pressure supply is regulated to provide the necessary force for impaling an apple upon forks 193'. It is also contemplated that the pressure can be changed to provide optimum conditions depending on apple firmness.

It will be seen that cylinder 641 provides an overtravel when the apple has been impaled and is in contact with the stop plate 307'. Thus, various sizes of apples may be fully impaled upon forks 193' without also impaling the apple upon the end of fingers 152'. For example, if a very large apple should be picked up by finger 152' and impaled upon a fork 193', the apple will be brought into contact with the apple stop 307' before the air cylinder, mounted upon a tubular member 643, has attained its full vertical rise. In such case, both the apple and finger 152' will remain stationary as cylinder 641 continues to be raised.

Cylinder 641 is preferably clamped upon member 643 by means of bolts 644. This mounting structure allows the tip 154' of pickup finger 152' to be accurately positioned, thereby providing the most advantageous pickup of the apple from receptacles 46' of disc 47'.

The operating mechanism for member 643 is best illustrated in FIGS. 45 through 51. In general, the mechanism as a whole is supported in a frame 645 bolted to lower support 556. A bracket 646 mounted on top of the frame serves as a bearing support and guide for tubular member 643 as well as for the actuating tube 670 of the coring mechanism.

The mechanism for imparting a vertical movement to member 643 comprises a lever 647 that is pivoted on a vertical axis from a bracket 645' attached to frame 645 (FIGS. 47—49, 51). Lever 647 carries a cam roll 648 which tracks in a groove 649 of a horizontal cam plate 650 (FIG. 56). Pivotal movement of lever 647 actuates a connector rod 651, a bellcrank 652, a link 653 and an actuating sleeve 654, each of these linkage connectors being pivotally joined as illustrated in FIG. 48 with ball joints as required so that a horizontal movement of cam roll 64 is translated into a vertical movement of sleeve 654.

A vertical movement of sleeve 654 is transmitted to the tubular member 643 by a collar 655 and a bifurcated crank arm 656, said collar and crank arm being disposed on opposite sides and in abutting contact with the ends of sleeve 654. Both collar 655 and crank arm 656 are secured to tubular member 643 and each allows relative rotation between the member and sleeve 654. In addition, rotational movement of sleeve 654 is prevented by a plate 657, said plate being mounted to sleeve 654 and captured in a vertical slot defined by one side surface of bellcrank 652 and a retainer plate 658, which is secured thereto. Referring to FIG. 51, it will be apparent that sleeve 654, together with plate 657, may be moved vertically but that rotational movement is prevented by contacts with bellcrank 652 and plate 658.

Tubular member 643 is slidably supported upon guide rod 659, itself rotatably supported by a collar 660 on a flange of frame 645 and extending coaxially through both the tubular member and sleeve. Rod member 659 supports a crank 661 having a vertically projecting square finger 662 that is embraced by bifurcated crank arm 656, and it carries a cam roll 663 which is received in a groove 664 of cam plate 650 (FIG. 56). In operation, rotation of crank 661 about the axis of rod member 659 imparts a corresponding rotation to tubular member 643 through an actuation of crank arm 656. Thus, the tubular member 643 may move vertically while being rotated at the same time.

In summary, cam roll 648 controls the vertical positioning of pickup finger 152', as when it is being moved to engage the lower indent of an apple and lift the apple upwardly to impale it upon a fork. Cam roll 663, on the other hand, controls the swing position of the pickup finger 152' as to position the finger either in substantial alignment with an upper pickup finger 153' or move it to one side so that the coring mechanism may be moved into alignment with the fork 193'.

Operation and Control of Lower Pickup Finger

The operation of lower pickup finger 152' and its cooperation with upper pickup finger 153' in lifting apples from a receptacle 46' is substantially the same as that described in connection with the first embodiment. However, pickup finger 152' is operated in an improved manner to provide a more near vertical rise of the pickup finger relative to receptacles 46'. This is accomplished by the improved actuating mechanism which allows pickup finger 152' to be swung or pivoted while being lifted, and the operation is best illustrated in FIGS. 58—60 of the drawings.

The speed of peeling turret 151' and disc 47' is in a sense dictated by the need to keep the disc as small as practical while allowing time to orient the apples and provide room for the cutter mechanisms on peeling turret 151'. In the machine shown, the arc length between receptacles 46' on disc 47' is essentially one-half the arc length between peeling forks 193'. This relationship necessitates that the peeling turret be rotated about twice as fast as the disc 47' to synchronize the movement of receptacles 46' and match them with the peeling forks at the pickup station; and, as a consequence, the centers of the forks and receptacles coincide for only one instant. Thus, the lower pickup fingers must thread their way up through the center holes of the receptacles 46', pick up an apple and lift it clear of table 47' during a very brief period of time while they are in substantial alignment. This function, it has been found, may be accomplished most successfully by swinging the lower pickup fingers 152' backward during pickup to reduce their velocity to approximate that of the receptacles. Then, after the picked-up apple has cleared table 47', lower pickup fingers 152' are accelerated forward to positions beneath the peeling forks before impaling the supported apples upon the forks.

Referring to FIGS. 58 and 59 in particular, it will be seen that each pickup finger 152' as it begins to rise is in advance of fork 193'. Then, as pickup finger 152' is lifted, it is simultaneously swung backward until it is directly in line with fork 193' at the expected moment of pickup. As illustrated, this occurs at an angular position indicated as 2° past the tangent point of the two paths. It will also be seen that the backward swinging movement of lower pickup finger 152' is continued until the axis of the finger is behind the axis of upper pickup finger 153', reaching a maximum at about 5°. Thereafter, the lower pickup finger is swung forwardly to bring it back into alignment with upper pickup finger 153', this occurring at the angular position of 8°. The importance of this controlled movement of lower pickup fingers 152' is that it produces a more nearly vertical rise of the lower pickup finger relative to a matched receptacle than is possible to achieve with straight cam lifts, and the tip of the lower indent pickup contacts the lower indent of various sized apples in a more uniform manner.

FIG. 59 graphically illustrates and compares the velocity of the bottom pickup finger with the top pickup finger and orienting cups. Referring to that graph, it will be seen that in the preferred embodiment, both the top pickup fingers and the bottom pickup fingers are moving at a velocity which is about double that of the orientor receptacles 46' and the bottom pickup finger is ahead of the top pickup finger. At 356° the bottom finger is swung backward, thereby reducing its net forward velocity to approximate that of the cup velocity. This reduced velocity is sustained until the lower finger has fallen behind the upper finger a maximum amount at about 5°. Then the finger is swung forward, increasing its velocity to catch up with the top pickup finger in preparation for impaling the apple on the fork.

Coring Mechanism and Operation

Referring to FIGS. 52 and 53 in particular, coring mechanism 206' is in many respects the same as that used in the first embodiment. In this regard, there is provided a core tube 238' which is adapted to be moved into alignment with the fork 193' on which an apple is impaled and then elevated to sever the core from the apple. In addition, means is provided for trimming the annular area about the lower indent as the coring and peeling operations are being carried out. For this purpose, there is provided a lower indent trimming knife 242' and a guard 243', both mounted on a sleeve 246' which is slidably mounted on a core tube 238' and urged upwardly by a spring 244' seated on a support arm 237'. Although it is not shown, sleeve 246' is held against rotation by a key on the core tube and the upward travel of the sleeve is limited by a stop formed by the lateral extension of the key as in the first embodiment.

The operating mechanism for controlling the swing position of core tube 238' comprises a tubular support 670 to which arm 237' is mounted. Support 670 is mounted for rotation and axial movement by the bracket 646 and by a rod 671, which extends axially through support 670 and is itself rotatably mounted in an opening through a flange of frame 645. A collar 672 affixed to rod 671 supports the rod from the flange. Both support 670 and rod 671 are pivoted and pivotally positioned by a crank 673 attached to the lower end of rod 671, said crank having a vertical guide 674 embraced by a bifurcated crank arm 675 secured on the lower end of tubular support 670. A pair of cam rolls 676 and 677 are carried on the lower surface of crank 673, each cam roll having separate tracks 678 and 679 formed in cam plate 650. Referring to FIG. 56, it will be apparent that only one of these cam rolls and cam tracks is operative at a given time, two cam rolls and cam tracks being used to provide the desired amount of controlled pivotal movement. In this regard, it is contemplated that tubular member 670 and rod 671 may be rotated approximately 120°. Under such conditions the use of a double cam roll is almost essential from the practical standpoint of machine design.

Rod 671 also carries a stripper plate 251' on its upper end, and from the foregoing description it will be apparent that the stripper plate 251' is simultaneously swung into position with core tube 238'. The operation of stripper plate 251' is the same as that used in the first embodiment described.

The mechanism for effecting a vertical movement of tubular support 620 and core tube 238' is illustrated in FIG. 53. This mechanism comprises a sleeve 680 rotatably mounted on tubular support 670 between crank arm 675 and collar 681 secured to tubular support 670. Thus, any vertical movement imparted to sleeve 680 will also be transmitted to tubular support 670.

The actuating mechanism for moving sleeve 680 is essentially the same as that used for positioning sleeve 654 of the mechanism for vertically positioning lower pickup finger 152'. More particularly, a cam lever 682 is pivoted on an ear of frame 645 (FIG. 49), and pivotal movement of lever 682 is translated into vertical movement of sleeve 680 by a linkage connection comprising a connector rod 683, a bellcrank 684 and a connector rod 685. Both connector rods have ball joint ends. The pivotal position of lever 682 is controlled by a cam roll 686 which tracks in a groove 687 of a cam ring 688 supported on cam plate 650. A plate 689 mounted to sleeve 680 is captured in a vertical slot defined by bellcrank 684 and a retainer plate 690 mounted to the bellcrank (FIG. 47). This structure prevents rotational movement of sleeve 680 while allowing its vertical movement by the actuating mechanism.

Waste Disposal

As with the first embodiment, means is provided for disposing of waste materials resulting from the peeling and coring operations. Such means comprises a trough 382' supported from a cylindrical barrier 694 which, together with support 555, encloses the mechanism for operating lower pickup finger 152' and coring mechanism 206'. The lower depending edge of support 555 is formed with a pair of concentric grooves, the innermost groove receiving the upper edge of barrier 694 and the other groove receiving the inner barrier panel of trough 382'. It is to be understood that both grooves receive their respective barrier edges with a slidable fit which allows support 555 to be rotated while barrier 694 and trough 382' are stationary. In operation the concentric grooves of support 555 provide an effective seal both within and without barrier 694. Accordingly, lubricating oil may be freely sprayed or splashed within the chamber defined by barrier 694 and support 555, and the oil will gravitate downwardly onto cam plate 650 and thence into an oil sump (not shown) below cam 650. An oil pump (not shown) picks up oil from the sump and jets (not shown) splash oil over the mechanisms as they rotate past the jets. The overlapping relationship of support 555 with trough 382' also allows water to be sprayed upon the exterior surface of the support to wash off peelings and cores into the trough without fear of contaminating the lubricating oil.

Waste material which collects in the rough 382' is moved within the trough by a paddle (not shown) mounted to the lower edge of support 555. This paddle urges the waste material into a discharge chute 695 illustrated in FIG. 32. From there the waste material may be delivered onto a conveyor belt or into a flume and transported to a remote collection point.

Summary

The operation of this second embodiment of the invention is essentially the same as the first, but several important improvements are incorporated into this embodiment which allow the machine to be adjusted for processing apples of various sizes. In addition, lifting mechanisms are provided for separately actuating the lower pickup fingers 152' and coring mechanisms 206' so that each device may be rotated as required while being moved vertically.

The timing relationship of each of the operated mechanisms may be followed and compared by referring to the timing chart illustrated in FIG. 60. The curves do not purport to show actual accelerations but rather they indicate the action or actions taken place at a particular point in time.

The angular position of 0° is at the tangent point between disc 47' and turret 151'. At about this position the upper pickup finger 153' is moved downwardly into the indent of an apple supported in a receptacle 46' while lower pickup finger 152' is moved upwardly. Although finger 152' occupies a position that is in substantial alignment with upper pickup finger 153', it is more precisely positioned slightly forward relative to the upper finger. As the peeling-coring turret is further rotated, lower finger 152' continues to be moved upwardly and swung backward until it engages the lower indent of an apple. During this period of time the backward swinging movement of finger 152' produces a resulting velocity that is retarded and approaches the velocity of receptacles 46', which are moved with about half the velocity of receptacles 46', which are moved with about half the velocity of forks 193' on the peeling-coring turret.

Immediately after the apple has been lifted free of the receptacle 46', there is a slight dwell period during which the stem of the lower pickup finger passes out of the slot in the receptacle. Simultaneously the supported apple is contacted and challenged by the spring reject 156' which discharges the apple if it has not been properly gripped by its indents. This operation completed, the apple is impaled upon the associated peeling fork 193' as finger 152' is moved with a rapid lifting action. Air cylinder 641 provides overtravel to accommodate various apple sizes during the impaling action. As soon as finger 152' completes its upward thrust, it is moved downwardly and then pivoted forwardly out of alignment with the peeling fork where it remains until the peeling and coring operations have been completed and another apple is to be engaged.

Actuation of coring tube 238' commences at a time shortly after lower pickup finger 152' is swung forwardly into its idle or inactive position. The initial actuation of the coring tube swings the tube beneath the peeling fork. It then begins a rapid rise into engagement with the apple. But shortly after making contact with the apple, core tube 238' is slowed to a much slower rate of rise, the coring then progressing while the apple is being simultaneously peeled. At the very end of the coring operation, upper pickup finger 153' moves downwardly with a sudden thrust. This action strips the apple core from fork 193', forces the severed core down into the core tube and pushes the preceding core out the lower end of the core tube.

It will be noted that core tube 238' is supported in its uppermost position for a slight pause at the very end of the coring operation. This allows time for the upper pickup finger to eject the core from the fork into the core tube. Thereafter, core tube 238' and finger 153' retract from one another, the retraction of the core tube moving the peeled and cored apple (which it then carries) into contact with stripper plate 251', stripping the apple therefrom. The core tube and stripper then swing out of alignment relative to the peeling fork as to make way for the lower pickup finger in a second cycle of operation.

As previously described, coring tube 238' is actuated by a pair of cam rolls 676 and 677. This device has been found effective for moving the core tube through an angle of approximately 120°, a design requirement based on a desire to retain the controlling cam follower in trailing relation to its center of pivot, thereby allowing the core tube to be precisely aligned with the peeling fork. If otherwise, and lacking such control, it is possible that core tube 238' might inadvertently engage or contact the peeling fork. This is especially true where only slight clearances are provided, such as a 1/32-inch clearance which may be used between the peeling fork and the surrounding core tube.

The operation of apple peeling means 187' is, of course, synchronized with the movement of the upper and lower pickup fingers and the coring mechanism. Beginning with the position of the cutters at the moment the turret occupies the angular position referred to as 0°, the cutters are backed off and rotated 90° from a starting position. As soon as the lower pickup finger 152' begins its retraction, after impaling the apple upon the fork 193', the cutters are rotated to the starting position for a cut. They arrive at such position about the same time that the lower pickup finger 152' is moved downwardly to its idle position. The cutters are then brought into contact with the apple and slowly rotated 90° around the apple which is simultaneously rotated upon peeling fork 193'.

Peeling continues while coring commences but the peeling operation is completed before the end of the coring cycle. This necessary since the apple core would otherwise be severed from the apple and the apple could not then be rotated for the peeling operation. After the cutters have been rotated 90° about the apple, they are moved away from the apple, the core tube then completing its upward movement to sever the core from the apple.

Although the foregoing description of operation covers the major operations of the machine as shown in FIG. 60, it is to be understood that other operations are also performed on the apple. For example, the coring operation is conducted with a simultaneous trimming of the lower indent. This is performed by the knife 242' mounted on the spring-pressed sleeve 246'. The depth of cut is controlled by the adjustable shoe 243' which, when brought into contact with the bottom of the apple, limits the upward movement of sleeve 246' and determines the position of knife 242'.

Another operation not illustrated in FIG. 60 is the trimming of the upper indent and the severing of stems which may be present. These operations are carried out with knives 306' and 595 after impalement of an apple upon fork 193' and as the fork is rotated.

We claim:
1. In a fruit-peeling machine:
   a. a turret supported in said frame for rotation about a vertical axis;
   b. a plurality of rotary spindles supported at spaced intervals about an upper portion of the turret and rotatable therewith;
   c. a spring-biased rod movable axially in each spindle from a retracted position within the spindle to an extended position below the spindle;
   d. means for raising and lowering the rod in the spindle during rotation of the turret;
   e. a plurality of carriers supported at spaced intervals about a lower portion of the turret and rotatable therewith;
   f. a rod movable axially with each carrier from a lower position to an upper position;

g. and means effective during rotation of the turret to raise each carrier to move the rod thereon upwardly toward and substantially in alignment with the rod on a spindle while the rod on the spindle is being lowered whereby a fruit is engaged and held between the rods.

2. In a machine as in claim 1 wherein each spindle includes a fork on which a fruit can be impaled and each carrier is raised to enable the lower rod to impale a fruit engaged with the rod on the fork.

3. In a machine as in claim 2 wherein each carrier includes a core knife for coring a fruit impaled on the fork and means are provided for oscillating each carrier during turret rotation, first to position and raise a rod for fruit engagement and then to position and raise the core knife to engage an impaled fruit.

4. In a machine as in claim 3 wherein following cutting of the core the rod in the spindle is lowered to eject the core.

5. In a machine as in claim 3 wherein following the cutting of the core, means are effective to discharge the apple from the machine.

6. In a machine as in claim 3 wherein means are provided to trim the upper and lower indents of the apple.

7. A continuous machine for preparation of fruit comprising:
  a. means for picking up a fruit by its indents from a continuously moving conveyor on which the fruit was oriented at least partially;
  b. means for supporting a fruit for rotation about its indent axis;
  c. means for lifting the fruit while held by its indents into engagement with said support means;
  d. means for positioning the fruit at a predetermined point on the support means;
  e. and means for rotating the supported fruit.

8. A machine as in claim 7 wherein means are provided to dislodge fruit which is not being lifted by its indents prior to engagement with the fruit support means.

9. A machine as in claim 7 wherein:
  a. means are provided to cut a cylindrical core through the fruit while it is rotated by the support means;
  b. and means are provided to eject the core from the fruit.

10. A machine as in claim 9 wherein means are provided to trim the indents of the fruit.

11. A machine as in claim 7 wherein rotary cutter means are provided to remove the skin from a fruit supported on the support means.

12. A machine as in claim 9 wherein rotary cutter means are provided to remove the skin from a fruit supported on the support means.

13. A machine as in claim 7 wherein:
  a. rotary cutter means are provided to remove the skin from a fruit supported on the support means;
  b. means are provided to cut a cylindrical core through the fruit while it is rotated by the support means;
  c. means are provided to eject the core from the fruit;
  d. means are provided to trim the indents in the fruit;
  e. and means are provided to discharge the processed fruit from the machine.

14. A fruit-processing machine comprising:
  a. a fruit conveyor comprising a plurality of fruit-supporting receptacles spaced equal distances apart, each receptacle being formed with a central hole in its bottom and a slot through the sidewall;
  b. means for moving the conveyor and its receptacles in a horizontal plane over a path including a pickoff station;
  c. means for orienting fruit supported in each receptacle such that the upper and lower indents of each piece of fruit are substantially aligned on a vertical axis, the lower indent of the fruit being exposed through the central hole of the supporting receptacle;
  d. a second conveyor for peeling the fruit comprising a plurality of separate apple support means spaced equal distances apart;
  e. each apple support means comprising a lower indent pickup finger for engaging the lower indent of a fruit carried by one of said receptacles and an upper indent pickup finger for engaging the upper indent of the fruit;
  f. means for moving said second conveyor and apple support means in a horizontal plane over a path through said pickoff station;
  g. means for moving each pair of upper and lower indent pickup fingers together as they approach the pickup station to engage the fruit by its indents and lift said fruit from a receptacle of said first conveyor;
  h. each apple support means further comprising a fork on which a fruit may be impaled by the lifting movement of said lower and upper indent pickup fingers;
  i. means for rotating each fork after a fruit has been impaled thereon;
  j. and a plurality of separate apple-peeling means, one provided cooperatively adjacent each fork and movable into engagement and over the surface of a fruit supported on the fork while said fork is rotated.

15. Apparatus as in claim 14, each upper indent pickup finger being mounted for reciprocal movement in a direction that is substantially coaxial relative to fork rotation and having a downward spring bias to accommodate fruit of various sizes, said finger being retracted upward while holding a fruit under said bias as a fruit is picked up from said conveyor and impaled on said fork by the upward movement of said lower indent pickup finger.

16. Apparatus as in claim 14, the fruit-supporting receptacles of said fruit conveyor being moved at a substantially lower velocity than the apple support means of said second conveyor, and further comprising means for moving the lower indent pickup finger of each support means in a direction as to reduce its velocity while said lower indent pickup fingers are raised to engage a piece of fruit and lift the fruit from a receptacle of the fruit conveyor.

17. Apparatus as in claim 14, and further comprising a plurality of coring tubes, one tube being provided cooperatively adjacent each apple support means; and means for swinging each lower indent pickup finger out of alignment with its associated upper indent pickup finger and swinging the associated coring tube into alignment with the apple-supporting fork; and means for independently lifting each coring tube and lower indent pickup finger to operate in a sequence such that the lower indent finger engages the lower indent of a fruit supported in a receptacle at the pickoff station, lifts the fruit from the receptacle under the guidance of the spring-biased upper pickup finger and impales the fruit on the fork and swings to a position out of alignment with the upper indent finger, said coring tube then being moved into vertical alignment with said fork and brought upwardly into engagement with the fruit.

18. Apparatus as in claim 14, and further comprising a resilient contact disposed in the path of the fruit as it is carried from the pickoff station between pairs of lower and upper pickup fingers, said contact imposing a force which will discharge a piece of fruit unless it is engaged at both indents by a pair of fingers.

19. Apparatus as in claim 18, each apple-peeling means comprising a pair of rotary cutters, means mounting each rotary cutter for spiral movement over the surface of a rotating piece of fruit impaled upon the fork, the spiral path traversed by one cutter being separate from the spiral path traversed by the other cutter except at their juncture, means for simultaneously moving said cutters over a fruit while it is rotated upon the fork, and means for moving said cutters into and out of peeling engagement with a fruit supported upon a fork.

20. The apparatus of claim 19, said means for moving each upper indent pickup finger comprising a horizontally disposed cam ring, a cam follower disposed in a control groove of said cam ring, and an actuating mechanism for vertically positioning the upper indent pickup finger in response to movement of the cam follower in the control groove; said means for moving said cutters comprising a horizontally disposed control cam, a cam follower disposed in a control groove of said control cam; said control cam being horizontally disposed within said cam ring, said cam ring being angularly and radially adjustable relative to the control cam.

21. Apparatus as in claim 17, and further comprising means for trimming the indents of a fruit impaled on a fork comprising a knife and a shoe mounted from a common support that is slidably mounted on the core tube and resiliently biased in the direction of a supported fruit as to urge the knife and shoe into engagement with the fruit as said core knife enters the fruit, said shoe limiting the penetration of said knife into the fruit and determining the depth of cut taken in the indent.

22. Apparatus as in claim 14, and further comprising means for mounting each fork for simultaneous vertical adjustment relative to the upper indent pickup fingers, a vertical adjustment in the position of said forks being made without affecting the positions or actuation of the upper and lower pickup fingers.

23. Apparatus as in claim 22, the support means for said forks comprising a first support having a sleeve and being vertically adjustable on a main turret shaft; and means for securing said first support to said turret shaft in various positions of vertical adjustment comprising threaded means mounted to said first support, a traveling block mounted on said threaded means and engageable with a wedge-shaped key carried by said shaft, and a pair of lands formed on said shaft, the movement of said block into engagement with said key producing a binding engagement between said lands and said sleeve as to position said sleeve in concentric relationship to said shaft for each position of vertical adjustment.

24. The apparatus of claim 23, and further comprising a gauge plate pivotally mounted to said main turret shaft on a horizontal axis, said plate being formed with a plurality of recesses any one of which may be aligned in a vertical direction, and a detent mounted on said first support and adapted to be received in one of the recesses of said gauge plate, the proximity of the recesses relative to the axis of gauge plate mounting varying so that the vertical height at which the detent engages the bottom of each recess varies depending on the recess in which it is received.

25. A machine for preparing apples comprising:
 a. a frame;
 b. a shaft extending vertically in the frame;
 c. a turret rotatable continuously about said shaft;
 d. a plurality of separate apple support means provided at spaced intervals about said shaft on said turret;
 e. a plurality of separate apple-peeling means each provided cooperatively adjacent an apple support means;
 f. means for rotating said apple support means to alter the position of an apple thereon in relation to said apple-peeling means;
 g. each apple support means including:
 h. a tubular fork for engaging an apple and impaling the same;
 i. a spring-biased indent finger movable through the tubular fork;
 j. and means for raising and lowering the indent finger during rotation of the turret through a path of travel which is independent of the vertical position of the apple support means in relation to the peeling means.

26. A fruit-peeling device comprising:

a. a spindle on which fruit is impaled along its stem-blossom axis for rotation about the axis of the spindle with one end of the fruit exposed on the spindle and the other end engaged on the spindle;
 b. means for rotating the spindle to rotate a fruit impaled on the spindle;
 c. a first shaft having a circular cutter mounted to an end thereof;
 d. a second shaft having a circular cutter mounted to an end thereof;
 e. means for rotating each shaft;
 f. means for moving the first shaft pivotally about the axis of the spindle and in a plane passing through and parallel to the stem-blossom axis of a fruit impaled on the spindle from adjacent the exposed end of the fruit impaled on the spindle to a final position at about the midpoint of the fruit;
 g. and means for moving the second shaft pivotally about an axis substantially at right angles to the axis of the spindle and in a plane parallel and closely adjacent to, but spaced from the axis of the spindle from adjacent the midpoint of the fruit to that end of the fruit from which the impaling spindle extends.

27. A device as in claim 26 wherein:
 a. a coring tube is positioned to cut a cylindrical core through an apple on the support means;
 b. and means are provided for moving the core tube into engagement with the apple during its rotation to cut a core therein.

28. A device as in claim 27 wherein the fruit support means is tubular and, following coring of the apple, a rodlike member is moved through the support means to eject the core from the core tube.

29. A machine as in claim 26 wherein each fruit support means is tubular and a spring-biased rod is movable axially thereof from a position wholly within the fruit support means to a position wherein the rod projects below the fruit support means.

30. Fruit-peeling mechanism comprising:
 a. means supporting a fruit for rotation;
 b. a central housing;
 c. a shaft mounted in said housing;
 d. means for rotating said shaft;
 e. a gear on an end of said shaft;
 f. a first fruit-peeling spindle mounted on said housing for pivotal movement with respect to said housing in a plane passing through and parallel to the stem-blossom axis of the fruit;
 g. a second fruit spindle mounted on said housing and spaced 90° from the first spindle for pivotal movement with respect to said housing in a plane parallel and closely adjacent to the stem-blossom axis of the fruit;
 h. each spindle having a gear on one end thereof enmeshed with the first mentioned gear;
 i. and a rotary cutter mounted on the other end of each spindle for peeling fruit engaged by the cutter.

31. In a device as in claim 30 wherein pivotal movement of each fruit-peeling spindle toward and away from fruit undergoing peeling is opposed by fluid-dampening means.